(12) United States Patent
Chabinyc et al.

(10) Patent No.: US 11,780,969 B2
(45) Date of Patent: Oct. 10, 2023

(54) CAPACITIVE PRESSURE SENSOR WITH BOTTLEBRUSH ELASTOMER DIELECTRIC LAYER FOR LOW PRESSURE SENSING

(71) Applicant: The Regents of the University of California, Oakland, CA (US)

(72) Inventors: Michael L. Chabinyc, Santa Barbara, CA (US); Christopher M. Bates, Santa Barbara, CA (US); Veronica G. Reynolds, Goleta, CA (US); Sanjoy Mukherjee, Goleta, CA (US); Renxuan E. Xie, Goleta, CA (US); Adam E. Levi, Goleta, CA (US); Jeffrey Self, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 225 days.

(21) Appl. No.: 15/931,254

(22) Filed: May 13, 2020

(65) Prior Publication Data
US 2020/0362117 A1    Nov. 19, 2020

Related U.S. Application Data

(60) Provisional application No. 62/913,782, filed on Oct. 11, 2019, provisional application No. 62/846,883, filed on May 13, 2019.

(51) Int. Cl.
*C08G 83/00*     (2006.01)
*G01L 9/00*      (2006.01)
(Continued)

(52) U.S. Cl.
CPC .......... *C08G 83/005* (2013.01); *C08G 61/02* (2013.01); *C08G 61/124* (2013.01); *C08K 5/07* (2013.01);
(Continued)

(58) Field of Classification Search
CPC ............ C08G 83/005; C08G 2261/132; C08G 2261/1642; C08G 2261/1644;
(Continued)

(56) References Cited

U.S. PATENT DOCUMENTS

| 11,053,356 B2 * | 7/2021 | Grubbs | ................. C08F 290/02 |
| 2009/0023877 A1 * | 1/2009 | Liaw | ..................... C07C 69/753 |
| | | | 526/259 |

(Continued)

OTHER PUBLICATIONS

Arrington et al. (ACS Appl. Mater. Interfaces 2018, 10, 26662-26668).*

(Continued)

*Primary Examiner* — Shane Fang
(74) *Attorney, Agent, or Firm* — Gates & Cooper LLP

(57) ABSTRACT

A composition of matter including a crosslinked bottlebrush polymer, wherein the crosslinker units in the composition of matter are soluble with the bottlebrush polymer. In one example, the crosslinked bottlebrush polymer is tailored as a single phase (solvent free) elastomer useful in a capacitive pressure sensing device. A novel embodiment of the present invention further includes demonstration of a universal approach to form solvent-free bottlebrush polymer networks by photo-crosslinking mixtures of well-defined bottlebrush precursors and bis-benzophenone-based additives. This method has been proven effective with a wide variety of different side-chain chemistries.

25 Claims, 46 Drawing Sheets

(51) Int. Cl.
    *G06F 3/041*     (2006.01)
    *C08K 5/07*     (2006.01)
    *C08G 61/02*     (2006.01)
    *C08G 61/12*     (2006.01)

(52) U.S. Cl.
    CPC ........ *G01L 9/0072* (2013.01); *G06F 3/04164* (2019.05); *C08G 2261/132* (2013.01); *C08G 2261/1642* (2013.01); *C08G 2261/1644* (2013.01); *C08G 2261/3241* (2013.01); *C08G 2261/3324* (2013.01); *C08G 2261/76* (2013.01); *C08G 2261/94* (2013.01); *G06F 3/04146* (2019.05)

(58) Field of Classification Search
    CPC .... C08G 2261/3241; C08G 2261/3324; C08G 2261/76; C08G 2261/94; G06F 3/04164; G06F 3/04146; C08K 5/07; G01L 9/0072
    See application file for complete search history.

(56) References Cited

U.S. PATENT DOCUMENTS

| | | | | |
|---|---|---|---|---|
| 2015/0118188 A1* | 4/2015 | Weitekamp | ............ | A61L 27/16 522/63 |
| 2016/0251508 A1* | 9/2016 | Hustad | ................... | B82Y 40/00 524/504 |
| 2016/0254141 A1* | 9/2016 | Hustad | ................. | G03F 7/2059 438/781 |
| 2016/0289392 A1* | 10/2016 | Grubbs | ................. | C08L 87/005 |
| 2018/0312634 A1* | 11/2018 | Chung | ................. | C08F 291/12 |

OTHER PUBLICATIONS

Yoon, J., et al., "A novel means of fabricating microporous structures for the dielectric layers of capacitive pressure sensor", Microelectronic Engineering, 2017, pp. 60-66, vol. 179.

Lee, B-Y, et al., "Low-cost flexible pressure sensor based on dielectric elastomer filmwith micro-pores", Sensors and Actuators A: Physical, 2016, pp. 103-109, vol. 240.

Mukherjee, S., et al., "Universal Approach to Photo-Crosslink Bottlebrush Polymers", Macromolecules, 2020, pp. 1090-1097. vol. 53.

Kwon, D., et al., "Highly Sensitive, Flexible, and Wearable Pressure Sensor Based on a Giant Piezocapacitive Effect of Three-Dimensional Microporous Elastomeric Dielecliic Layer", ACS Appl. Mater. Interfaces, 2016, pp. 16922-16931, vol. 8.

Vatankhah-Varnoosfaderani, M.,et al, "Bottlebrush Elastomers: A New Platform for Freestanding Electroactuation", Advanced Materials, 2017, pp. 1-7, 1604209, vol. 29.

Lei, Z., et al., "A Bioinspired Mineral Hydrogel as a Self-Healable, Mechanically Adaptable Ionic Skin for Highly Sensitive Pressure Sensing", Adv. Mater., 2017, pp. 1-6, 1700321, vol. 29.

Atalay, O., et al., "A Highly Sensitive Capacitive-Based Soft Pressure Sensor Based on a Conductive Fabric and a Microporous Dielecliic Layer", Adv Mater Technol., 2018, pp. 108, 1700237. vol. 3.

Reynolds, V.G., et al., "Super-soft solvent-free bottlebrush elastomers for touch sensing", Materials Horizons, 2020, pp. 181-187, vol. 7.

* cited by examiner

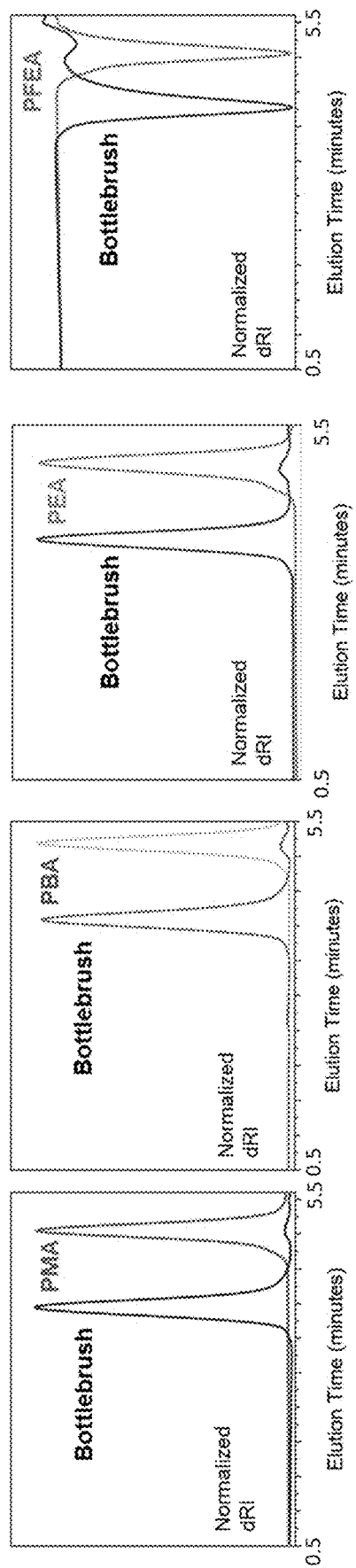

| Material | Shear Modulus, $G_0$ (kPa) | Gel Fraction (%) |
|---|---|---|
| Sylgard 184 | 519 | 95 |
| PDMS$_{68}^{43}$-12 | 146 | 94 |
| PDMS$_{68}^{20}$-4 | 92 | 92 |
| PDMS$_{68}^{99}$-12 | 53 | 93 |
| PDMS$_{68}^{235}$-25 | 53 | > 90 |
| PDMS$_{68}^{20}$-3 | 22 | 94 |
| PDMS$_{68}^{235}$-19 | 17 | > 90 |
| PDMS$_{68}^{20}$-2 | 16 | 86 |
| PDMS$_{68}^{235}$-12 | 6.2 | 85 - 90 |

Fig. 10

Fi.g 16

| Sample ID | $G_0$ (kPa) | $S_{0-10}$ (kPa$^{-1}$) | $S_{0-10}/S_{Sylgard}$ | $S_{20-50}$ (kPa$^{-1}$) | $S_{20-50}/S_{Sylgard}$ |
|---|---|---|---|---|---|
| Sylgard 184 | 520 | 0.0004 | - | 0.0001 | - |
| PDMS$_{68}^{20}$-4 | 92 | 0.0013 | 3.3 | 0.0009 | 9.0 |
| PDMS$_{68}^{99}$-12 | 53 | 0.0023 | 5.8 | 0.0029 | 29 |
| PDMS$_{68}^{20}$-2 | 16 | 0.0062 | 16 | 0.0036 | 36 |
| PDMS$_{68}^{235}$-12 | 6.2 | 0.0087 | 22 | 0.0053 | 53 |

CAPACITIVE PRESSURE SENSOR WITH BOTTLEBRUSH ELASTOMER DIELECTRIC LAYER FOR LOW PRESSURE SENSING

CROSS REFERENCE TO RELATED APPLICATIONS

This application claims the benefit under 35 U.S.C. Section 119(e) of the following commonly-assigned applications:

U.S. Provisional Patent Application No. 62/846,883, filed May 13, 2019, by Michael Chabinyc, Christopher Bates, Veronica Reynolds, Sanjoy Mukherjee, Renxuan Xie, and Adam Levi, entitled "CAPACITIVE PRESSURE SENSOR WITH BOTTLEBRUSH ELASTOMER DIELECTRIC LAYER FOR LOW PRESSURE SENSING"; and U.S. Provisional Patent Application No. 62/913,782, filed Oct. 11, 2019, by Michael L. Chabinyc, Veronica Reynolds, Sanjoy Mukherjee, Renxuan Xie, and Christopher Bates, entitled "UNIVERSAL APPROACH TO PHOTO-CROSS-LINK BOTTLEBRUSH POLYMERS";

all of which applications are incorporated by reference herein.

BACKGROUND OF THE INVENTION

1. Field of the Invention

The present invention relates to bottlebrush polymers and devices made using the bottlebrush polymers.

2. Description of the Related Art (Note: This application references a number of different publications as indicated throughout the specification by one or more reference numbers as superscripts, e.g., [x]. A list of these different publications ordered according to these reference numbers can be found below in the section entitled "References." Each of these publications is incorporated by reference herein.)

Elastomers have applications in soft electronics such as, but not limited to, capacitive pressure sensor (CPS) applications. One type of capacitive pressure sensing involves measuring the change in capacitance caused by deformation of a dielectric elastomer layer separating two electrodes. Elastomers are materials which can deform and subsequently rebound. In this application, elastomer selection determines critical sensor performance metrics such as sensitivity, sensing range, and cycling stability.

Traditional elastomeric dielectric layers are crosslinked networks of linear polymer precursors. For example, poly(dimethylsiloxane) (PDMS) is commonly used in soft robotics and sensor skins because it is commercially available in various formulations, such as Sylgard 184 (Dow Corning) and Ecoflex (Smooth-On Inc.). PDMS has a dielectric constant of 2.3-2.8 and is an excellent insulator.[1] However, if fully crosslinked, these materials exhibit a well-known lower bound on stiffness (circa $10^6$ Pa) that is characteristic of entangled polymer melts, thus placing an upper limit on the sensitivity of CPSs formulated therefrom.

Numerous strategies have been devised to achieve higher sensitivity CPSs with conventional elastomers. Researchers have micro-patterned Sylgard 184 dielectric layers using a multistep molding process to create linear and pyramidal features on the micron scale.[2] These air-elastomer composites reduce the effective modulus of the dielectric layer by minimizing elastomer area, therefore amplifying pressure and providing space to deform. Researchers have also developed elastomer foams—a different type of air-elastomer composite—which result in similar mechanical benefits through different processing routes. One popular literature method to create porous elastomer layers is the incorporation and dissolution of sacrificial particles (referred to as solid particle leaching), commonly sugar or salt granules.[3-5] Another technique involves the dispersion of water droplets into the elastomer matrix and subsequent removal by evaporation with heat post-curing.[6] While each of these routes has been shown to reduce the effective modulus and improve device sensitivity, they all require complex fabrication techniques and possibly suffer from sensor drift with varying humidity and pressure due to their porosity. Finally, partially curing the elastomer or swelling it with solvent can reduce the modulus, but leaching and evaporation can cause significant practical difficulties in applying such gels to real-world device applications.[7]

What is needed, then, are new dielectric materials for sensors that enable increased sensitivity without compromising manufacturability and reliability. The present disclosure satisfies this need.

SUMMARY OF THE INVENTION

The present disclosure describes the manufacture of bottlebrush polymers having versatile combinations of properties that can be tailored for particular applications.

Examples include, but are not limited to, the following.

1. a plurality of bottlebrush polymer molecules, each bottlebrush polymer molecule including;
   a backbone including a plurality of monomer units;
   a plurality of side chains, each of the side chains connected to one of the monomer units; and
   a plurality of crosslinker compounds having a composition suitable for crosslinking the different bottlebrush polymer molecules, wherein the crosslinker compounds are soluble in the bottlebrush polymer molecules so as to form a homogeneous mixture of the crosslinker compounds and the bottlebrush polymer molecules before crosslinking and so that the composition of matter is a single phase before the crosslinking.

2. The composition of matter of example 1, wherein at least one of the side-chains or bottlebrush backbones are crosslinked.

3. The composition of matter of example 1 or 2, wherein the backbone's monomer units before polymerization comprise a norbornene, a styrene, an acrylate, a (meth)acrylate, or an acrylamide.

4. The composition of matter of any of the examples 1-3, wherein the backbone has the structure:

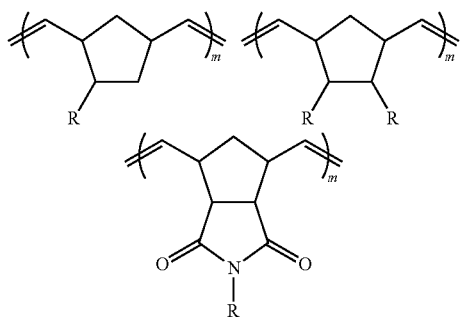

and m is an integer and R is a side-chain.

5. The composition of matter of any of the examples 1-4, wherein the side-chains comprise at least one compound selected from a polyester, a poly(ethylene oxide), a poly (dimethylsiloxane), a polyacrylate, and a polystyrene.

6. The composition of matter of example 1, wherein the bottlebrush polymer molecules each include at least one of the following structures:

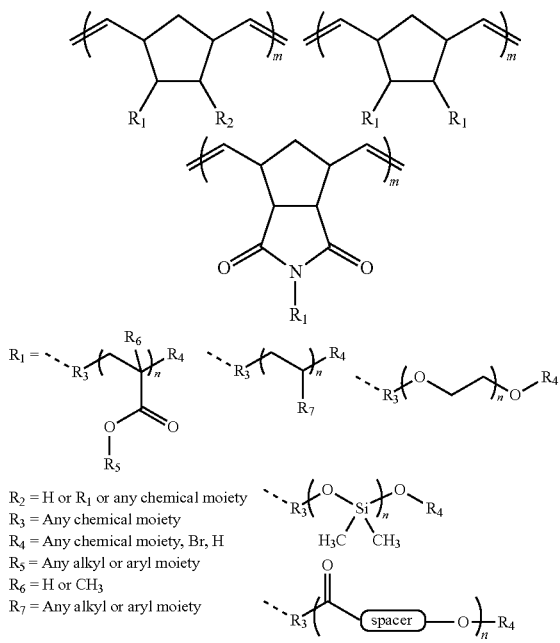

and m, n are integers and the spacer can be any divalent chemical moiety.

7. The composition of matter of example 1, wherein the crosslinker compounds comprise at least two units, each of the units comprising at least one of a benzophenone or a derivative thereof.

8. The composition of matter of example 1, wherein the crosslinker compounds comprise at least two azide units, or two cyclic ester (lactone) units.

9. The composition of matter of example 1, wherein the crosslinker compounds include a linker unit connecting benzophenone moieties whereby the linker unit structure includes a moiety also found in the side chains of the bottlebrush polymer.

10. The composition of matter of example 9, wherein:
the linker unit is a polyacrylate and the side chains comprise a polyacrylate, or
the linker unit is a polyester and the side chains comprise a polyester, or
the linker unit is a poly(ethylene oxide) or oligomeric (ethylene oxide) and the side chains comprise poly(ethylene oxide), or
the linker unit is poly(dimethylsiloxane) or oligomeric (dimethylsiloxane) and the side chains comprise poly(dimethylsiloxane).

10. The composition of matter of example 1, wherein the crosslinker compound comprises a branched alkane.

11. The composition of matter of example 1, wherein the bottlebrush polymer molecules comprise a copolymer having one or more compositions tuned to maintain the relative dielectric constant in the range 1-20 and maintain a glass transition temperature in the range of −150° C. to 15° C.

12. The composition of matter of example 1, wherein the composition of matter is solvent free.

13. The composition of matter of example 1, further comprising:
an amount of the crosslinker compounds in the composition of matter tuning a first number of the inter-molecular crosslinks and a second number of the intra-molecular crosslinks such that the composition of matter has a desired shear modulus in a range of 100 Pa-100 kPa.

14. An elastomer, actuator, or adhesive comprising the composition of matter of example 1. In one embodiment, the composition of matter including the bottlebrush polymer is a soft solvent-free dielectric elastomer.

15. A pressure sensor comprising the composition of matter of any of the examples 1-13, comprising:
a first electrode;
a second electrode; and
the composition of matter between the electrodes, wherein pressure applied to one of the electrodes is translated into an electrical signal by a compression of the composition of matter in response to the pressure.

16. The sensor of example 15, wherein the bottlebrush polymer is a dielectric layer in a high sensitivity capacitive pressure sensor. In one example, a dielectric layer bulk film of poly(dimethylsiloxane) (PDMS) bottlebrush polymer photo-crosslinked with a difunctional PDMS-based benzophenone forms an elastomer having a plateau shear modulus of only 6.2 kPa, two orders of magnitude lower than typical linear architecture elastomers. A pressure sensor prepared with this elastomer exhibits high sensitivity and a broad sensing range in comparison to a reference sensor of identical geometry prepared with Sylgard 184.

17. The pressure sensor of example 15, wherein:
the crosslinker compounds include a photo crosslinker that crosslink the side chains in response to irradiation with electromagnetic radiation, and
the composition of matter is photopatterned so as to locally crosslink the bottlebrush polymer and form the composition of matter including crosslinked and non-crosslinked regions.

18. An electrode comprising a composite including the composition of matter of any of the preceding embodiments combined with conductive material, wherein:
the electrode is flexible so as to be compliant to a device connected to the electrode, and
an amount of the conductive material is equal to or greater than a threshold amount required for percolation between the bottlebrush polymer molecules such that conductive pathways are formed in the composite between the bottlebrush polymer molecules.

19. The electrode of example 18, wherein the conductive material comprises conductive particles or fibers comprising at least one material selected from carbon black, graphite, graphene, carbon nanotubes, and metal.

The present disclosure further describes a method of making a device. Examples include, but are not limited to, the following.

20. A method of making a device, comprising:
depositing a composition of matter including a bottlebrush polymer in a device structure so as to form the composition of matter in a desired shape; and
crosslinking and curing the composition of matter, e.g., after the composition of matter is formed in the desired shape.

21. A method of making a pressure sensor, comprising:
depositing a composition of matter on a first electrode, the composition of matter including dielectric bottlebrush polymers; and
depositing a second electrode on the composition of matter, so that pressure applied to one of the electrodes is translated into an electrical signal by a thickness reduction or compression of the composition of matter in response to the pressure.

22. The method of example 21, wherein the composition of matter further includes crosslinker compounds and at least one of the electrodes is transparent to electromagnetic radiation, the method further comprising:
irradiating the composition of matter through the transparent electrode, wherein the irradiating induces the crosslinker compounds to crosslink the bottlebrush polymer.

23. The method of the example 21, wherein the composition of matter is a viscous liquid during the deposition of the composition of matter onto the first electrode and the composition of matter is later solidified by crosslinking.

24. The method of example 21, further comprising mixing an amount of crosslinker compounds with the dielectric bottlebrush polymers so as to form the composition of matter, each of the dielectric bottlebrush polymers having a plurality of side-chains, wherein the composition of matter includes intra-molecular crosslinks and inter-molecular crosslinks.

In one or more examples, due to the statistical nature of crosslinking reactions (e.g., benzophenone-induced radical reactions), a general model is also introduced to capture the relationship between crosslinker concentration and shear modulus in order to quantitatively control the mechanical properties of the networks. In one example, the amount of the crosslinker compounds is determined for a desired shear modulus of the composition of matter using a network model that models the shear modulus as a function of a first number of the inter-molecular crosslinks and taking into account a second number of the intra-molecular crosslinks that do not substantially contribute to the shear modulus. In one or more further examples, the function is a straight line characterized by a first fitting parameter (a) proportional to the first number of inter-molecular crosslinks and a second fitting parameter (b) proportional to the second number of intra-molecular crosslinks, the first fitting parameter is proportional to the slope of the straight line and a y-intercept of the straight line is proportional to the second fitting parameter, and the first fitting parameter and the second fitting parameter are extracted by fitting the measured shear moduli with the function for various compositions of matter having different side-chain and backbone lengths and crosslinker loadings.

25. The composition of matter of example 1, wherein the crosslinker compounds comprise photo crosslinker compounds having a functionality that absorbs electromagnetic radiation so as to undergo a change creating reactive functional groups, the reactive functional groups reacting with the bottlebrush polymer molecules so as to crosslink the bottlebrush polymer molecules.

26. The composition of matter of example 1, wherein the wt. % of the crosslinker compounds in the composition of matter is in a range of 0.005-10 wt. %.

27. The composition of matter of example 1, wherein the bottlebrush polymer molecules are crosslinked and the bottlebrush polymer molecules are covalently bonded to the crosslinker compounds.

The present disclosure further describes a composition of matter, comprising a network of photo crosslinked polymer molecules comprising crosslinks crosslinking the polymer molecules, the crosslinks comprising compounds formed from a reaction of the polymer molecules with reactive functional groups in crosslinker compounds added to the polymer molecules prior to crosslinking, the crosslinker compounds having a functionality that absorbs electromagnetic radiation and undergoing a change creating the reactive functional groups.

BRIEF DESCRIPTION OF THE DRAWINGS

Referring now to the drawings in which like reference numbers represent corresponding parts throughout:

FIGS. 4A-4D. Size exclusion chromatograms of different polyacrylate-based macromonomers and the corresponding bottlebrush materials, wherein FIG. 4A is for PMA, FIG. 4B is for PBA, FIG. 4C is for PEA, and FIG. 4D is for PFEA. Data from left to right indicate good control over bottlebrushes derived from poly(methyl acrylate) (PMA), poly(n-butyl acrylate) (PnBA), poly(ethyl acrylate) (PEA), and poly(2,2,2-trifluoroethyl acrylate) (PFEA).

FIG. 9A shows the PDMS bottlebrush formulations are photo-crosslinkable as evidenced by rheological analysis of $PDMS_{68}^{20}$-2 and $PDMS_{68}^{20}$-4 under UV light exposure (365 nm, 150 mW/cm$^2$; exposure begins at t=0). FIG. 9B shows frequency sweeps indicate the plateau storage modulus can be tuned by $N_{BB}$ and crosslinker loading. Measurements were taken at 21° C. and 1% strain. FIG. 9C shows elongation-at-break testing for a PDMS-based bottlebrush polymer with high gel fraction.

FIG. 10. Gel fraction and shear moduli summary of PDMS-based elastomers.

FIG. 11A: Thermogravimetric Analysis (TGA) of a poly(n-butyl acrylate) macromonomer and corresponding bottlebrush polymer ($N_{BB}$=13/$N_{SC}$=25) in an argon environment. FIG. 11B: Differential Scanning calorimetry (DSC) of the same poly(n-butyl acrylate) bottlebrush polymer, exo up. Ramp rate of 10° C./min. for both methods.

FIG. 16. Transparent and flexible sensor with a PDMS bottlebrush elastomer dielectric layer and ITO-coated PET electrodes.

FIG. 17A are sensor response curves (relative change in capacitance vs. applied pressure) show the bottlebrush elastomers enable improved sensitivity compared to crosslinked linear PDMS (Sylgard 184). Sensors were loaded and unloaded at a strain rate of $0.001\ s^{-1}$. FIG. 17B are cycling tests showing a trade-off between sensitivity and baseline stability. The sensors were cycled at 0.1 Hz with an 11 kPa pre-load and a 10 kPa wave amplitude, resulting in oscillation between 1-21 kPa. Note that the amplitude of oscillation remains relatively constant even as the baseline drifts.

FIG. 18. Table of sensor sensitivities in the low (0-10 kPa) and high (20-50) kPa pressure regimes along with comparison to our reference sensor prepared with Sylgard 184.

FIG. 21B: before UV crosslinking; FIG. 21C: after UV crosslinking using ultraviolet (UV) electromagnetic radiation). The insolubility results in an opaque blend which, when crosslinked, forms a poor quality elastomer which is uneven and brittle.

FIG. 22A shows a single $T_g$ is observed at a ramp rate of 20° C./min, which shifts to higher temperatures as the weight fraction of EMHbisBP increases. FIG. 22B shows the $T_g$ of PnBA-EMHbisBP and P4MCL-EMHbisBP blends obeys the Fox equation (dashed lines). Note that the actual concentration of EMHbisBP used to form all bottlebrush elastomers described hereafter is ≲2 wt %; no $T_g$ shift is detectable by DSC at such small loadings.

FIG. 25A Uncertainty in linkage functionality is captured by a, which should be bound by two limits: (1) the affine network model (a=3) as the functionality approaches infinity, and (2) the phantom network model (a=1) if all linkages are bifunctional. FIG. 25B The parameter b represents the number of elastically ineffective intra-bottlebrush crosslinkers (red) per molar mass of bottlebrush polymer (i.e., $n_{cl,i}$=bM). Experimentally, we find that b depends on the choice of polymer and crosslinker. FIG. 25C A smaller molar mass bottlebrush polymer leads to more elastically effective (inter-bottlebrush) crosslinkers (green) while the total number of crosslinkers per volume (red+green) remains constant.

FIG. 27 shows the photo-patterning process involves using a photomask to selectively expose regions of a bottlebrush thin film to 365 nm UV light, then rinsing away uncured portions with solvent. FIG. 27B shows optical micrograph of heart-shaped PDMS bottlebrush features (approximately 200 nm thick) on silicon, prepared by photo-patterning. FIG. 27C: To create a film with spatially-patterned stiffness, a higher modulus elastomer (Sylgard 184) was poured over the patterned bottlebrush features and cured. The composite structure was then peeled off the silicon surface and inverted to reveal the patterned surface. FIG. 27D: Atomic force microscopy indicates the spatially-varying modulus. Inset: The benzophenone-containing PDMS bottlebrush in a Sylgard 184 matrix imaged by fluorescence microscopy.

FIGS. 28A-28B. The pyrene/P4MCL bottlebrush copolymer that improves solvent-based dispersion quality of carbon nanotubes, wherein FIG. 28A is a schematic of the bottlebrush polymer and FIG. 28B illustrates the structure of the bottlebrush polymer.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Section A: Example Compositions of Matter Including Bottlebrush Polymers

Figure 1:
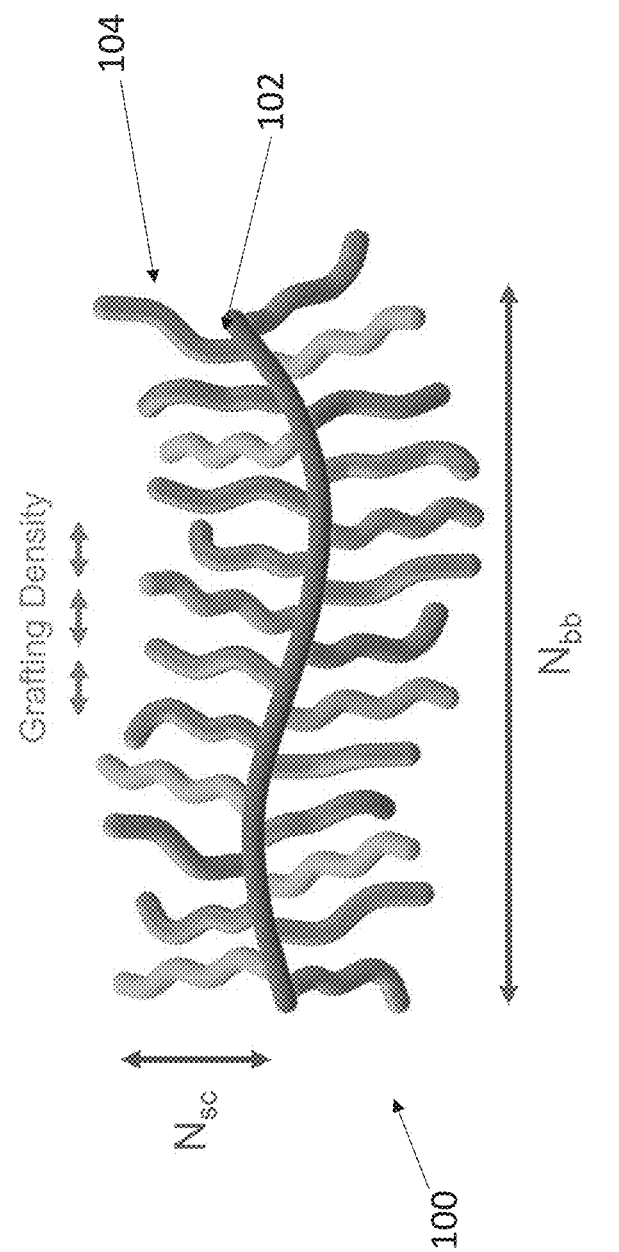
FIG. 1. The bottlebrush architecture has three key parameters: backbone degree of polymerization, $N_{bb}$ (grey), side chain degree of polymerization, $N_{sc}$ (blue), and side chain grafting density (green).

FIG. 1 illustrates the bottlebrush polymer architecture comprising a backbone chain and long side chains densely attached to the backbone. Architectural parameters that can be used to tune performance include the backbone degree of polymerization $N_{BB}$, the side chain degree of polymerization $N_{SC}$, and the grafting density (number of side chains per backbone monomer). This architecture may be chemically assembled in three different ways:

(1) graft-to, wherein pre-polymerized side chains are attached to a pre-polymerized backbone, and
(2) graft-from, wherein monomers are polymerized from a pre-constructed polymer backbone, and
(3) graft-through, wherein the side chains are pre-polymerized with an active end group which may then be used to link the side chains together.

The successful polymerization of the bottlebrush architecture was enabled by the development of controlled polymerization techniques such as atom transfer radical polymerization (ATRP), reversible addition-fragmentation chain-transfer polymerization (RAFT), and ring opening metathesis polymerization (ROMP).[8]

This highly branched molecular design tends to minimize chain entanglements, resulting in "super-soft" materials with a significantly lower bulk shear modulus than linear analogues, even in the absence of solvent.[9,10] Early work on these materials focused on fundamental mechanics, rheology, and scaling laws, while more recent work has brought light to potential applications in the field of soft robotics. Dielectric actuators made with a bottlebrush elastomer dielectric layer were shown to achieve significant actuation at fields of <10 V/μm.[11]

The present disclosure reports on methods and structures enabling high performance pressure sensors. First, synthetic methods to access new bottlebrush polymer materials are described. Then, small molecule crosslinker additives that create the dielectric elastomer and facilitate the fabrication of devices are also discussed.

1. Example Synthesis of Bottlebrush Polymers

Figure 2:
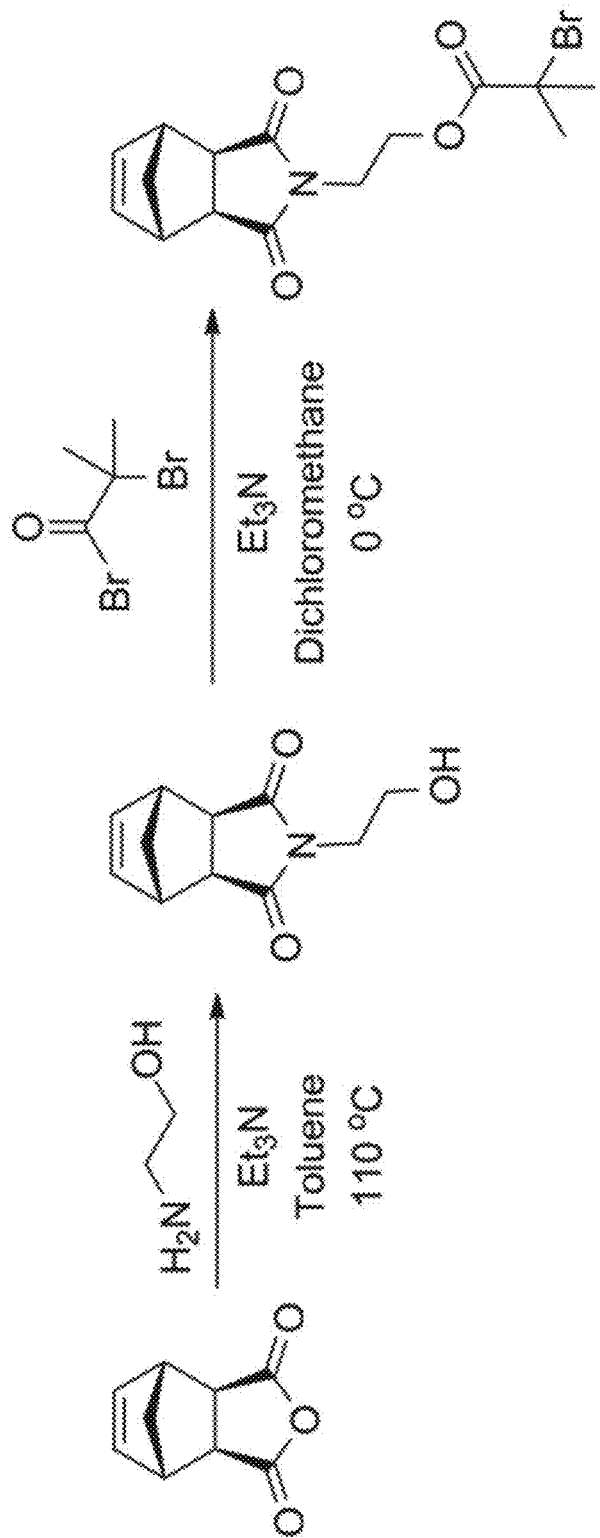
FIG. 2. Synthesis of a norbornene ATRP initiator.
Figure 3A:
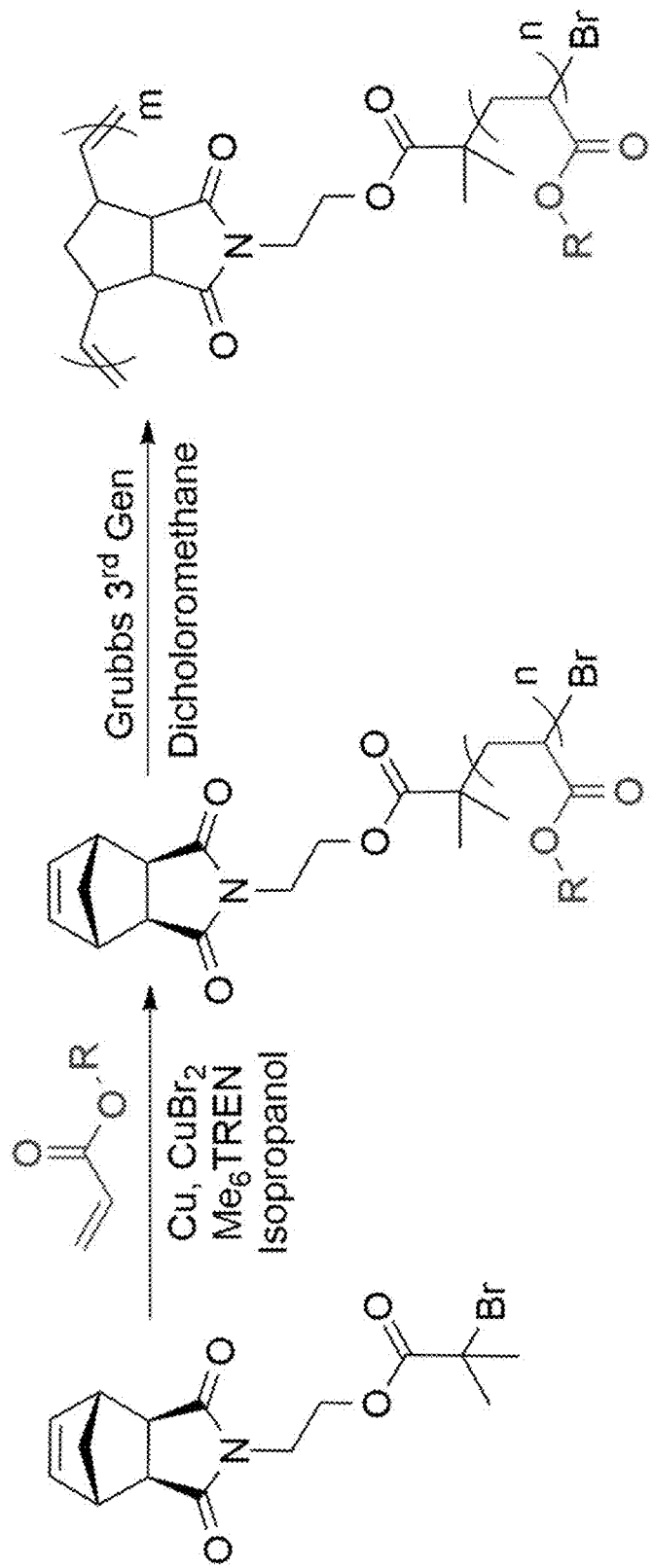
FIG. 3A. A general synthetic protocol for bottlebrush polyacrylates using consecutive ATRP and ROMP.

A synthetic procedure was developed to create bottlebrush polymers from a variety of different constituent chemistries using grafting-through ring-opening metathesis polymerization (ROMP). This approach guarantees 100% grafting density and is general to virtually any class of bottlebrush polymers by functionalizing linear chains with a norbornene terminus and subsequently performing ROMP. High molecular weight bottlebrush polymers can be readily achieved and scaled-up by this approach. FIG. 2 illustrates an example wherein a norbornene-based initiator was synthesized for atom-transfer radical polymerization (ATRP). Subsequent polymerization of acrylates via Cu(0)/Cu(II)-based ATRP under mild conditions (FIG. 3A,) produces norbornene-functionalized polymers. These resulting "macromonomers" are then directly polymerized using ROMP to construct the bottlebrush backbone (FIG. 3A, right) with Grubbs catalyst; many different monomers are compatible with the specific ATRP protocol described in FIGS. 2-3, including styrenes, (meth)acrylates, and acrylamides. As shown in FIG. 4, we have demonstrated the synthesis of multiple polyacrylate bottlebrush polymers (R=methyl, ethyl, n-butyl, and 2,2,2-trifluoroethyl in FIG. 3A) using this methodology.

Figure 3B:
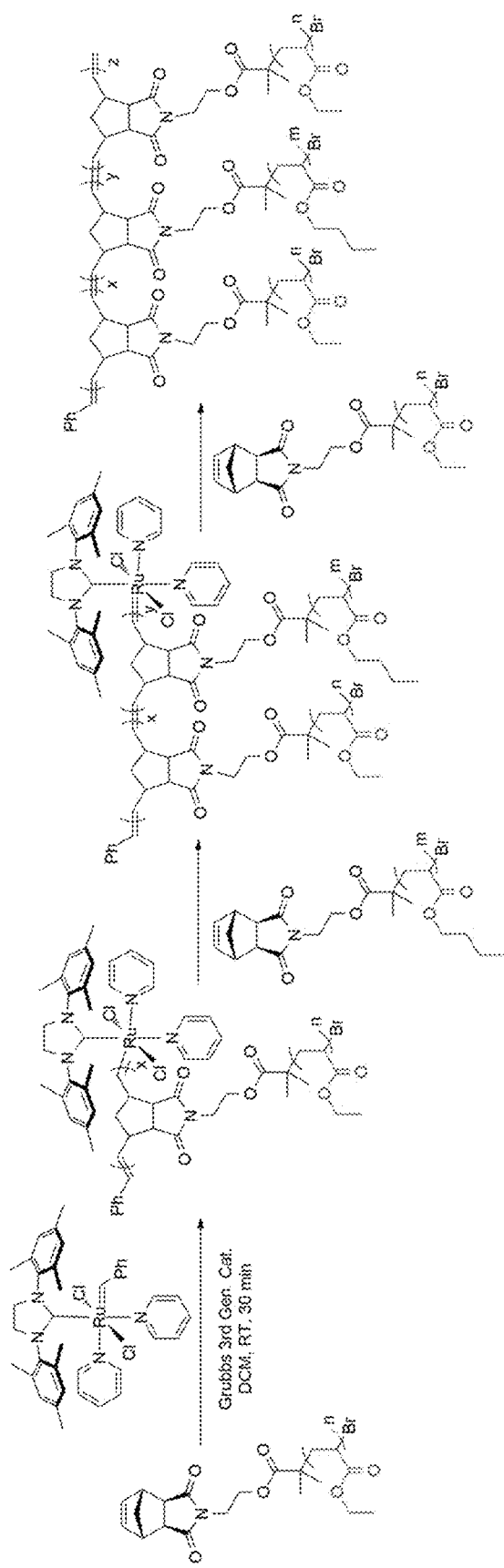
FIGS. 3B-3F. Synthetic method examples for various bottlebrush polymers.

Using two different polyacrylate macromonomers, we demonstrated the synthesis of ABA triblock structures via sequential macromonomer addition after completion of each step (FIG. 3B). After the three-step process, we were able to achieve almost quantitative conversions. This proof-of-concept method can be applied in various combinations to form a vast variety of materials.

We have also used synthetic end-group modification and ring-opening polymerization strategies to obtain various other classes of bottlebrush polymers, e.g., poly(dimethylsiloxane) (PDMS), poly(ethylene glycol) (PEG, also named poly(ethylene oxide) or PEO) and polyesters (as depicted, poly(4-methyl-ε-caprolactone)) and their copolymers (FIGS. 3C-3F, and FIG. 6). These materials provide opportunities to develop and fine-tune the properties of different dielectric elastomer materials.

a. Polyesters

Figure 3C:
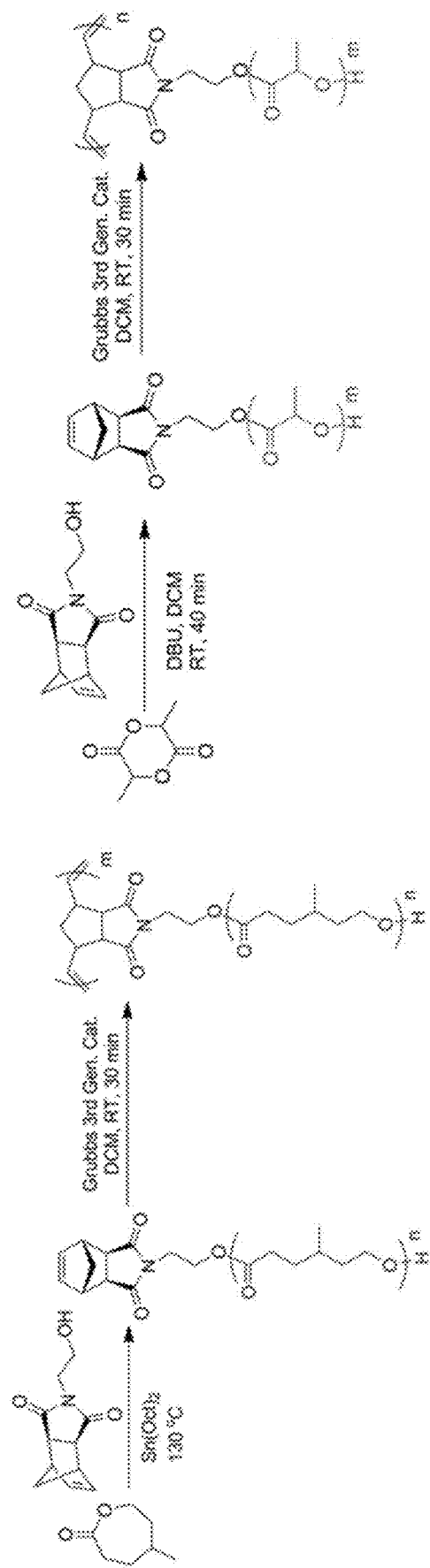

FIG. 3c illustrates a synthetic route to synthesize different classes of polyesters containing a norbornene end group. These can be used as macromonomers to form bottlebrush polymers using ROMP. We used ring-opening polymerization methods to form two different classes of polyesters. As shown in FIG. 3C, P4MCL {poly(4-methyl-ε-caprolactone)} and PLA {poly(lactic acid)} bottlebrush polymers were synthesized.

Figure 3D:
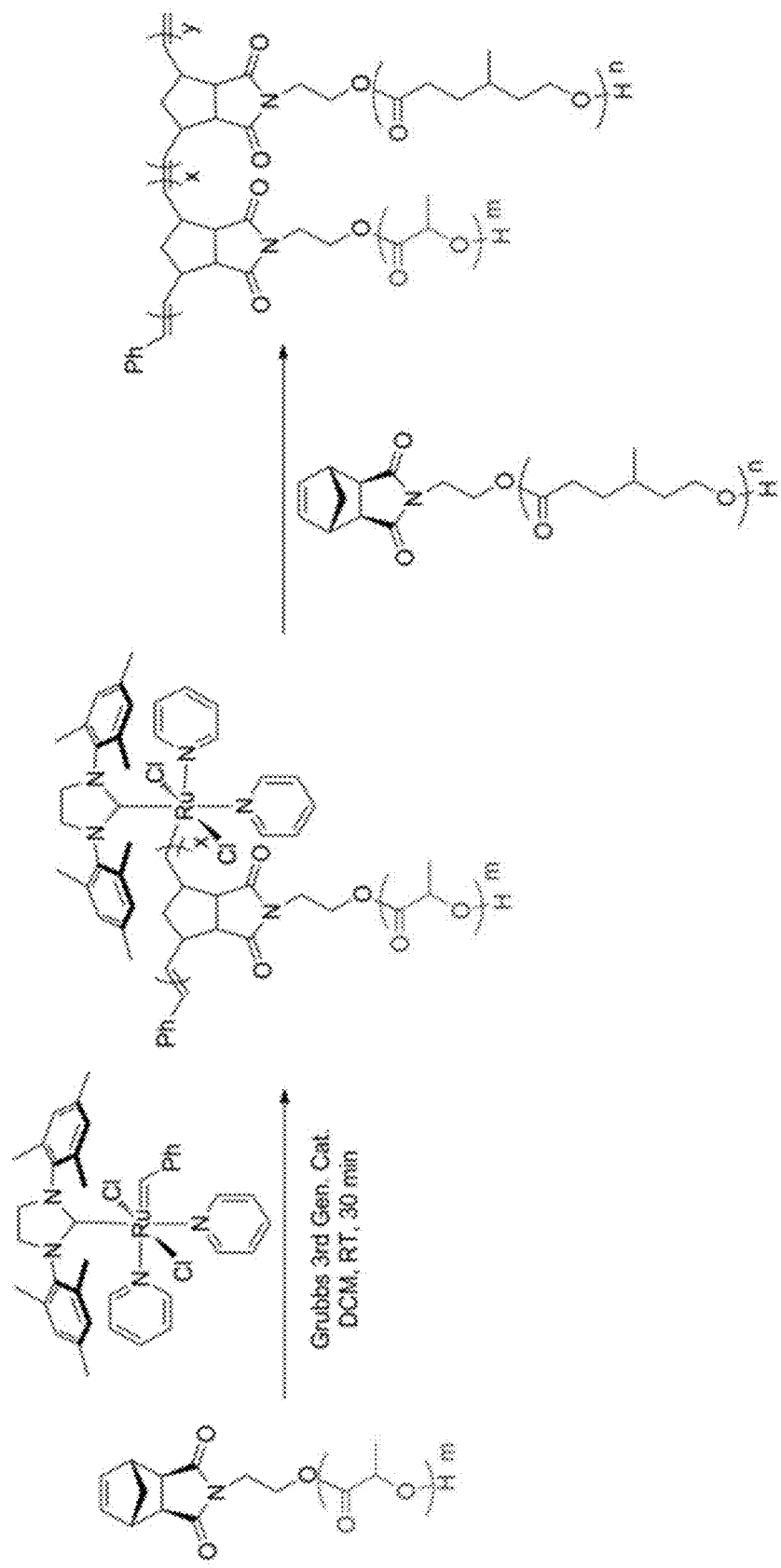

These two polymers have very different glass transition temperatures, and their copolymerization creates opportunities to fine-tune mechanical properties. A diblock bottlebrush structure was successfully synthesized by stepwise addition of the macromonomers during ROMP, as illustrated in FIG. 3D.

b. PDMS

Figure 3E:
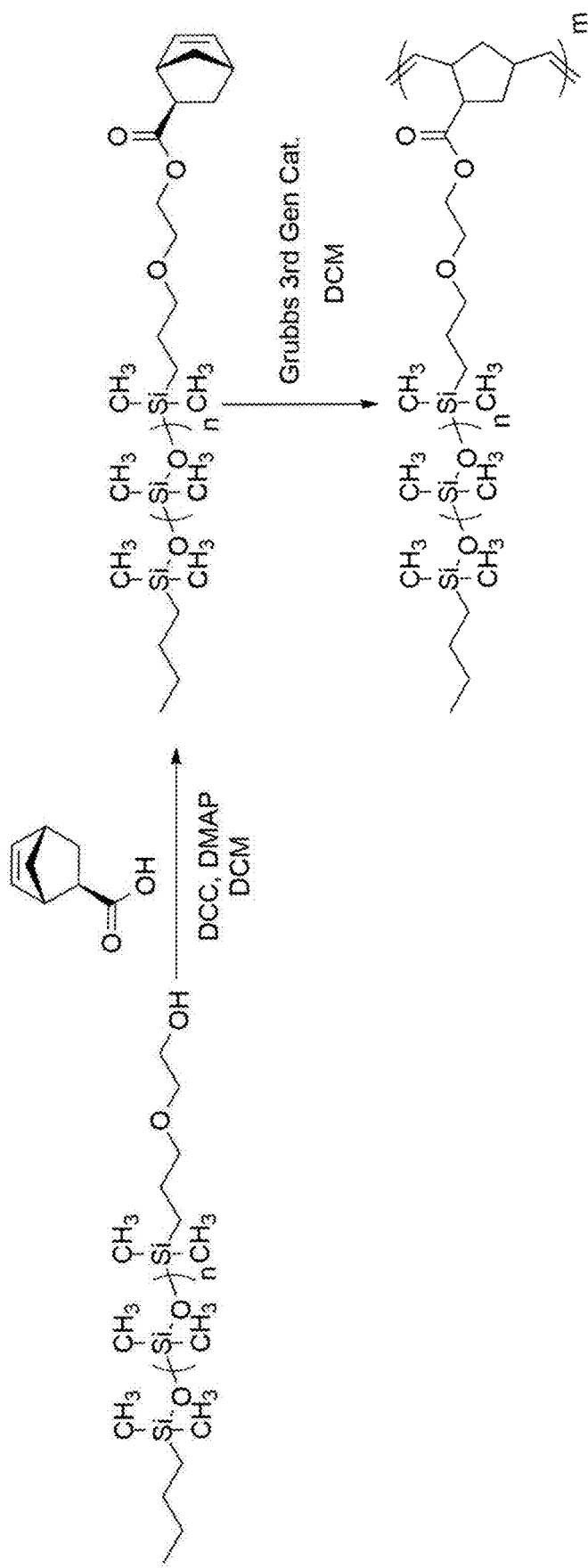
Figure 3E:
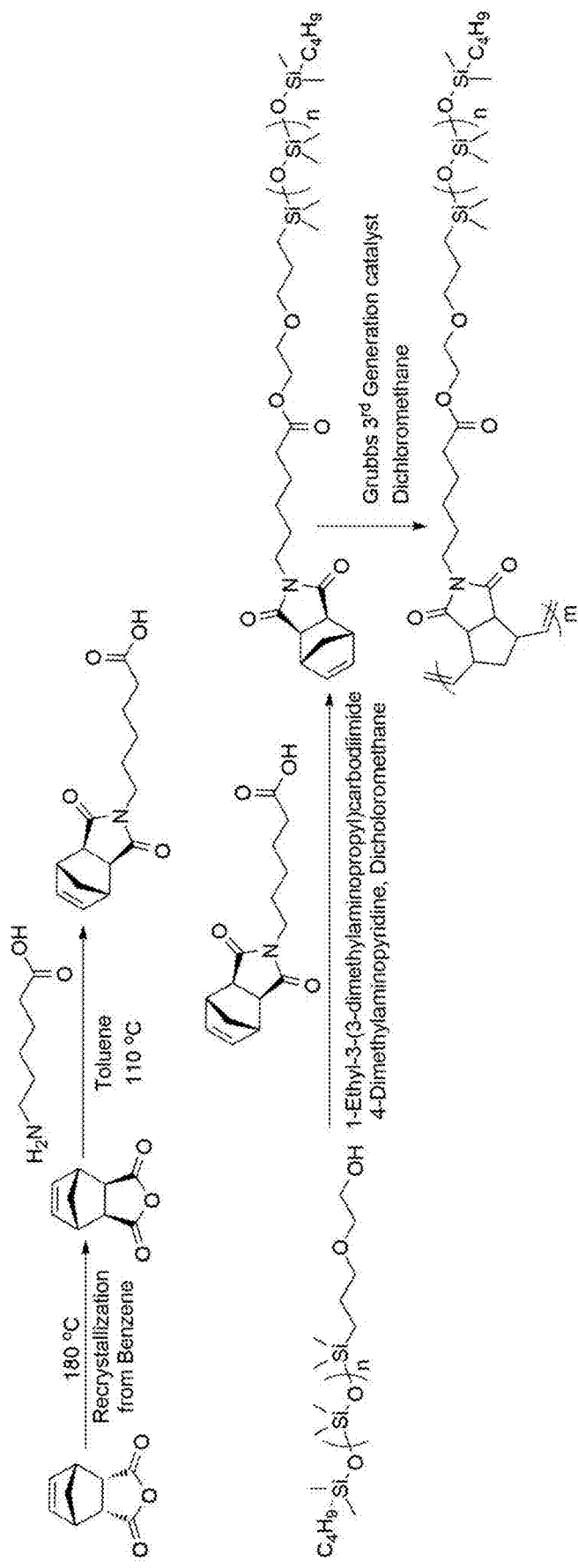
Figure 5:
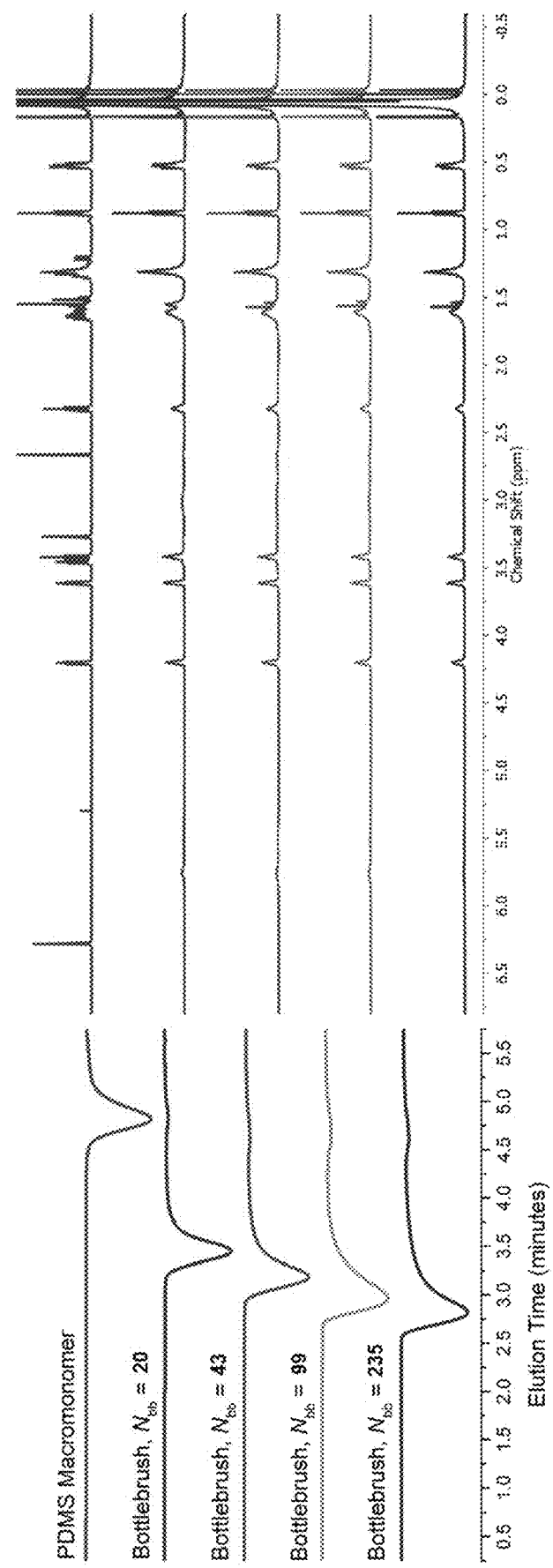
FIG. 5. SEC (left) and $^1$H NMR (right) characterization data for PDMS macromonomer and bottlebrush polymers with different backbone degree of polymerization ($N_{bb}$).
Figure 6:
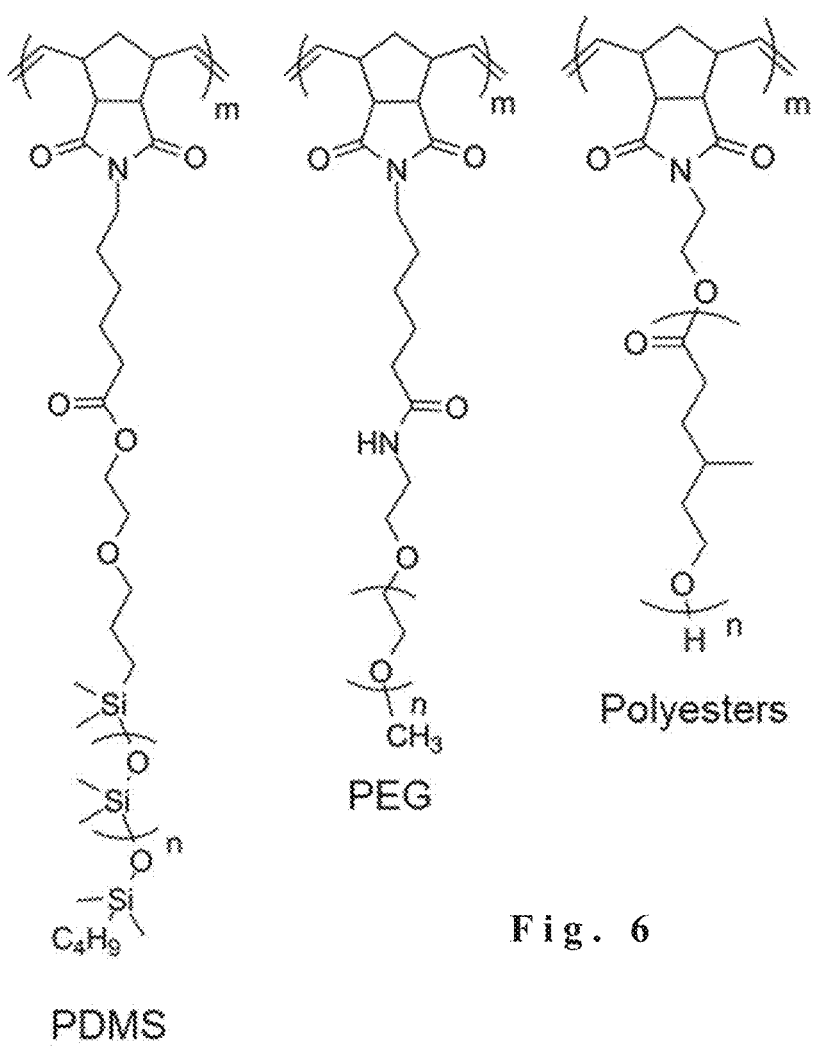
FIG. 6. Chemical structures of bottlebrush poly(dimethylsiloxane) (PDMS), poly(ethylene glycol) (PEG) and poly(4-methyl-ε-caprolactone)/polyesters.

Starting from commercially available low molecular weight PDMS, we were able to synthesize terminally norbornene functionalized macro-monomers which can be polymerized using ROMP to form bottlebrush polymers (FIG. 3E). A hydroxyl-functionalized PDMS was coupled with exo-5-norbornenecarboxylic acid to form the norbornene containing PDMS macromonomer. The molecular weight could be fine-tuned using different ratios of the macromonomer and the Grubbs' catalyst. Bottlebrush materials based on PDMS were synthesized from commercially available polymers, which can be easily modified to introduce a terminal norbornene moiety. These macromonomers were polymerized using ROMP to form the bottlebrush architecture. FIG. 3E illustrates a number of different pathways to synthesize PDMS macromonomers. Following the second route, we synthesized a series of PDMS bottlebrush with varying 'backbone degree of polymerization' ($N_{BB}$=20, 43, 99 and 235, according to multi-angle light scattering (MALS) data). The SEC and NMR characterization of the polymers are demonstrated in FIG. 5.

In order to reduce the cost significantly, we synthesized a norbornene-functionalized carboxylic acid that is conveniently obtained on large scale. EDC (1-ethyl-3-(3-dimethylaminopropyl)carbodiimide) catalyzed coupling of this molecule with a hydroxyl functionalized PDMS forms the macromonomer, which can be polymerized using ROMP to form the bottlebrush material. The backbone length ($N_{bb}$) for such polymers can be fine-tuned by controlling the amount of Grubbs' $3^{rd}$ generation catalyst used for the polymerization. We used acid-alcohol coupling reaction to synthesize the PDMS macromonomer in large quantities (35 g scale). We have been able to polymerize relatively larger quantities of macromonomers using ROMP at relatively dilute conditions (e.g., 30 g of macromonomer in 900 mL solvent) that produce low dispersity (Đ<1.15) with conversion greater than 95% by size-exclusion chromatography. The PDMS bottlebrush polymers are viscous liquids (zero-shear viscosity $\eta_0$=2-55 Pa·s).

c. PEG

Figure 3F:
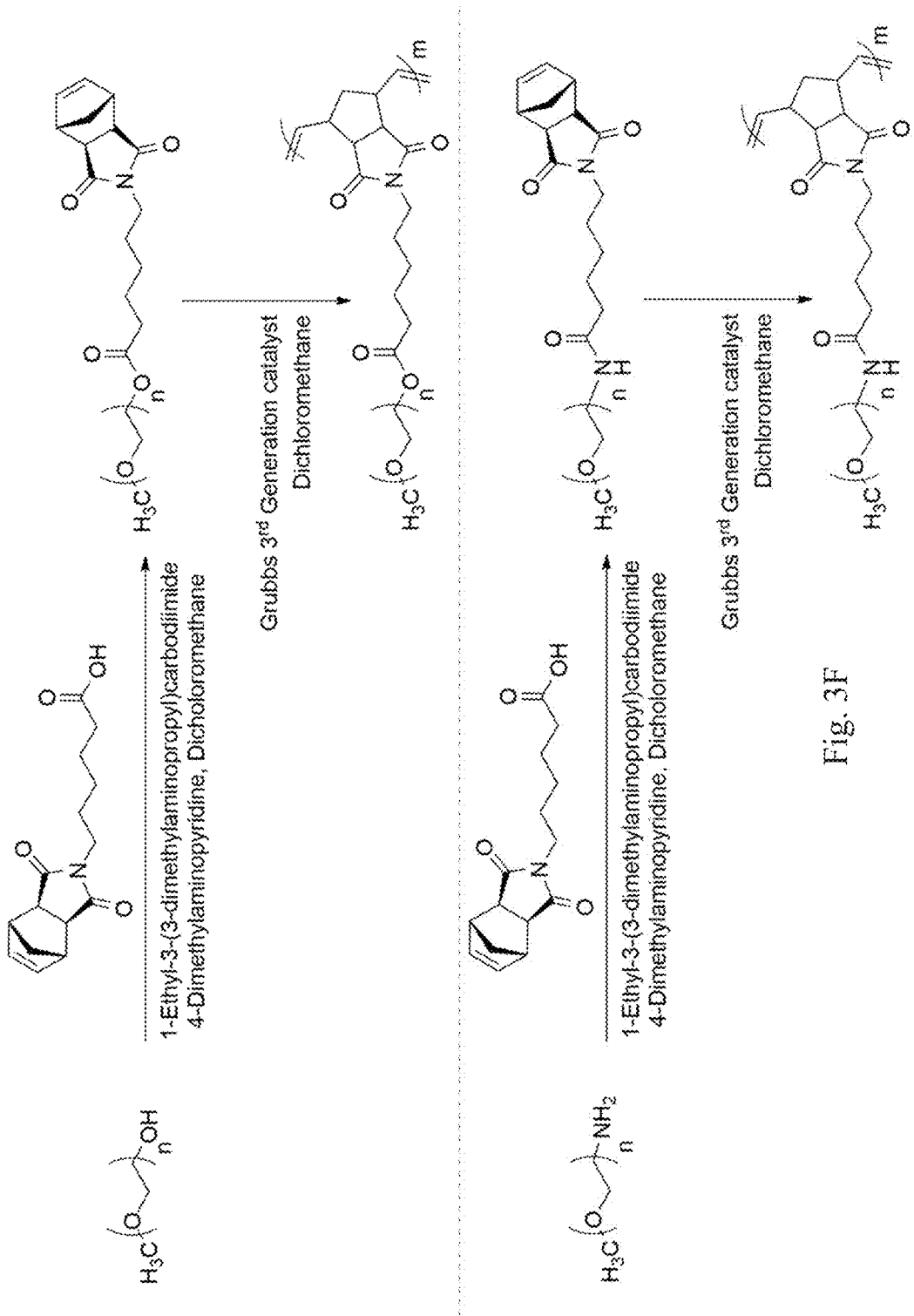

Similar to the previously mentioned synthetic routes, commercially available PEG materials can be functionalized to obtain macromonomers which can be polymerized using ROMP. FIG. 3F illustrates that PEG macromonomers can be synthesized using a mono-functional PEG precursor and the norbornene-functionalized carboxylic acid. We used two different schemes to form PEG macromonomers from commercially available functionalized polymers. PEG-based bottlebrush materials have a low dispersity (Đ=1.15) when synthesized using a methoxy-PEG-amine (3 kDa) available from JenKem Technology USA.

d. Fine Tuning Side Chain Length

Figure 7:
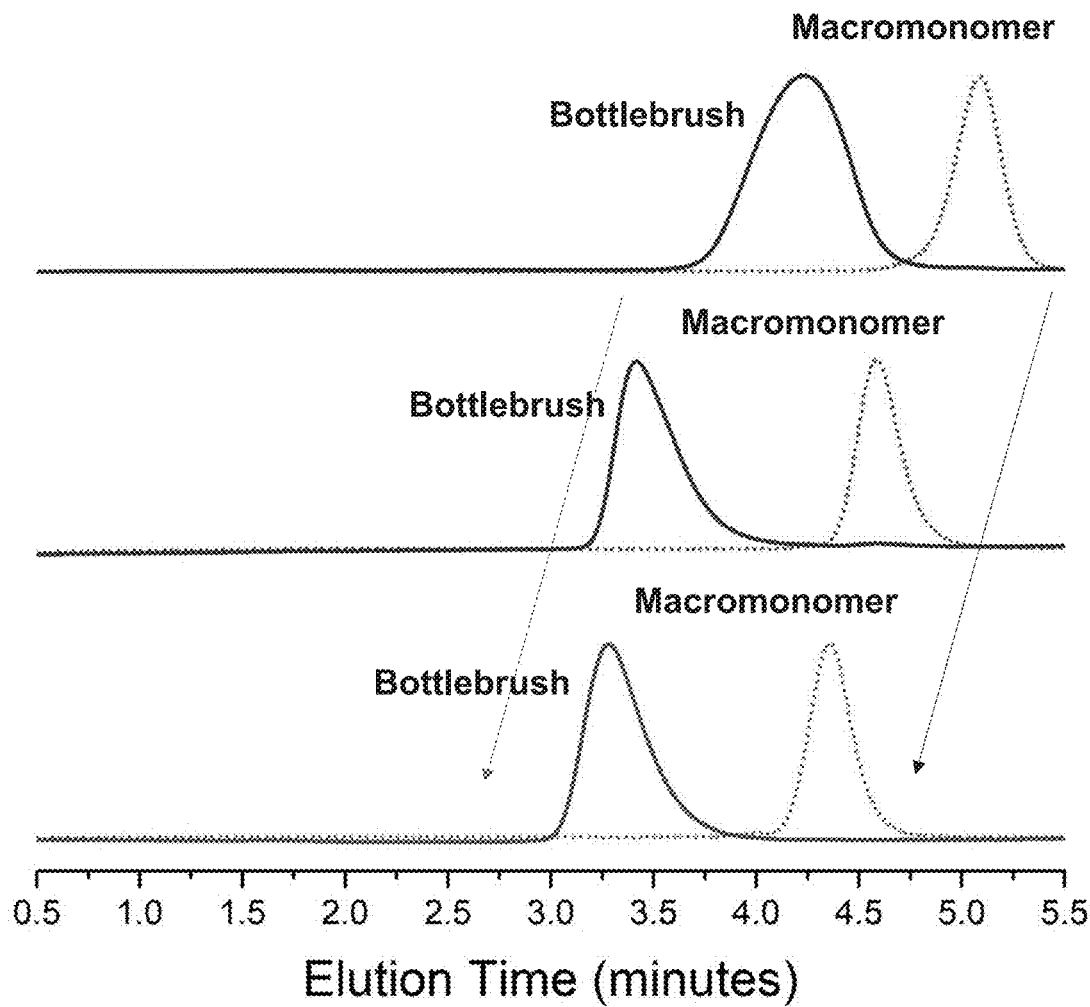
FIG. 7. SEC traces of a series of PnBA macromonomers (dashed lines) synthesized using Cu(0)/Cu(II) catalyzed ATRP and the corresponding bottlebrush materials (solid lines) synthesized using ROMP.

We have successfully optimized ATRP conditions to fine-tune the molar mass of poly(n-butyl acrylate) (PnBA) macromonomers. FIG. 7 illustrates SEC characterizations of a series of bottlebrush polymers with varying PnBA side-chain length while maintaining low molar mass dispersity (Đ<1.2).

TABLE 1

| | Bottlebrush Polymer | | | | Macromonomer | | | |
|---|---|---|---|---|---|---|---|---|
| Sample code | $M_n$ (kDa) | $N_{bb}$ | $M_w/M_n$ | dn/dc (ml/g) | Sample code | $M_n$ (kDa) | $M_w/M_n$ | dn/dc (ml/g) |
| PN(PnBA$_{40}$)$_{100}$ | 466 | 95 | 1.21 | 0.0650 | PnBA$_{40}$ | 4.91 | 1.01 | 0.0651 |
| PN(PnBA$_{39}$)$_{60}$ | 284 | 59 | 1.21 | 0.0657 | PnBA$_{39}$ | 4.82 | 1.06 | 0.0661 |
| PN(PnBA$_{39}$)$_{25}$ | 118 | 24 | 1.05 | 0.0655 | | | | |
| PN(PnBA$_{100}$)$_{10}$ | 147 | 12 | 1.24 | 0.0648 | PnBA$_{100}$ | 12.4 | 1.02 | 0.0646 |

Key variables that control the success of PnBA synthesis via Cu(0)/Cu(II) catalyzed ATRP are solvent, reaction time, and temperature. For example, using isopropanol as a solvent, we were able to obtain relatively short and low $M_n$ macromonomers in 3-4 hours. However, such conditions are not suitable for the synthesis of relatively high $M_n$ macromonomers in a facile manner. We discovered that solvents like dimethylsulfoxide (DMSO) result in much faster reactions, allowing the formation of high $M_n$ macromonomers within hours. However, to obtain well-defined materials with very low dispersity, the conversion must be limited to 10-15%, which necessitates using relatively large amounts of monomer (n-butyl acrylate).

The availability of these library of macromonomer materials can be used to form either homopolymers, random copolymers or block polymers as desired for the targeted applications.

Monomers that can be used for the synthesis of macromonomers may include but are not limited to alkyl acrylates, butyl acrylates, methyl acrylates, ethyl acrylates, methacrylates, methyl methacrylates, styrenes, acrylamides, acrylonitrile, (meth)acrylamides, vinyl pyridine, vinyl acetate, isobutene, ethylene oxide, alkyl methacrylates, lactides, caprolactones, dimethylsiloxane. Any polymerizable monomers by radical, anionic, cationic, coordination or ring-opening polymerization processes may be used for the preparation of backbones and side chains. The polymerization process may be a controlled or living radical, anionic, cationic, ring-opening polymerization or others. Living radical polymerization process includes but not limited to cobalt-mediated radical polymerization (CMRP), reversible complexation mediated polymerization (RCMP), reversible addition-fragmentation chain-transfer (RAFT), atom transfer radical polymerization (ATRP), and stable free radical polymerization (SFRP), represented by nitroxide mediated polymerization (NMP).

The macromonomers may also be synthesized by coupling reactions of a functional monomer with an end-functionalized polymer chain, include but not limited to polyethers, polysiloxanes, polyacrylates, polyesters, polyacrylamides, polyacrylonitriles, polylactides, poly (ethylene oxide)s, poly(dimethylsiloxane)s, polystyrenes, poly(N-vinyl pyrrolidinone), and polyolefins (e.g. polyethylene).

Bottlebrush block copolymers (diblock, triblock, tetrablock etc.) and random copolymers may be formed by copolymerizing any selection of two or more macromonomers mentioned above sequentially or simultaneously.

Graft density of the bottlebrush polymers may be adjusted by sequentially or simultaneously copolymerizing one or more of the above macromononers with one or more of the above monomers (spacer) in a certain ratio, to form comb polymers with smaller grafting density (fewer side chains) than bottlebrush polymers.

In one or more embodiments, the bottlebrush polymers comprise the general structures:

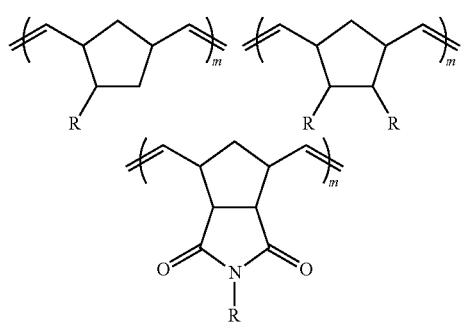

and m is an integer between 5 to 5000 and R is a side chain. The side chains R along the polymer backbone can be the same or a combination of different type of side chains (copolymer).

In one or more embodiments, the bottlebrush polymers comprise the general structures:

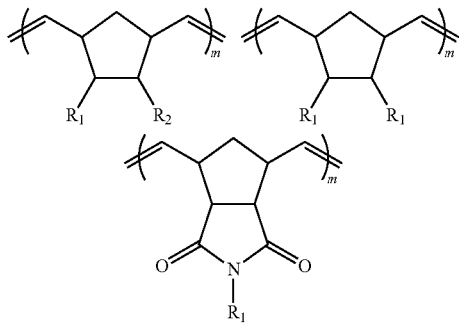

and m is an integer between 5 to 5000 and $R_1$ is a side chain. $R_2$ is hydrogen, a side chain or any chemical moiety. The side chains $R_1$ along the backbone can be the same or a combination of different type of side chains.

In some embodiments, the bottlebrush polymer molecules each include at least one of the following structures:

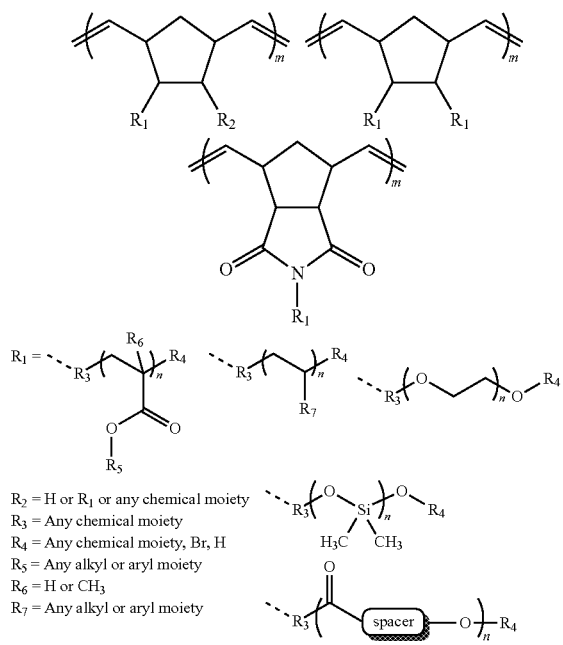

and m is an integer between 5 to 5000, n is an integer between 1 to 500. The spacer can be nothing or any divalent chemical moiety that links the carbonyl and the oxygen. The side chains $R_1$ along the backbone can be the same or a combination of different type of side chains. $R_3$ can be any divalent chemical moiety which covalently links the bottlebrush polymer backbone and the side chains. Examples of $R_3$ include but not limited to optionally substituted alkylene, optionally substituted alkenylene, optionally substituted alkynylene, optionally substituted arylene, optionally substituted ester-diyl, optionally substituted ether-diyl, optionally substituted amide-diyl, the combination hereof and these listed in FIGS. 3A-3F and FIG. 6. The chemical moieties for $R_2$ and $R_4$ can be independently selected from, but not limited to hydrogen, optionally substituted alkyl, optionally substituted alkenyl, optionally substituted alkynyl, optionally substituted carbocyclyl, optionally substituted aryl, optionally substituted heterocyclyl, halides, and the combination hereof.

Alternatively or additionally, the chemical moieties may be independently selected from alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, fluoroalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheterorayl, nitrocarbocyclyl, nitroacyl, nitroaralkyl, amino ($NH_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, alkyl sulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocydyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate and phosphate groups.

The term "aryl" refers to a monovalent aromatic carbocyclic group of from 4 to 30 carbon atoms having a single ring (e.g., phenyl) or multiple condensed rings (e.g., naphthyl or anthryl), where condensed rings may or may not be aromatic provided that the point of attachment is at an aromatic carbon atom. Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. An aryl group may be optionally substituted by one or more optional substituents as herein defined.

The term "alkyl" refers to monovalent straight, branched, or cyclic aliphatic hydrocarbon groups having from 1 to 50 carbon atoms. Examples of straight, branched or cyclic alkyl chains include but not limited to methyl, ethyl, n-propyl, n-butyl, n-pentyl, n-hexyl, n-heptyl, octyl, nonyl, decyl, undecyl, dodecyl, tridecyl, tetradecyl, pentadecyl, hexadecyl, heptadecyl, octadecyl, nonadecyl, eicosyl, isopropyl, sec-butyl, tert-butyl, 1,2-dimethylpropyl, 1,1-dimethylpropyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 6-methylheptyl, 1-methylheptyl, 1,1,3,3-tetramethylbutyl, 1-, 2-, 3-, 4-, 5-, 6- or 7-methyloctyl, 1-, 2-, 3-, 4- or 5-ethylheptyl, 1-, 2- or 3-propylhexyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, dimethyloctyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1- pentylhexyl, 1-, 2-, 3-, 4-, 5-, 6-, 7-, 8-, 9- or 10-methylundecyl, 1-, 2-, 3-, 4-, 5-, 6-, 7- or 8- ethyldecyl, 1-, 2-, 3-, 4-, 5- or 6-propylnonyl, 1-, 2-, 3- or 4-butyloctyl, 1-, 2-pentylheptyl, branched butyl, pentyl, hexyl, heptyl, octyl, nonyl, decyl, undecyl, dodecyl, tridecyl, tetradecyl, pentadecyl, hexadecyl, heptadecyl, octadecyl, nonoadecyl, eicosyl with one or more branch points at any carbon of the alkyl chain, such as 2 (or 1, or 3, or 4)-ethylhexyl, 2 (or 1, or 3, or 4)-hexyldecyl, 2 (or 1, or 3, or 4)-octyldodecyl, 2 (or 1 or 3, or 4)-butyloctyl, 4 (or 1, or 2, or 3, or 5, or 6)-butyldecyl, 5 (or 1, or 2, or 3, or 4, or 6, or 7)-butylundecyl, 6 (or 1, or 2, or 3, or 4, or 5, or 7, or 8)-butyldodecyl, 12 (or 1, or 2, or 3, or 4, or 5, or 6, or 7, or 8, or 9, or 10, or 11, or 13, or 14)-butyloctadecyl, mono- or polycyclic alkyl groups such as cyclopropyl, cyclobutyl, cyclopentyl, cyclohexyl, cycloheptyl, cyclooctyl, cyclononyl, cyclodecyl, trifluoromethyl, 2,2,2-trifluoroethyl, pentafluoroethyl, and the like.

The side chains may have an average molecular weight below the critical molecular weight for entanglements.

In some embodiments, the bottlebrush polymer backbone and/or side chains may have a dielectric constant in the range of 1-20. In another embodiment, the bottlebrush polymer may have a dielectric constant in the range of 5-20. In yet another embodiment, the bottlebrush polymer may have a dielectric constant in the range of 10-20.

2. Example Crosslinkers a. Photo-crosslinker

In order to decouple the polymerization and the crosslinking process, we developed a generalizable photo-crosslinking system where small molecules or polymers are terminally functionalized with two benzophenone moieties. Using an external material as an additive to facilitate crosslinking also facilitates fine-tuning the concentration of crosslinking units, which impacts the mechanical properties of the bottlebrush network.

Figure 8A:
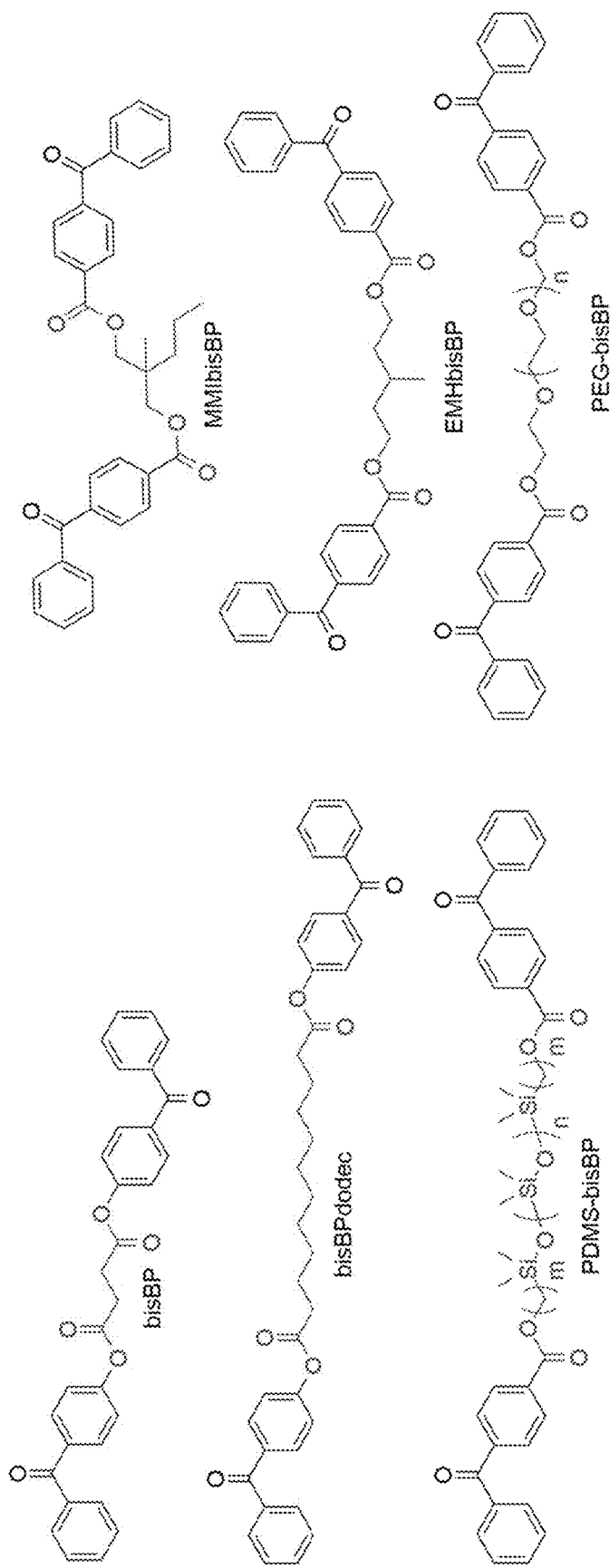
FIG. 8A. Chemical structures of the photo-crosslinkers, collectively named as bisBP derivatives.
Figure 8B:
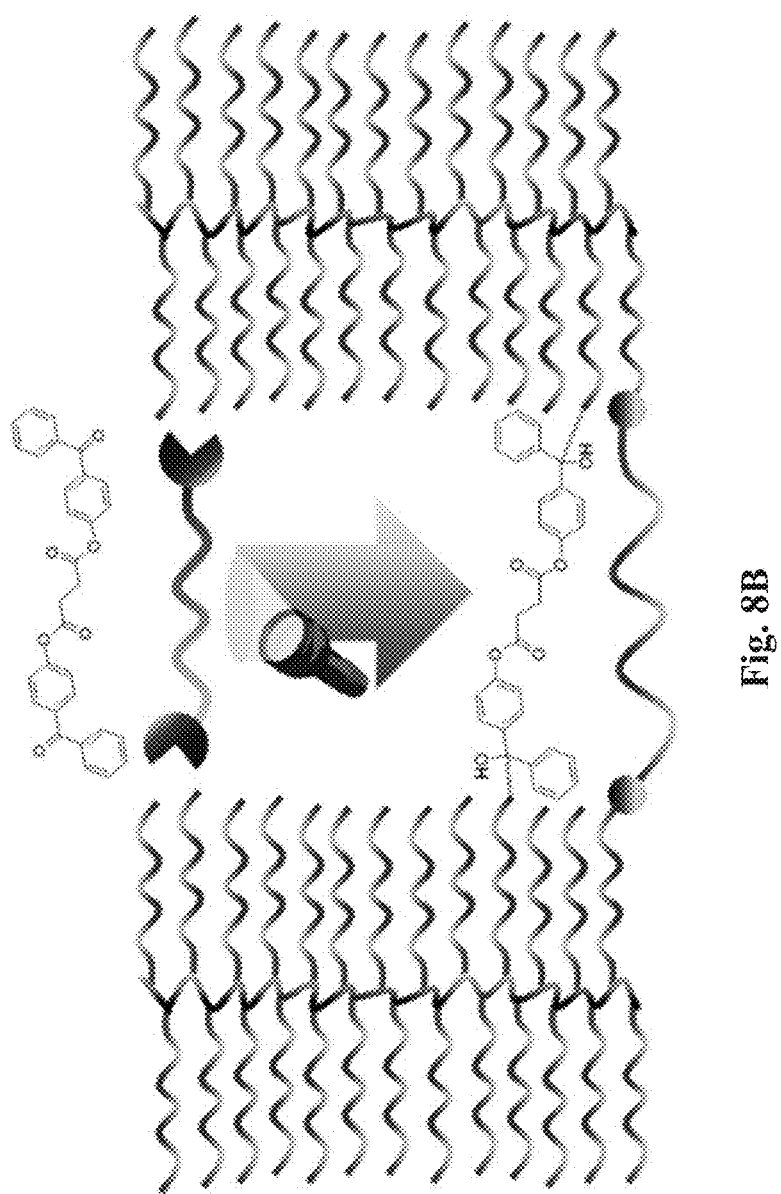
FIG. 8B Schematic representation of one possible photo-crosslinking mechanism enabled by bis-benzophenone-based additives.
Figure 8C:
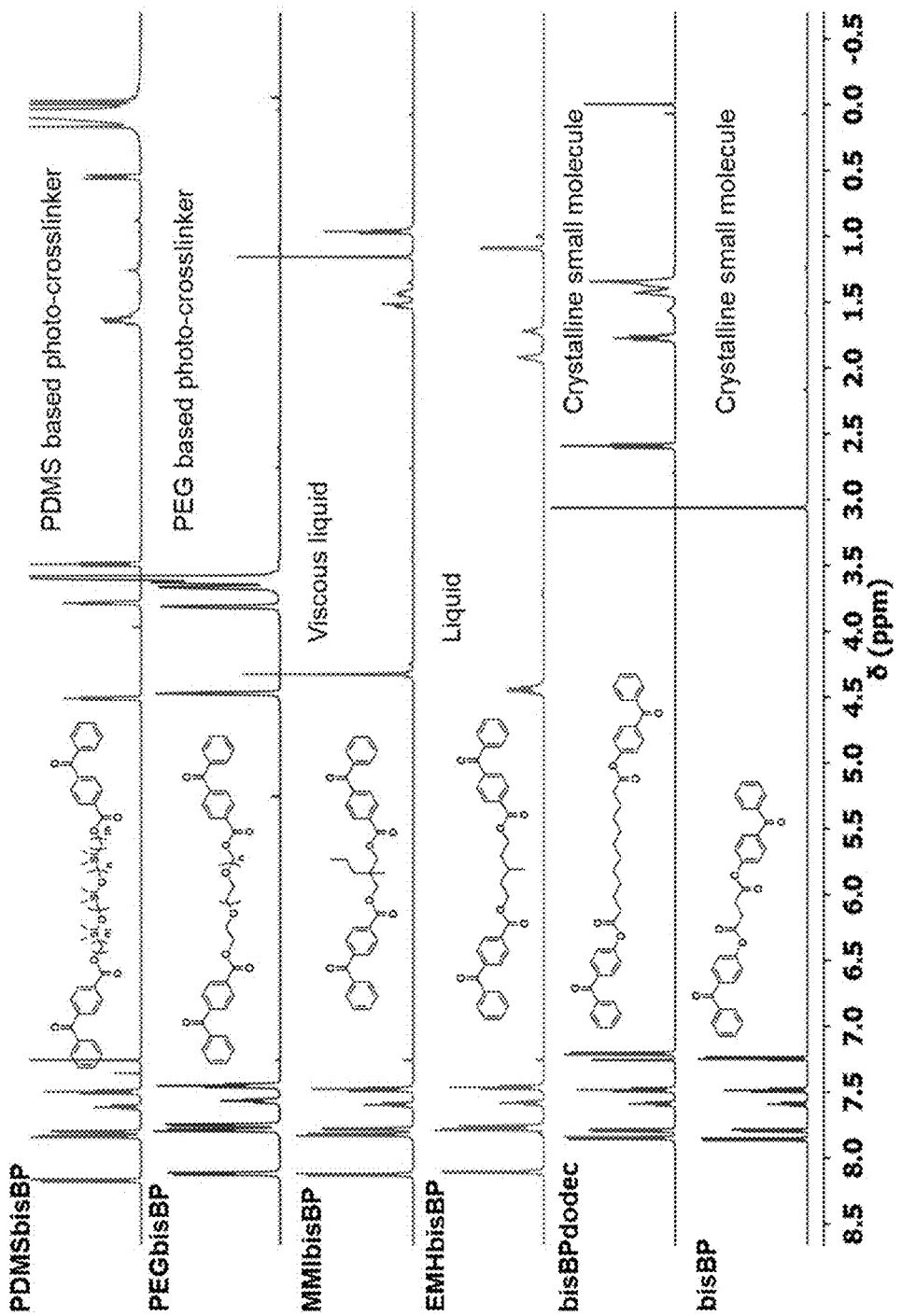
FIG. 8C. Characterization of a series of benzophenone-based photo-crosslinker molecules. Physical properties and solubility depend on the linkage, which fine tunes compatibility with different bottlebrush polymers.

A library of photo-crosslinkers was synthesized to enable the fabrication of pressure sensor devices from bottlebrush polymers (Scheme 1 and FIGS. 8A-8C). Advantages of this approach include decoupling the bottlebrush synthesis and crosslinking chemistries, thereby enabling precise material design and sensor integration.

A series of bis-benzophenone-based small molecules, oligomers, and polymers (Scheme 1 and FIGS. 8A-8C) were synthesized and used for crosslinking different classes of bottlebrush polymers (e.g., polystyrenes, polyacrylates, polymethacrylates, polyesters, PDMS, PEO etc.).

Figure 21A:
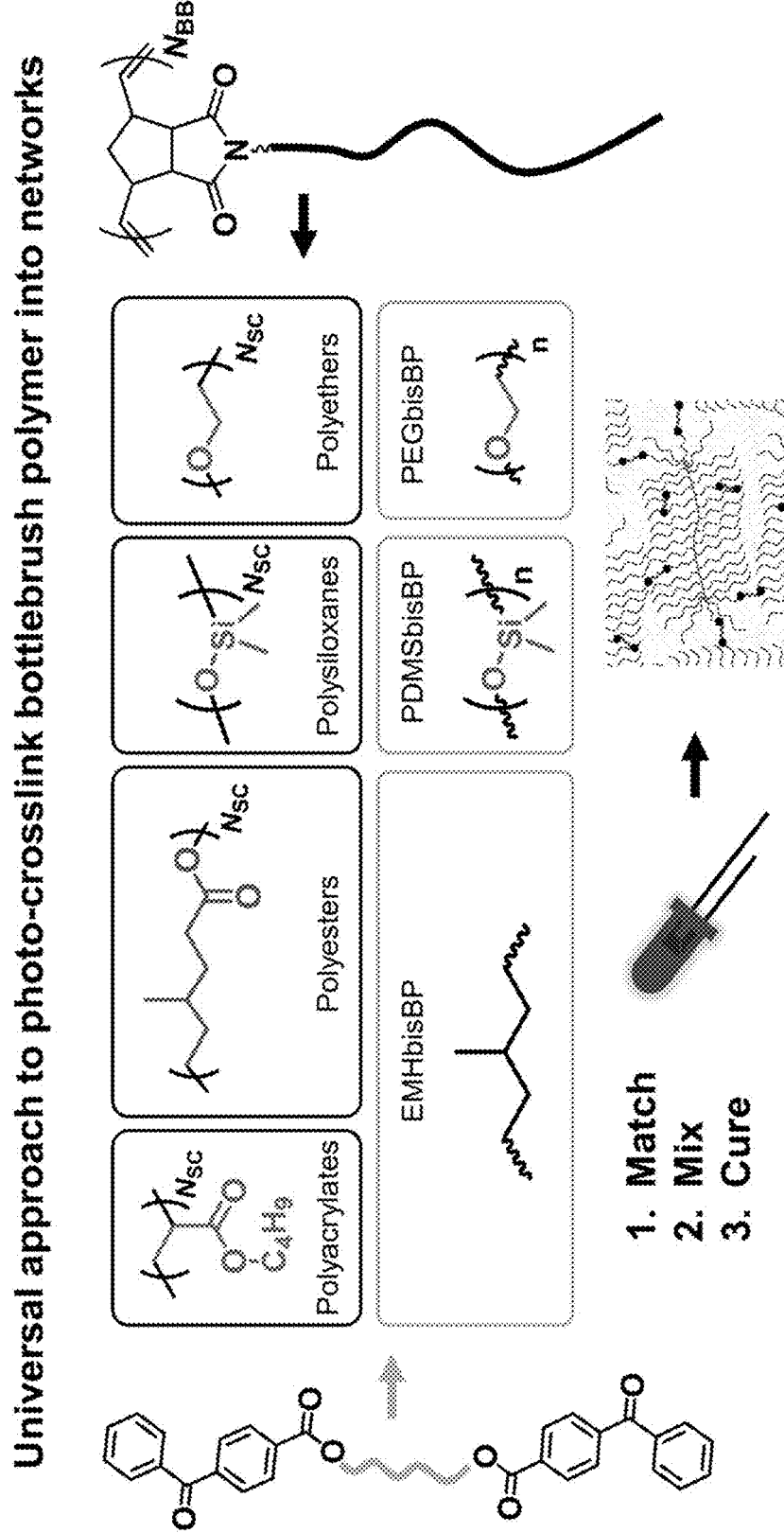
FIG. 21A: Chemical structures of the photocrosslinkers and bottlebrush polymers. Soluble pairs (PDMS-PDMSbisBP, PEO-PEGbisBP, PnBA-EMHbisBP, and P4MCL-EMHbisBP) can be photo-crosslinked using 365 nm LED light.
Figure 21C:
FIGS. 21B-21C. Photographs of bisBP in a PnBA bottlebrush.
Figure 21B:
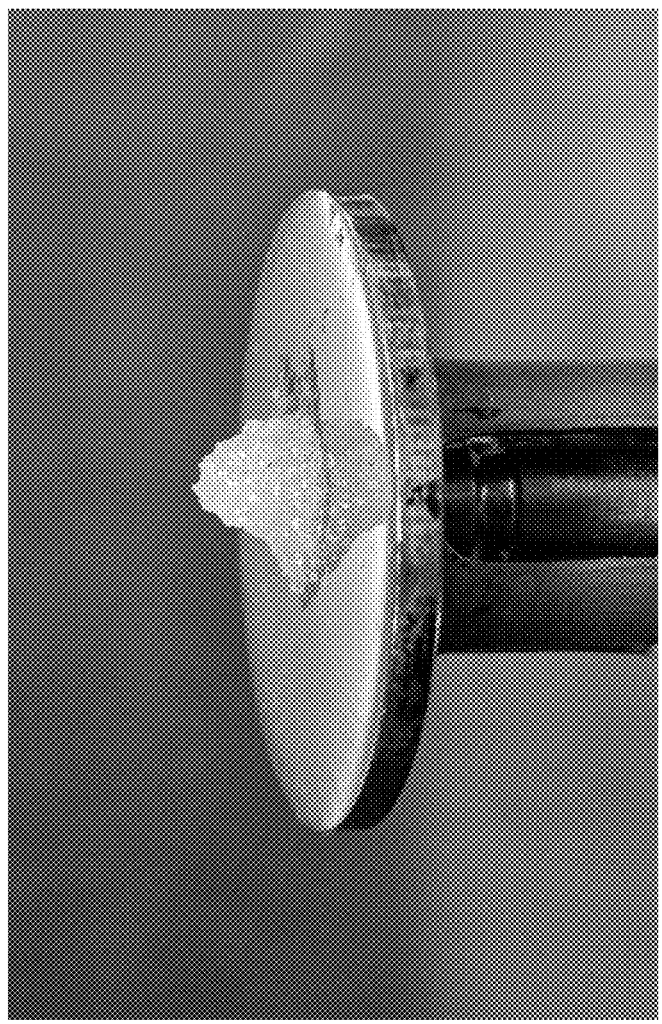
Figure 21D:
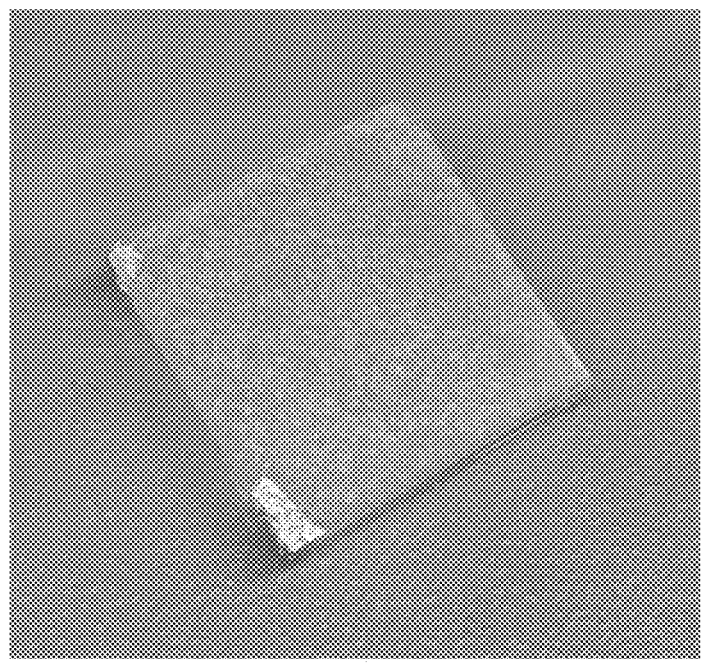
FIG. 21D Photograph of bisBP in a PDMS bottlebrush (the blend is between two ITO-coated glass substrates). The white flecks observed in the blend are the bisBP crystals, indicating insolubility.
Figure 21F:
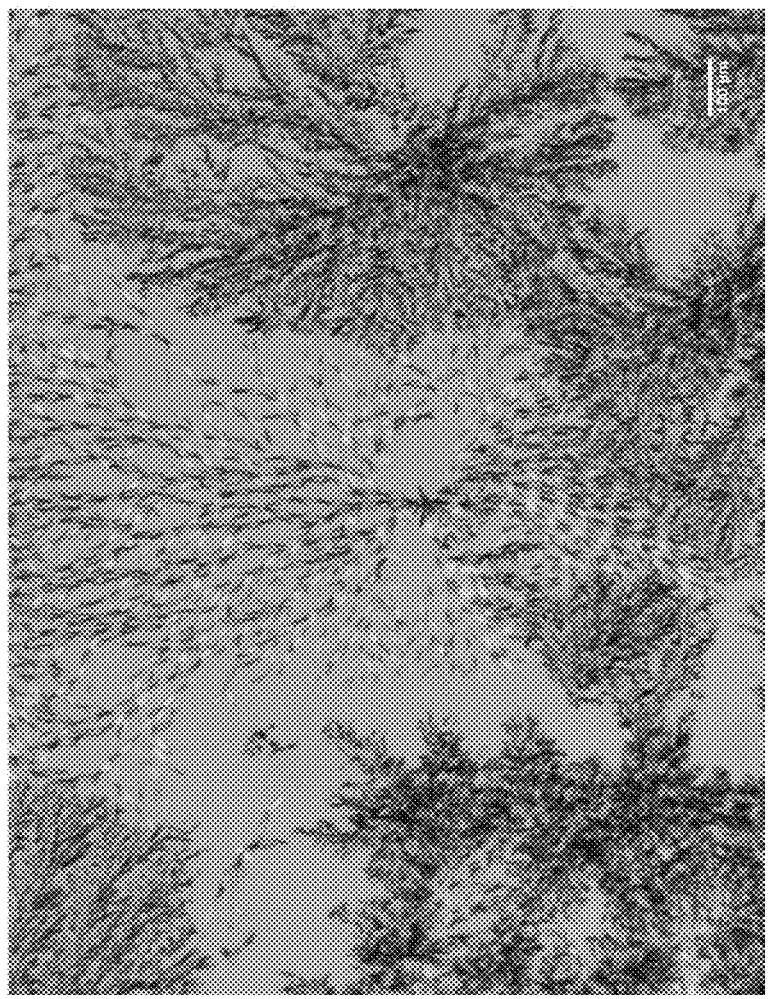
FIG. 21F. Optical microscope image of the bisBPdodec crystals in a film of the blend.
Figure 21E:
FIG. 21E: Photograph of bisBPdodec in a PnBA bottlebrush. The crystallization of bisBPdodec results in the white areas seen in the vial.

In order to fine tune the physical properties of each compound (solid vs. liquid, crystalline vs. amorphous) and solubility in different bottlebrush polymers (e.g., polyacrylates, PDMS, and polyesters), a number of linkage motifs were investigated. The solubility of each derivative in non-polar and polar polymers differs drastically. Photo-crosslinkers with linear alkylene spacers (e.g., bisBP, bisBPdodec) were found to be crystalline at room temperature with high melting points ($T_m$=145° C. for bisBP and 100° C. for bisBPdodec, respectively), and not dissolve well in bottlebrush polymers. We first tried to dissolve BisBP in PDMS or PnBA bottlebrush polymers in a common good solvent. However, BisBP crystalizes out of the blends during solvent removing. FIGS. 21B, C and 21D show photographs of mixtures of bisBP in poly(n-butyl acrylate) and PDMS bottlebrushes at room temperature. Blends of photo-crosslinkers and bottlebrush polymers which are insoluble or have low solubility do not crosslink effectively (i.e. do not form a solid elastomer or result in a poor-quality elastomer). BisBP doesn't dissolve well in PDMS and PnBA bottlebrush polymers under heating at elevated temperatures. When a long linear alkane-diyl (e.g. decylene) is used as the linker, the resulting BisBPdodec becomes soluble in PnBA bottlebrush when the blend is heated such that the crystallized photo-crosslinker melts and is dispersed throughout the polymer matrix. However, BisBPdodec crystallizes and phase-separates when the blend is cooled to room temperature. This process is cumbersome and reduces the ease and versatility of UV crosslinking. FIG. 21E shows a photograph and optical microscopy image of bisBPdodec crystals in a poly(n-butyl acrylate) bottlebrush at room temperature.

While linear alkyl linkages resulted in crystalline solids, branched alkanes produced either liquid or wax-like solids. These additives exhibit excellent compatibility with the polyacrylates and other materials described in FIGS. 3-6. The bisBP systems linked with branched alkylene chains include materials that are waxy solids (e.g., MMIbisBP, also called MMPbisBP) or liquids (e.g., EMHbisBP). Liquid crosslinkers can dissolve in bottlebrush polymers (e.g., poly(n-butyl acrylates) bottlebrush) at room temperature without requiring the presence of a solvent or elevated temperatures to induce and/or maintain solubility. The polymer chain linked molecules are viscous liquids at room temperature, (e.g. PDMS linked bisBP system (PDMS-bisBP) is a liquid and very soluble in PDMS based bottlebrush materials at room temperature), which is beneficial for processing, e.g., solvent free and additive-free polymer crosslinking and device fabrication which is a big advantage for commercial production and long-term device stability.

Scheme 1: Chemical structures of the photo-crosslinking molecules that have been synthesized.

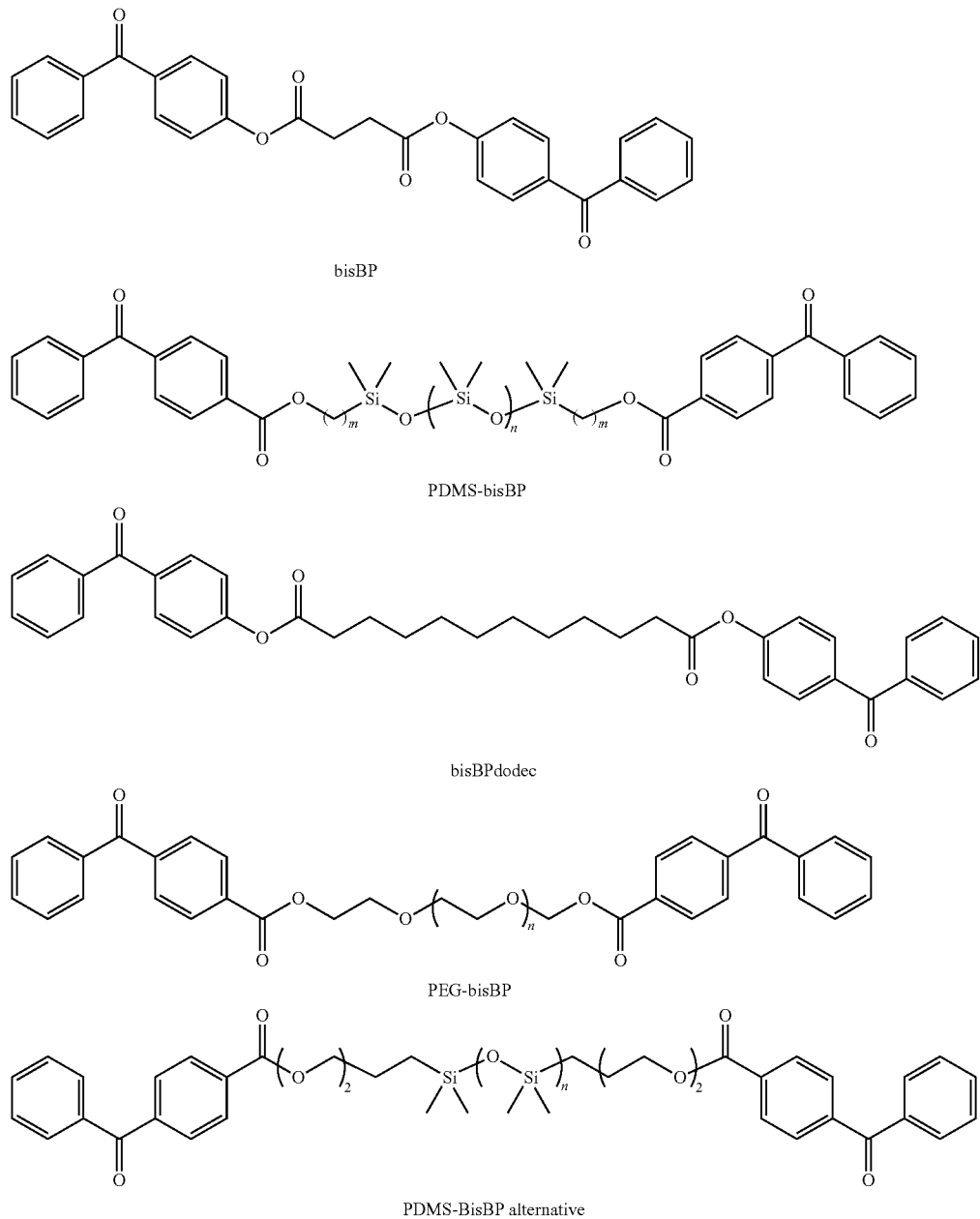

b. Liquid Small Molecules for Photo-crosslinking

As described herein, small molecules, terminally functionalized with two benzophenone moieties, can be effective photo-crosslinkers for bottlebrush polymers. In order to fine-tune the solubility of such molecules with different classes of polymers, the linkage connecting each photo-crosslinker was adjusted. Non-linear alkyl chains were selected for lowering melting points to produce liquids at room temperature. Thus, using 3-methylpentane-1,5-diol and 2-methyl-2-propylpropane-1,3-diol, two liquid or waxy photo-crosslinkers (EMHbisBP and MMPbisBP, respectively) were synthesized via Steglich esterification (Scheme 3). Both compounds are soluble in materials such as poly (n-butyl acrylate) without the use of any solvent or heat.

Scheme 2: Synthetic routes to EMHbisBP and MMPbisBP.

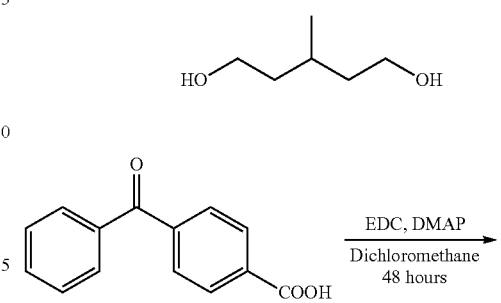

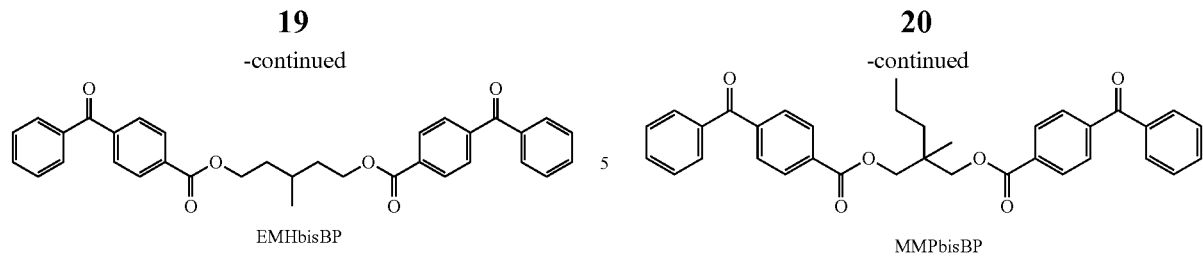

EMHbisBP

MMPbisBP c. 'Azide' Functionalized Small Molecule for Thermal-crosslinking

Bottlebrush polymers can also be thermally cross linked. In one example, the cross linker comprises organic azide moieties, which decompose when exposed to heat (or UV-light) into reactive nitrene intermediates that can crosslink organic polymers. Note that the C/N atomic ratio should be larger than 3 to ensure safe handling of small molecule azides. We therefore synthesized bis-azide-dodec using a two-step route (Scheme 3). The compound was characterized using NMR and is apparently stable under ambient conditions and after application of mechanical shock. Thermal crosslinking of bottlebrush polymers can be achieved with bis-azide-dodec. The solubility of such molecules in different classes of brush polymers can be optimized by adjusting the linkage connecting each azide, similar to the optimization of bis-benzophenone based crosslinkers.

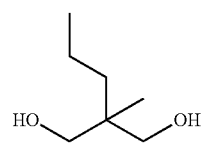

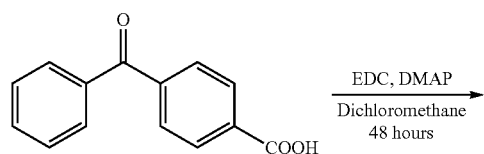

Scheme 3: Synthetic route to bis-azide-dodec.

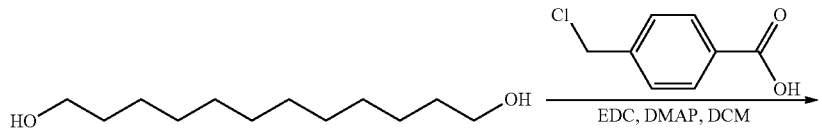

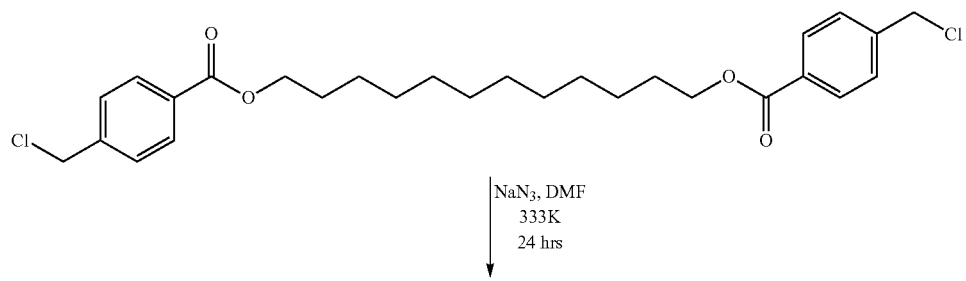

NaN₃, DMF
333K
24 hrs

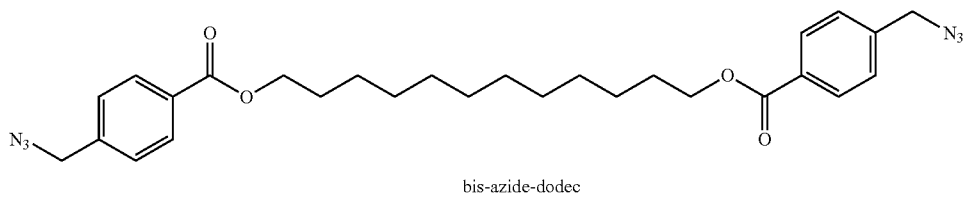

bis-azide-dodec

Crosslink density has a strong effect on the mechanical and thermal properties of the crosslinked bottlebrush polymers. The crosslink density is dependent on the mole ratio of the crosslinker to the polymer. In some embodiments, the mole ratio of the crosslinker to the polymer is about 1:1000. In another embodiment, the ratio of the crosslinker to the polymer is about 1:500. In yet another embodiment, the ratio of the crosslinker to the polymer is about 1:100. In an even further embodiment, the ratio of the crosslinker to the polymer is about 1:10. In a still further embodiment, the ratio of the crosslinker to the polymer is about 1:5.

3. Example Mechanical Properties of Bottlebrush Elastomers

The frequency-dependent linear viscoelastic behavior of the bottlebrush elastomers was probed over the range of 0.01-100 rad/s at 21° C. and 1% strain on an AR-G2 rheometer by TA Instruments. A UV LED curing accessory was utilized to improve adhesion between the cured elastomer and plates as well as to further study the kinetics of network formation. Each sample was loaded between the stainless steel top plate and the quartz bottom plate with a diameter of 20 mm and thickness of 0.39 mm. When curing, the LED source delivers UV radiation to the sample with a wavelength of 365 nm and uniform irradiance of 150 mW/cm$^2$ through the bottom quartz plate, and the evolution of the shear moduli is monitored by an oscillatory time sweep with a frequency of 10 rad/s and strain amplitude of 0.01. To demonstrate the unique nature of the bottlebrush elastomer mechanics, a commercial linear PDMS elastomer was measured as a comparative sample. The commercial PDMS (Sylgard 184, Dow Corning) was prepared at the manufacturer-recommended mix ratio of 10 parts base to 1 part curing agent and was thermally crosslinked in the same rheometer at 150° C. for 30 minutes. The sample was then cooled down to 21° C. to probe its frequency response. Temperature was controlled by a Peltier plate and the same sample dimension (i.e., 20-mm diameter, 0.39-mm thickness) and strain amplitude (i.e., 1%) were used to compare its rheology behavior against those of the bottlebrush elastomers. In the linear viscoelastic region, the step-strain stress relaxation result can be Fourier transformed from the time domain to the frequency domain[12], thus lowering the frequency limit beyond the oscillatory result. Then, the equilibrium modulus is extracted from the plateau storage modulus at this lowest experimentally measured frequency (i.e., 0.001 rad/s). In the data, bottlebrush elastomers are referenced according to the following nomenclature PDMS$_{N_{SC}}^{N_{BB}}$-XX, (or alternatively PN(PDMS$_{NSC}$)$_{NBB}$/XXPDMSbisBP) where $N_{SC}$ is the side chain degree of polymerization, $N_{BB}$ is the backbone degree of polymerization, and XX is the number of crosslinkers per chain, PDMS is the backbone polymer type, which can be PnBA, PEG, etc. in a different bottlebrush polymer, PDMSbisBP is the crosslinker, which can be any other type of crosslinkers including these listed in Scheme 1 and FIG. 8.

Figures 9A, 9B:
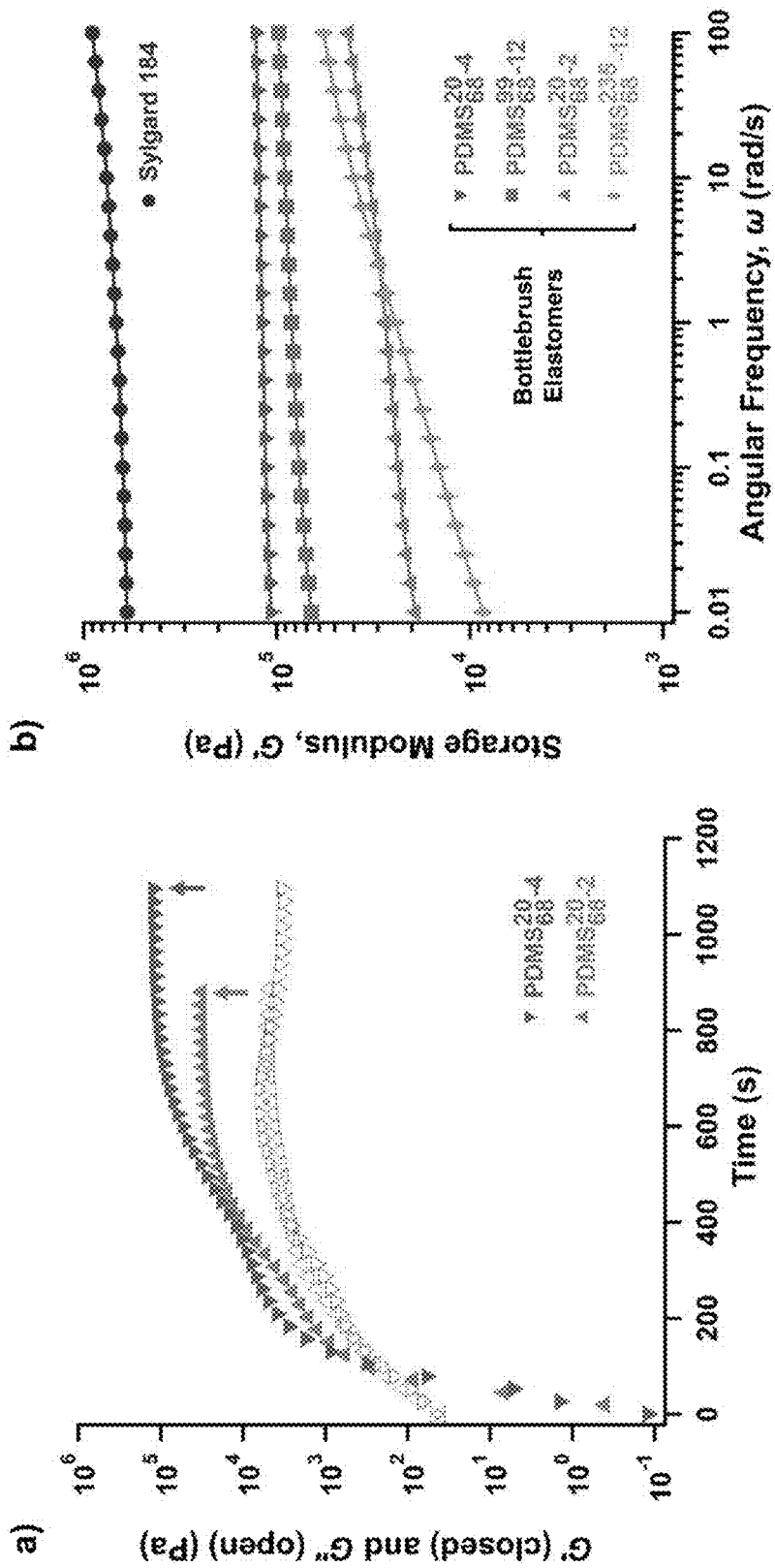
FIGS. 9A-9C.

Rheological analysis with in situ light exposure indicates the PDMS bottlebrush formulations described above are UV-crosslinkable (365 nm, 150 mW/cm$^2$) at room temperature with a relatively fast gel time (G'=G") circa 100 sec for thick layers (≈0.4 mm) (FIG. 9A). Continued illumination further increases the shear modulus over the course of ≈1000 sec, resulting in a plateau value that depends on crosslinker loading. Higher crosslinker concentration increases both curing time and the final modulus. Frequency sweeps (FIG. 9B) of fully cured samples at room temperature further indicate the plateau storage modulus (defined at 0.001 rad/s) depends on $N_{BB}$: the softest formulations occur at large $N_{BB}$, which enables higher degree of polymerization of the network strands, in agreement with literature.[13] Importantly, all of these materials are considerably softer—by 1-2 orders of magnitude—than linear PDMS that was thermally cured at 150° C. for 30 min (c.f., Sylgard 184 in FIG. 9B). Moreover, for three different backbone length PDMS bottlebrushes ($N_{BB}$=20, 99, and 235), low crosslinker loadings still produce excellent gel fractions (>85%) as measured via mass loss after solvent soaking (24 hr in toluene). This combination of soft mechanical properties (G'=$10^4$-$10^5$ Pa) and low sol-fractions highlights the advantages of a bottlebrush architecture in comparison to linear alternatives.

The bottlebrush polymers may have a modulus of less than 100 kPa or less than 50 kPa, for certain applications the modulus may be between 1 Pa and 100 kPa, or 100 Pa and 100 kPa. Or more preferably between 1 Pa and 50 kPa or more preferably between 10 Pa and 10 kPa, or more preferably between 100 Pa and 10 kPa for applications where super-soft materials would offer a benefit.

Figure 9C:
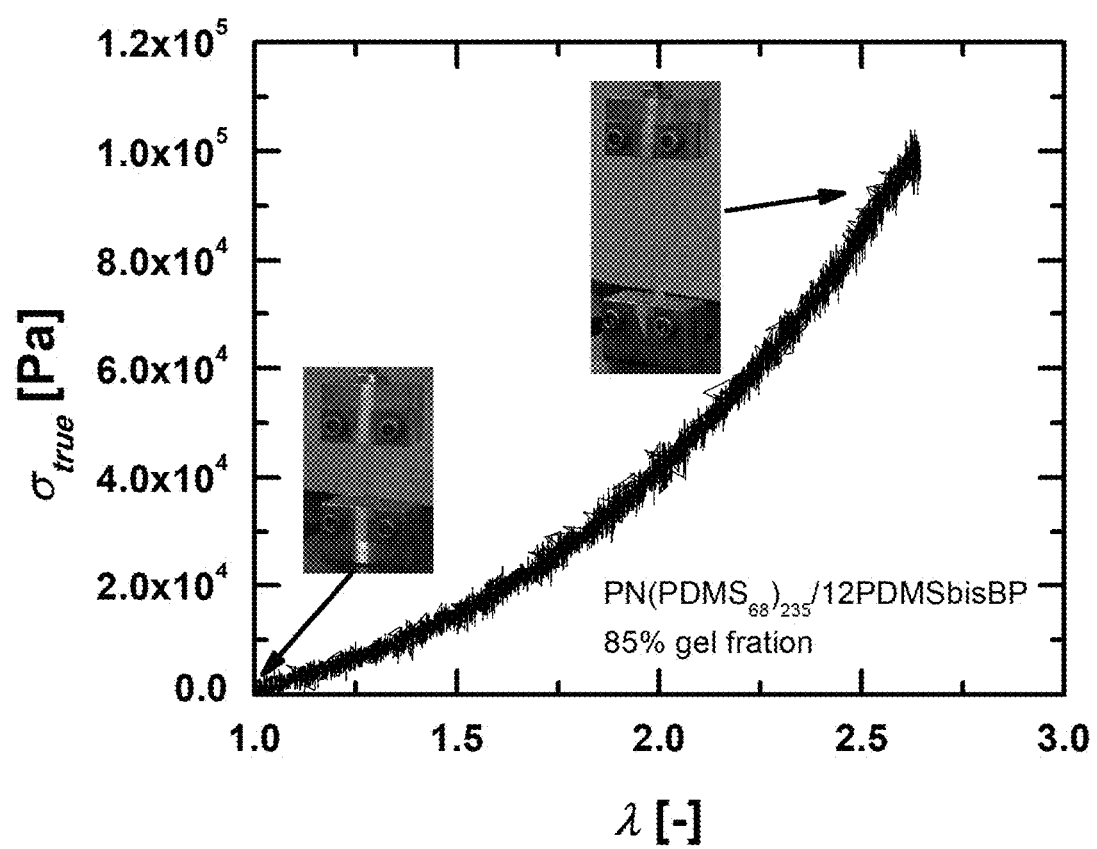

High extension (elongation-at-break, λ~2.75, or 275%) with low modulus (6.2 kPa) and high gel fraction (>85%) in crosslinked bottlebrush networks (PDMS$_{68}^{235}$-12) with comparable softness to jellyfish tissue had been achieved (FIG. 9C). This performance exceeds that of reported bottlebrush polymer networks.[13]

The optionally crosslinked bottlebrush polymers may have an elongation at break of over 50%, or over 100%, or over 200%, or over 500%, or over 1000%.

4. Example Gel Fraction of Bottlebrush Elastomers

The gel fraction of an elastomer is the fraction of polymer chains which are connected in the network structure. A perfectly crosslinked elastomer will have a gel fraction of 100%. In real elastomers, some fraction of polymer chains will remain unattached to the network. Our standard target for gel fraction was >90%. We calculated gel fraction by measuring the mass loss of a sample after a 24 hour soak in good solvent (toluene or dichloromethane). This solvent soak removes the polymer chains unattached to the network, leaving only the network-attached chains. Gel fractions and moduli for a range of bottlebrush elastomers as well as the industry standard Sylgard 184 are shown in FIG. 10.

5. Example Thermal Properties

Figure 11B:
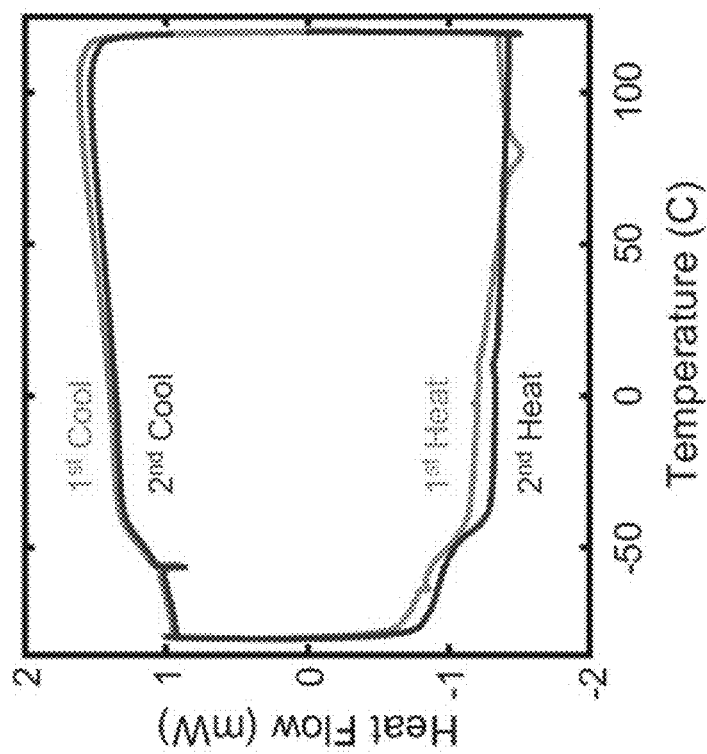
FIGS. 11A-11B.
Figure 11A:
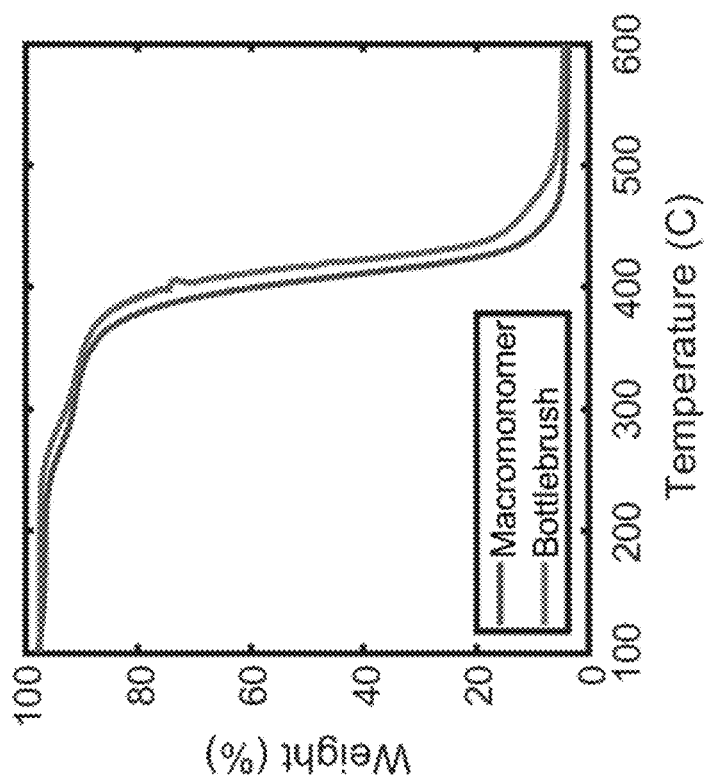

We measured the thermal stability and transitions of a poly(n-butyl acrylate) bottlebrush polymer ($N_{bb}$=13/$N_{sc}$=25) by thermogravimetric analysis (TGA) on a TA Discovery TGA and differential scanning calorimetry (DSC) on a TA Q2000 DSC. From the TGA data (FIG. 11A), the macromonomer and bottlebrush show stability up to around 250° C. in argon. Major degradation begins around 350° C.; the mass lost before this point might be debromination of the chain ends. DSC data (FIG. 11B) indicate the glass transition is around −50° C., similar to linear analogues of this polymer. The PDMS bottlebrush polymers has an even better thermal stability up to about 400° C. and lower $T_g$ around −125° C.

The bottlebrush polymer backbone and side chains may have a glass transition temperature below the application temperature of the material. In some embodiments, the bottlebrush polymer may have a glass transition temperature in the range of −150° C. to 25° C. In another embodiment the bottlebrush polymer may have a glass transition temperature in the range of −150° C. to 0° C. In yet another embodiment the bottlebrush polymer may have a glass transition temperature in the range of −150° C. to −25° C. In yet another embodiment, the bottlebrush polymer may have a glass transition temperature below room temperature (15° C.-30° C.).

Section B: Pressure Sensors

The internet-of-things (IoT) trend is steadily increasing demand for sensors of all kinds. Capacitive pressure sensing in the low pressure regime may be used in biomonitoring, advanced touch screens, such as hand-held devices, televisions and computer devices, and soft robotics. Capacitive pressure sensors with a bottlebrush dielectric layer (comprising the unprecedently low elastic modulus as described herein) can be used in new device applications for which conventional materials are unsuitable. The low pressure detection limit of a capacitive pressure sensor is determined by the elastic modulus of the dielectric layer (which deforms with an applied force) and the use of bottlebrush elastomers enables low pressure sensing in a range not otherwise achieved with bulk unsolvated materials. Moreover, the design of capacitive pressure sensors made with the bottlebrush polymers described herein is well-suited for high-throughput, roll-to-roll manufacturing, enabled by these materials which 1) are easily processible and undergo controlled crosslinking and 2) achieve high performance in their bulk state (i.e., don't require patterning or foaming).

1. Example Fabrication and Testing of Pressure Sensors

Figure 12:
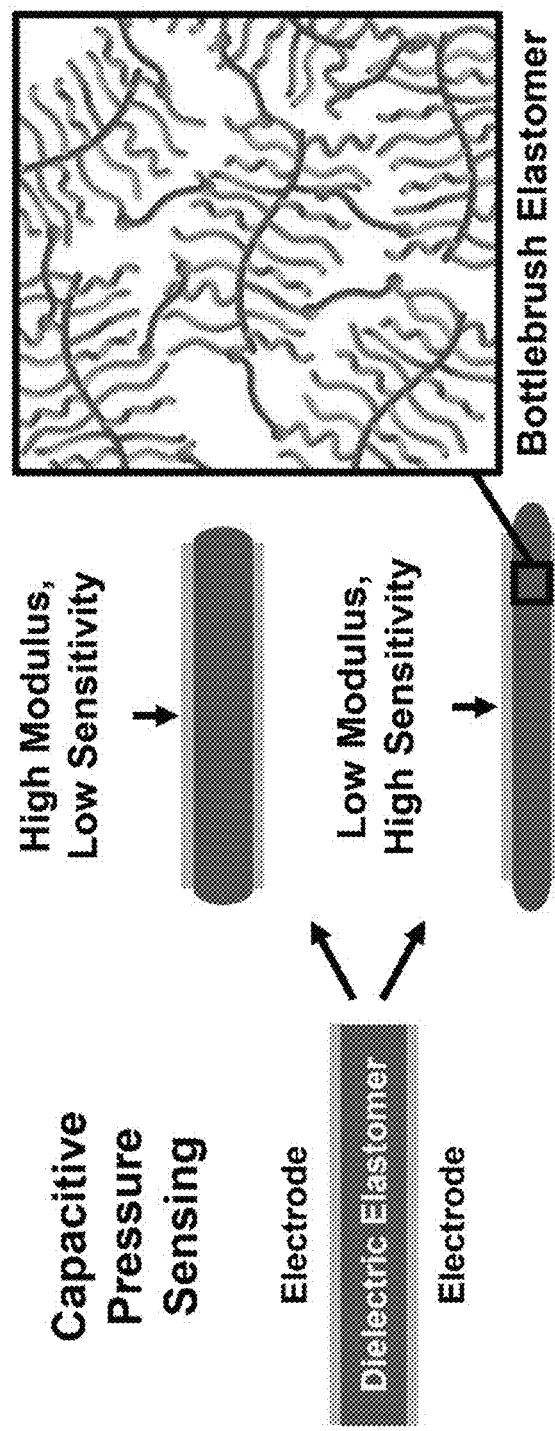
FIG. 12. The sensitivity of capacitive pressure sensors scales inversely with the modulus of the dielectric layer. Conventional devices are formulated with linear elastomers; herein, we exploit the softness of bottlebrush polymers to enable higher device sensitivity with a solvent-free formulation and fabrication scheme.
Figure 13:
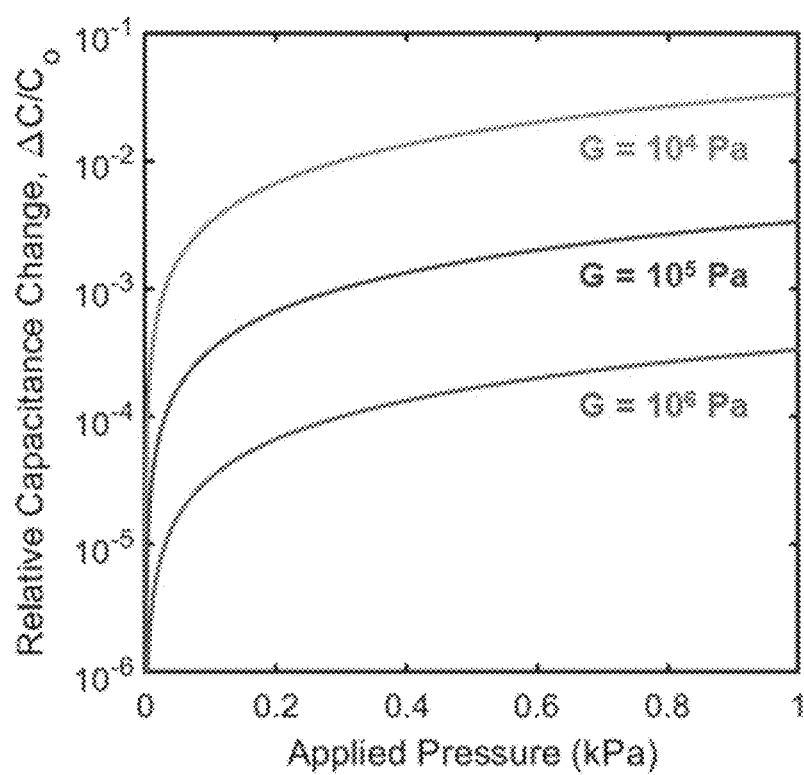
FIG. 13. Theoretical calculation of capacitive sensor response (relative change in capacitance) vs. applied pressure. Signal amplitude scales inversely with the shear modulus of the dielectric layer.

FIG. 12 illustrates a capacitive pressure sensor comprising a compressible dielectric layer sandwiched between two electrodes. Pressure applied to the device is translated into an electrical signal by thickness reduction of the compressible dielectric layer, which changes the capacitance of the device according to Capacitance $\propto$ 1/Thickness. Materials for the dielectric layer can be selected to achieve specific performance targets; more specifically, the sensitivity of the device is determined by the modulus of the dielectric layer. FIG. 13 shows the theoretical relationship between dielectric layer shear modulus and magnitude of capacitive pressure sensor response (relative change in capacitance, $\Delta C/C_0$) in the low pressure regime of 0-1 kPa, as calculated using an affine model for rubber network elasticity and parallel plate capacitance. Since the magnitude of response scales inversely with the shear modulus, the most sensitive condition on the plot is that with the lowest shear modulus (as depicted, $10^4$ Pa).

Figure 14B:
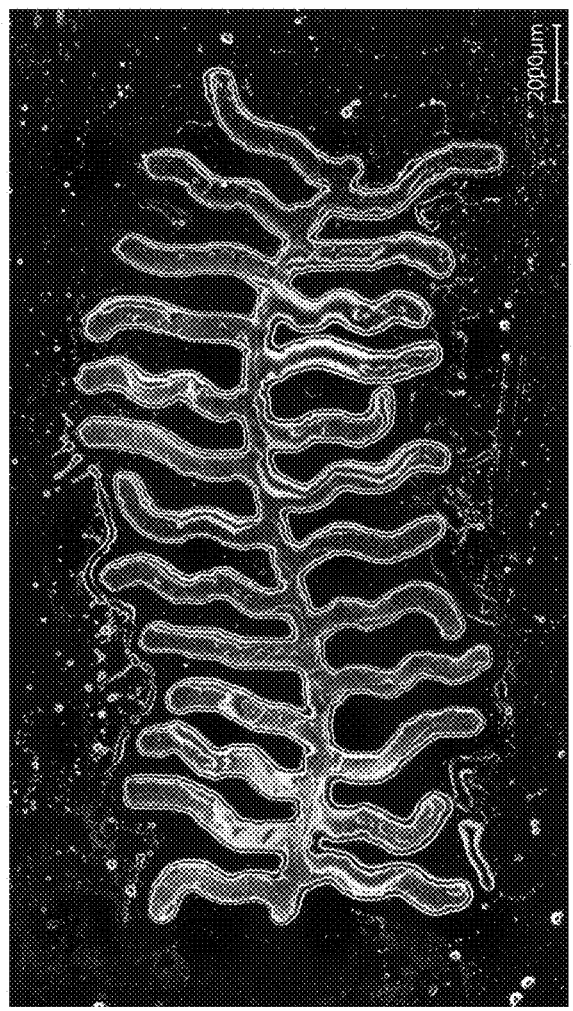
FIG. 14A-14B. Demonstration of photopatterning with the benzophenone-based UV curing system using a mask (FIG. 14A). PDMS bottlebrush cured with PDMS-bis-benzophenone on a silicon wafer (FIG. 14B).
Figure 14A:
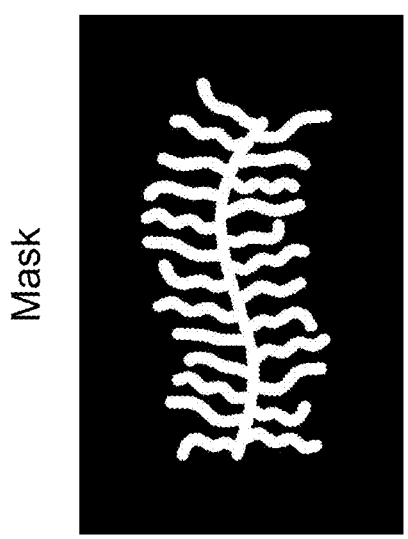
Figure 15:
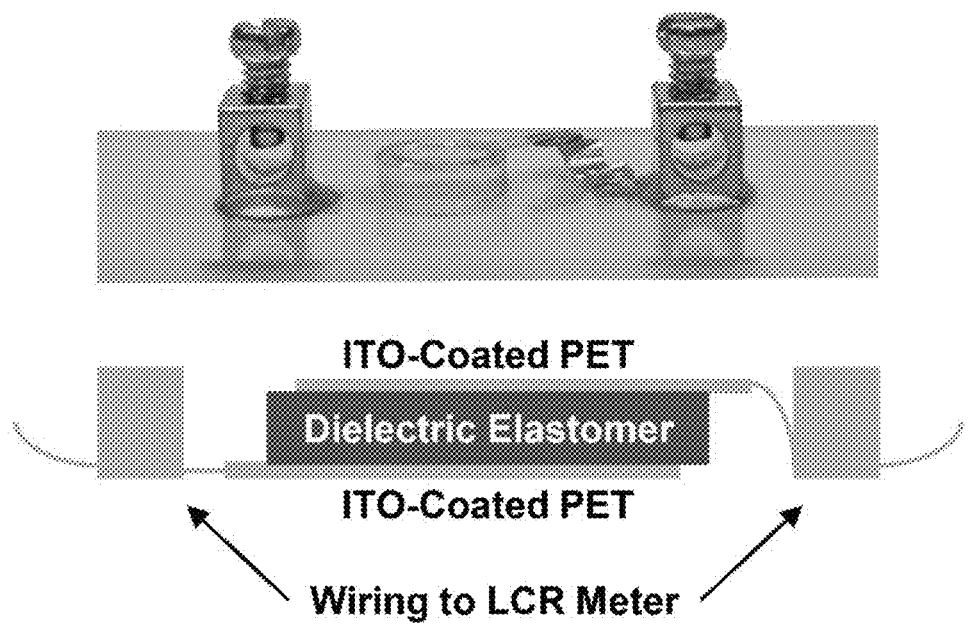
FIG. 15. The bottlebrush elastomer capacitive pressure sensor can be fabricated with typical electrode materials and a molding process.

To demonstrate high sensitivity pressure sensing performance, capacitive pressure sensors were fabricated with bottlebrush elastomer dielectric layers described herein. Suitable electrode materials include ITO-coated glass or PET, conductive adhesives (e.g., copper tape), conductive inks (e.g., carbon paint, silver paint), metal foils (e.g., aluminum foil), and evaporated metals (e.g., silver, gold). Selection is dependent on device configuration and the crosslinking process. The pressure sensor ideally has slightly undersized electrodes (relative to the dielectric layer) to reduce stray electric field lines at the sample edges. Control of dielectric layer thickness ensures appropriate mechanical deformation behavior; this may be achieved through casting in a mold, spin coating, or coating via precise batch or roll-to-roll methods. Dielectric layer thickness may range from microns to millimeters, depending on performance targets. Control of dielectric layer area can be achieved through various methods, including molding and photo-patterning. A demonstration of the ease of photo-patterning the UV-curable bottlebrush materials with a mask is pictured in FIGS. 14A-14B. For low pressure measurements, connections to the device should not apply unnecessary pressure which may interfere with the test signal. Metal foils and conductive inks may be used to bridge the signal to another surface for connection. An example device is pictured in FIG. 15.

The UV-curable nature of this bottlebrush elastomer chemistry additionally enables fabrication of transparent pressure sensors. Transparent sensors are useful in biomedical applications in which accurate sensor placement is critical, as well as for optoelectronic applications such as device displays. In this demonstration, a transparent and flexible sensor was fabricated with a PDMS bottlebrush elastomer and indium tin oxide (ITO) coated poly(ethylene terephthalate) film electrodes (FIG. 16). The sensor has extremely low haze, <1% over most of the visible spectrum. The pressure sensor can have a flat or bent configuration (e.g. curvature $\kappa$=0.55 cm$^{-1}$).

For the demonstration sensors described below, PDMS bottlebrush elastomers were prepared by the addition of PDMS bis-benzophenone at molar concentrations varying between 2-12 crosslinkers per bottlebrush molecule. Pressure sensor samples were cured using a collimated LED (approximately 1 mW/cm$^2$, 365 nm; M365L2-C1, Thorlabs) or on the rheometer. These narrowband light sources avoid sample degradation issues that can occur with broadband UV sources (e.g., metal halide bulbs). Mixtures of bottlebrush polymer and photo-crosslinker were degassed in a vacuum oven at 100° C. for 3 hours before UV crosslinking to ensure the elimination of any air bubbles. The sensors were fabricated by crosslinking bottlebrush polymers in a poly(tetrafluoroethylene) mold (6.35 mm diameter by 1.55 mm thick disc) and laminating to ITO-coated PET electrodes (Thorlabs). The use of transparent electrodes enabled visual inspection of the electrode-polymer interface for bubbles and delamination. Electrical connection to the sensor was established by installing screw terminals (Keystone Electronics Corp.) with conductive epoxy (CW2400, Chemtronics).

For pressure sensor response curve measurements, a compression tester with a precision ball screw stage actuated by a micro-stepper motor was used to compress the sensors at a strain rate of 0.001 s$^{-1}$; a 5 N load cell was used to measure applied force, with its signal conditioned by a standalone strain gage amplifier. A laser extensometer (Electronic Instrument Research LE-01) was used to monitor submicron displacements for high resolution strain measurement. A glass spacer was used to electrically insulate the sensor from the compression tester and distribute the pressure across the sensor face; a rounded probe was used to ensure level compression. Pressure sensor cycling tests were collected with a TA Instruments DMA 850 using the parallel plate compression clamp. A PTFE spacer was used to electrically insulate the sensor from the clamp. For both response curve and cycling tests, capacitance measurements were collected with a Keysight E4980A LCR meter, using a probing AC signal of 1 V/100 kHz. To the greatest extent possible, the sensor test environment was grounded to the LCR meter to reduce electromagnetic interference effects.

Figures 17A, 17B:
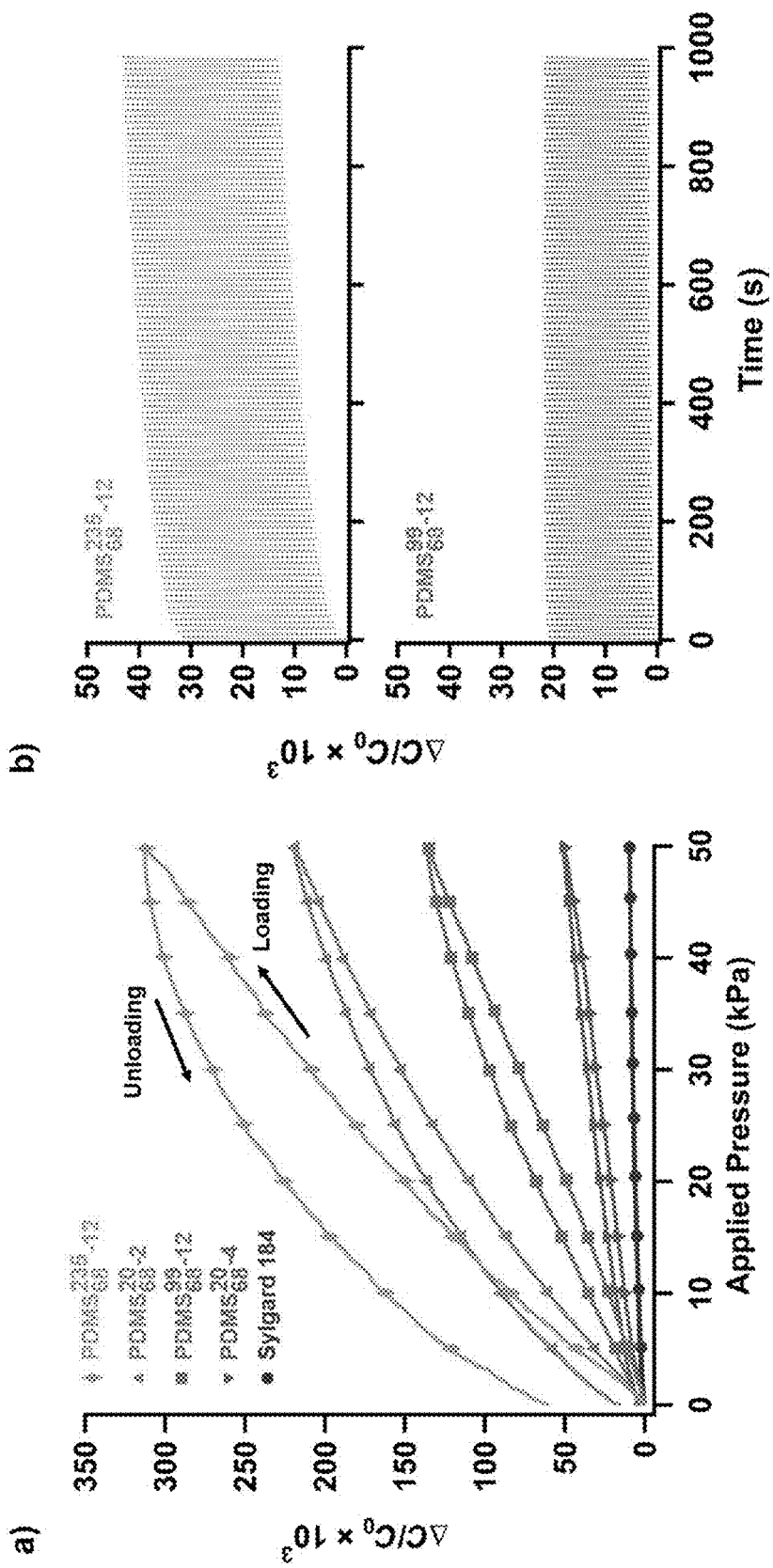
FIGS. 17A-17B.

The modulus of the bottlebrush elastomers is controllable by crosslinker concentration and can improve the sensitivity of CPSs. FIG. 17A shows the sensor response curves for four PDMS bottlebrush networks (PDM$_{68}^{20}$-2, PDMS$_{68}^{20}$-4, PDMS$_{68}^{99}$-12, PDMS$_{58}^{235}$-12) and a reference linear elastomer (Sylgard 184). The response of the Sylgard 184 sensor quickly saturates relative to the bottlebrush elastomer sensors. For the bottlebrush networks, moving from 4 to 2 crosslinkers per chain produces a significant increase in sensitivity concomitant with a reduced $G_0$. The sensor made with the softest polymer, PDMS$_{68}^{235}$-12 ($G_0$=6.2 kPa) exhibits extremely high sensitivity. As compared with the Sylgard 184 sensor, it has 22× higher sensitivity in the low pressure (0-10 kPa) regime and 53× higher sensitivity in the high pressure (20-50 kPa) regime. Sensitivities for all sensors measured are summarized in FIG. 18; note that $S_{Y-Z}$ indicates the sensitivity in pressure regime Y-Z kPa. At the highest pressure of 50 kPa, strains occurring in the sensors ranged from 0.03 (Sylgard 184) to 0.38 ($PDMS_{68}^{235}$-12). All sensors tested exhibited response hysteresis at the strain rate used, meaning the unloading curve appears different than the loading curve. Hysteresis is common for sensors with dielectric elastomers and is most evident here for the lowest modulus elastomers with the largest magnitude signals. The capacitance of the two lowest modulus bottlebrush elastomer sensors did not return to the baseline at the end of the high pressure (0-50 kPa) response test, indicating either an undesirably slow relaxation response or permanent sample damage. The former seems more likely based on the low-frequency rheology data and visual evidence that suggests sample integrity. Further investigation into cycling stability using the DMA revealed a trade-off between sensitivity and baseline stability in pressure regimes that approach significant strains. FIG. 17B shows that in the medium pressure regime (1-21 kPa), the sensor prepared with $PDMS_{68}^{235}$-12 undergoes some baseline drift over time while one prepared with $PDMS_{68}^{99}$-12 remains relatively stable. These data suggest that high sensitivity and baseline stability may be achieved by appropriately matching a bottlebrush elastomer with the pressure range of interest.

Figure 19:
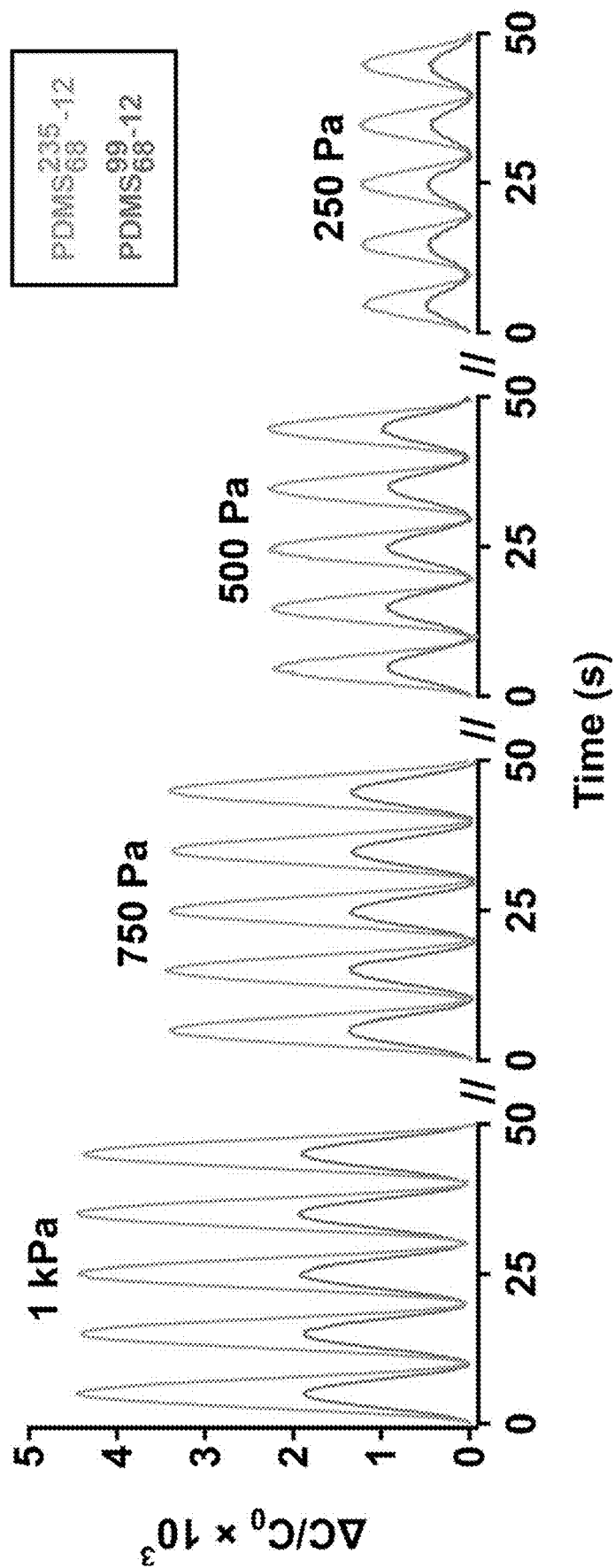
FIG. 19. Low pressure cycling of the bottlebrush elastomer sensors shows high sensitivity in the 250 Pa-1 kPa regime. The data shown were collected at a frequency of 0.1 Hz with the amplitude of pressure oscillation labeled above each dataset.

The bottlebrush elastomer sensors exhibit high sensitivity at pressures under 1 kPa and additionally show rapid response times to pressure oscillations at 0.1 Hz (FIG. 19). In considering higher frequency pressure application, the frequency-dependent modulus curves from our rheological studies can be used to identify appropriate limits. The two stiffer bottlebrush elastomers exhibit less frequency-dependent shear moduli between 0.01 and 100 rad/s, which is correlated with smaller hysteresis in the sensor response. The two softer bottlebrush elastomers exhibit some relaxation into the low frequency regime (i.e., <0.1 rad/s), possibly resulting in the pronounced hysteresis for the sensor response at the strain rate of 0.001 $s^{-1}$. Further studies investigating the effect of bottlebrush architecture on frequency response may elucidate the cause of this slow relaxation and help minimize hysteresis through informed molecular design.

The expected response of CPSs prepared with a uniform elastomer layer is more easily modeled than micropatterned or foamed alternatives. The compression of a dielectric elastomer layer between stretchable electrodes, assuming constant relative permittivity and incompressibility (Poisson's ratio, $v=0.5$), will result in the relationship between relative change in capacitance $\Delta C/C_0$ and extension ratio in the direction of applied pressure $\lambda$ shown in Eq. 1:

$$\frac{\Delta C}{C_0} = \lambda^{-2} - 1 \quad (1)$$

The ITO-coated PET film electrodes used in this work are undersized and inextensible relative to the soft and elastic dielectric. Applying a constant area assumption to the derivation with stretchable electrodes gives the new relationship shown in Eq. 2:

$$\frac{\Delta C}{C_0} = \lambda^{-1} - 1 \quad (2)$$

Following this constant area relationship, the pressure sensor sensitivity S can be related to the shear modulus, G, using the network theory of rubber elasticity[17], as:

$$S = \frac{1}{G(\lambda + \lambda^{-1} + 1)} \Rightarrow \frac{1}{3G} \text{ (small strain limit)} \quad (3)$$

Figure 20:
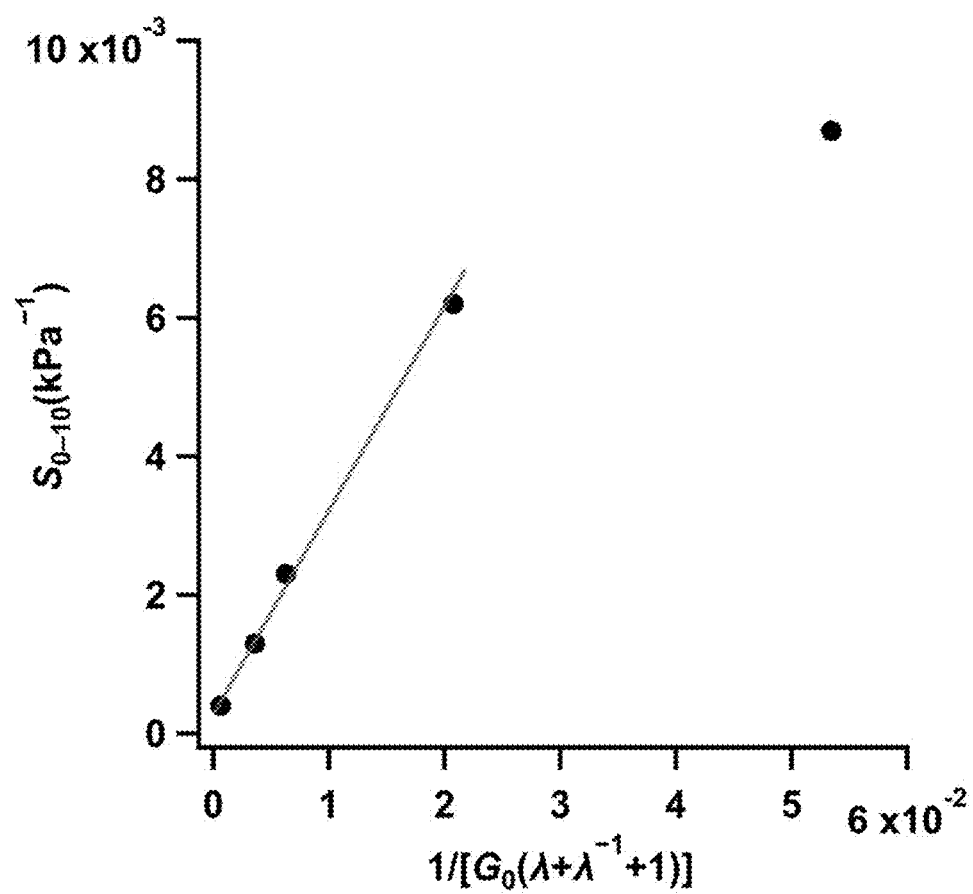
FIG. 20. The model predicts a linear relationship between sensitivity and the modulus/extension ratio term, which fits for all but the softest bottlebrush elastomer sensor.

We expect that practical sensors will deviate from the predicted behavior. In practice there are parasitic circuit elements in the detection circuit and the adhesion of the elastomer to the electrodes will limit free deformation of the polymer. The effect of parasitic circuit elements was found to be similar for all sensors (evaluated by comparing the measured capacitive signal to that expected by calculations using the measured strain). The adhesion of the elastomer to the electrodes inhibits lateral expansion, promoting bulging of the disc sidewall; the impact of this on stress-strain behavior has been described through a geometric correction factor that increases the apparent modulus.[18,19] The effect of adhesion to the electrodes was found to become significant in the lower modulus elastomers, which deformed to higher strains in the pressure range tested. Despite the aforementioned non-idealities, the simple model (Eq. 3) was found to roughly capture the sensitivity-modulus scaling found in this work (FIG. 20), with a good fit for low pressure (0-10 kPa) sensitivities of all sensors except for the lowest modulus bottlebrush elastomer, $PDMS_{68}^{235}$-12.

The performance of CPSs is highly dependent on device design in addition to material selection and fair comparisons of sensitivity should therefore be made relative to a control sensor of the same design. Our work demonstrates sensitivity increases relative to a control ranging from 3.3× to 22× in the 0-10 kPa range and 9.0× to 53× in the 20-50 kPa range by using bottlebrush elastomers instead of traditional linear elastomers. In comparison, the micropatterning method for PDMS reportedly leads to a 28× sensitivity increase in the 0-2 kPa range and a 7.5× increase in the 2-7 kPa range compared to an unstructured Sylgard 184 layer.[2] Introduction of microporosity reportedly results in an 8.2× sensitivity increase in the 0-10 kPa range and a 1.3× increase in the 10-100 kPa range (via processing with 10:1 sugar: Sylgard 184, 89.3% porosity).[5] In another study, a 38× sensitivity increase in the 0-5 kPa range was reported for a sensor with both a microporous dielectric layer and stretchable electrodes.[4] Notably, the air-elastomer composites exhibit declining sensitivities at high pressures—as air is displaced, the dielectric layer increasingly behaves like a bulk elastomer layer. The non-negligible gas permeability of PDMS adds complexity to this deformation behavior, i.e., it is not clear whether the gas simply leaks out of the sensor or permeates the PDMS.[1] Here, we achieve comparable, or better, performance through the use of a rationally designed all-solids material, rather than through complex processing. A combination of bottlebrush materials and porosity could conceivably result in even larger increases in sensitivity than achievable with either strategy alone.

In some embodiments, a plurality of such sensors is included within a sensor device, each sensor respectively has a first electrode; a second electrode; and a composition of matter including an optionally crosslinked dielectric bottlebrush polymer between the electrodes, wherein pressure applied to one of the electrodes is translated into an electrical signal by a compression of the composition of matter in response to the pressure. The sensors are coupled with interconnecting circuits to provide an output indicative of, for each sensor, both the pressure applied to the dielectric material and the location of the applied pressure. The changes in dielectric properties may, for example, be sensed as a change in an applied capacitive field, or a change in current through a channel to which such a field is applied. Different materials may be used in different portions of a sensor and/or a combination of materials may be used in a single sensor.

2. References for Sections a and B

The following references are incorporated by reference herein.
1. Mark, J. E. *Polymer Data Handbook*. (Oxford University Press, 2009).
2. Mannsfeld, S. C. B. et al. Highly sensitive flexible pressure sensors with microstructured rubber dielectric layers. *Nat. Mater.* 9, 859-864 (2010).
3. Atalay, O., Atalay, A., Gafford, J. & Walsh, C. A Highly Sensitive Capacitive-Based Soft Pressure Sensor Based on a Conductive Fabric and a Microporous Dielectric Layer. *Adv. Mater. Technol.* 3, 1700237 (2018).
4. Kwon, D. et al. Highly Sensitive, Flexible, and Wearable Pressure Sensor Based on a Giant Piezocapacitive Effect of Three-Dimensional Microporous Elastomeric Dielectric Layer. *ACS Appl. Mater. Interfaces* 8, 16922-16931 (2016).
5. Yoon, J. Il, Choi, K. S. & Chang, S. P. A novel means of fabricating microporous structures for the dielectric layers of capacitive pressure sensor. *Microelectron. Eng.* 179, 60-66 (2017).
6. Lee, B. Y., Kim, J., Kim, H., Kim, C. & Lee, S. D. Low-cost flexible pressure sensor based on dielectric elastomer film with micro-pores. *Sensors Actuators, A Phys.* 240, 103-109 (2016).
7. Lei, Z., Wang, Q., Sun, S., Zhu, W. & Wu, P. A Bioinspired Mineral Hydrogel as a Self-Healable, Mechanically Adaptable Ionic Skin for Highly Sensitive Pressure Sensing. *Adv. Mater.* 29, 1700321 (2017).
8. Pakula, T. et al. Molecular brushes as super-soft elastomers. *Polymer (Guildf)*. 47, 7198-7206 (2006).
9. Neugebauer, D., Zhang, Y., Pakula, T., Sheiko, S. S. & Matyjaszewski, K. Densely-grafted and double-grafted PEO brushes via ATRP. A route to soft elastomers. *Macromolecules* 36, 6746-6755 (2003).
10. Daniel, W. F. M. et al. Solvent-free, supersoft and superelastic bottlebrush melts and networks. *Nat. Mater.* 15, 183-189 (2016).
11. Vatankhah-Varnoosfaderani, M. et al. Bottlebrush Elastomers: A New Platform for Freestanding Electroactuation. *Adv. Mater.* 29, 1604209 (2017).
12. Tassieri, M. et al. i-Rheo: Measuring the materials' linear viscoelastic properties "in a step"! *J. Rheol. (N. Y. N. Y)*. 60, 649-660 (2016).
13. Vatankhah-Varnosfaderani, M. et al. Mimicking biological stress-strain behaviour with synthetic elastomers. *Nature* 549, 497-501 (2017).
14. U.S. Pat. No. 7,019,082B2, Matyjaszewski et al. Polymers, supersoft elastomers and methods for preparing the same
15. US20180201785A1, Sheiko et al. Solvent-Free Supersoft and Superelastic Materials US20160187209A1, Bao et al. Pressure sensing apparatuses and methods
16. U.S. Pat. No. 9,645,019B2, Duchaine et al. Dielectric geometry for capacitive-based tactile sensor.
17. L. R. G. Treloar, The Physics of Rubber Elasticity, Oxford University Press, New York, 3rd edn., 1975.
18. A. N. Gent and P. B. Lindley, Proc. Inst. Mech. Eng., 1959, 173, 111-122.
19. A. N. Gent and E. A. Meinecke, Polym. Eng. Sci., 1970, 10, 48-53.
20. Further information on one or more embodiments of the present invention can be found in Super-soft solvent free bottlebrush elastomers for touch sensing, by Veronica Reynolds et. al., Mater. Horiz., 2020, 7, 181.

Section C: Further Characterization of Photocrosslinking

1. Example Library Synthesis and Characterization

The Supporting Information referred to in this section is found in Appendix B of the priority provisional application Ser. No. 62/913,782 entitled "UNIVERSAL APPROACH TO PHOTO-CROSSLINK BOTTLEBRUSH POLYMERS," by M. Chabinyc et. al. and incorporated by reference herein (see the cross-reference to related applications section). Fig.s and Tables numbered with the prefix S (e.g., S1 or T1) are also found in priority provisional application Ser. No. 62/913,782.

The appropriate choice of molecular "linker" that bridges benzophenones is critical to solubilize the additive in a given bottlebrush precursor at room temperature without solvent. Importantly, homogeneous mixtures can be achieved using two distinct types of linkers: telechelic polymers matched to the bottlebrush side-chain chemistry or small molecule branched alkyl derivatives that are often synthetically more accessible. As evidenced by in-situ UV shear rheology described herein, the curing kinetics and mechanical properties of these amorphous or semi-crystalline networks are controlled by bottlebrush precursor chemistry, architecture, and crosslinker loading. The influence of elastically effective and ineffective crosslinks, which arise in tandem due to the statistical nature of benzophenone-induced radical reactions, is quantitatively captured by introducing a general model that relates crosslinker concentration and shear modulus. These results provide a conceptual framework that can be used to conveniently synthesize bottlebrush networks with tailored properties.

To demonstrate that bis-benzophenone derivatives are a universal additive for photo-crosslinking well-defined bottlebrush polymers, we first synthesized a library of bottlebrush homopolymers spanning four classes of side-chain chemistry: poly(n-butyl acrylate) (PnBA), poly(4-methylcaprolactone) (P4MCL), poly(ethylene oxide) (PEO), and poly(dimethylsiloxane) (FIG. 21). Linear PnBA and P4MCL were synthesized from norbornene-functionalized initiators through atom-transfer radical polymerization[22] (ATRP) and ring-opening polymerization[23] (ROP), respectively. Linear PEO and PDMS macromonomers were synthesized from commercially-available, mono-telechelic precursors by post-polymerization functionalization with norbornene. Ring-opening metathesis polymerization (ROMP) using a Grubbs $3^{rd}$ generation bis-pyridine catalyst was then used to form the bottlebrush backbone via grafting-through polymerization.

Figure 22A:
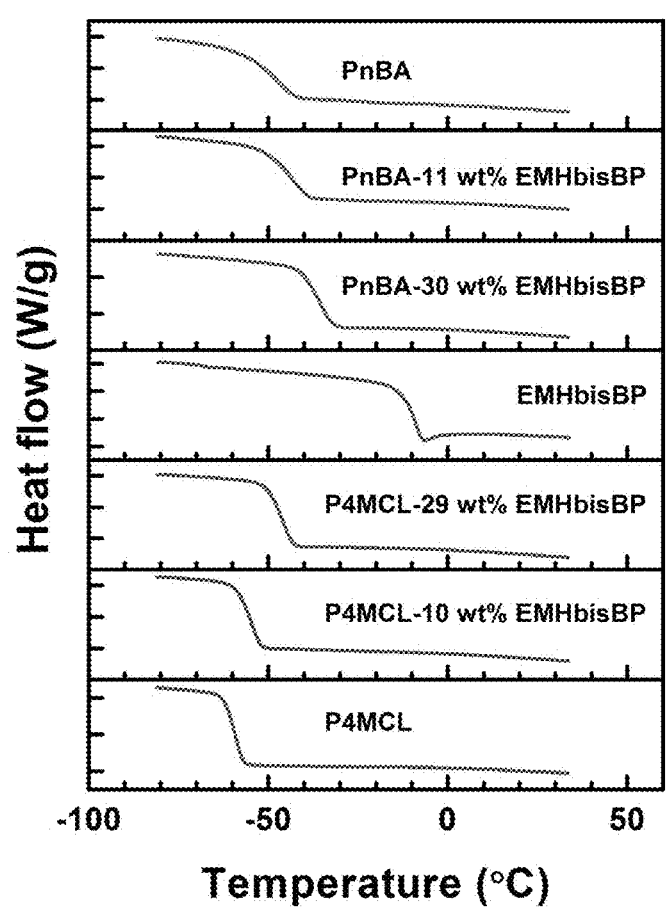
FIGS. 22A-22B. The solubility limit of EMHbisBP in PnBA and P4MCL bottlebrush polymers is >30 wt % as evidenced by differential scanning calorimetry.
Figure 22B:
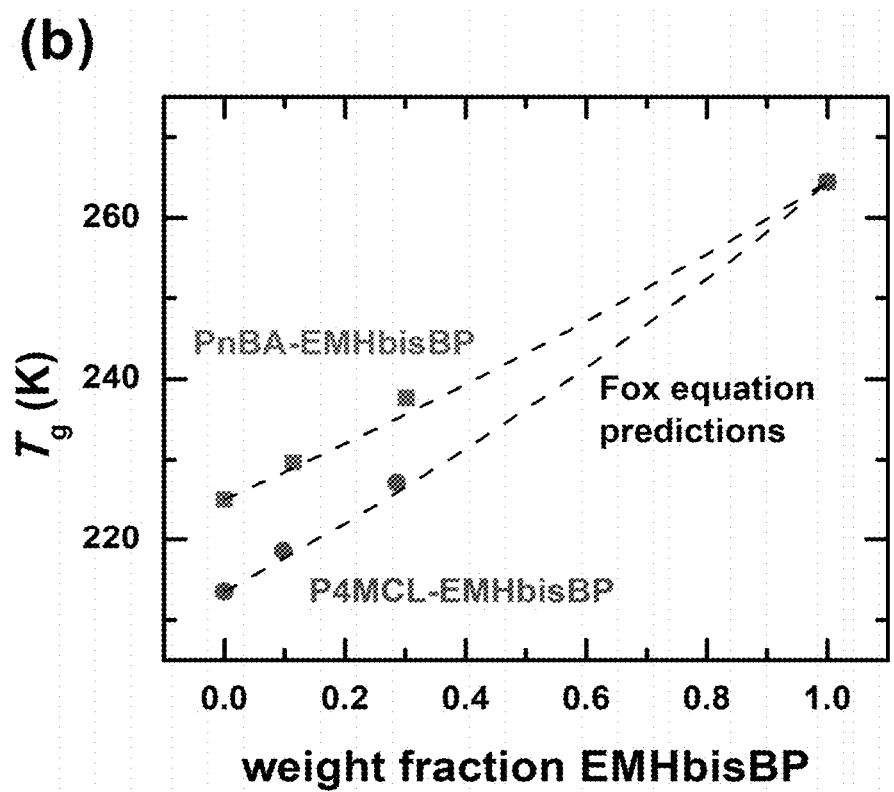

Next, a library of crosslinkers was synthesized (FIG. 21 and FIG. 8C) to understand the connection between linker chemistry and solubility in different bottlebrush homopolymers. The linkers fall under two general designs: (1) polymers with chemistry that matches the bottlebrush side-chain, and (2) small molecule alkyl derivatives. The first is convenient for PEO and PDMS side-chains since telechelic oligomers are commercially available and easy to functionalize with benzophenone. Di-hydroxy poly(ethylene glycol) and di-hydroxy poly(dimethylsiloxane) were reacted with benzophenonecarboxylic acid through EDC coupling to create crosslinkers designated PEGbisBP and PDMSbisBP, respectively. However, the second approach will be easier if the target side-chain chemistry is difficult to turn into a telechelic linker for benzophenone functionalization. A library of bis-benzophenone derivatives with bridging alkyl groups was therefore synthesized (FIG. 8C) to investigate the possibility of using small molecules as linkers. Each compound was obtained in a single step from commercially available organic diols or dicarboxylic acids via EDC coupling without rigorous purification. Molecules containing linear alkyl groups (e.g., 1,2-ethyl and 1,10-decyl) are crystalline solids with high melting points ($T_m$=145° C. and 100° C., respectively) that do not mix well with bottlebrushes. In contrast, branched alkyl derivatives (e.g., 2,2-dimethyl-1,5-di substituted pentane and 3-methyl-1,5-disubstituted pentane, "EMHbisBP") suppress crystallization and are liquids at room temperature (glass transition temperatures $T_g$=10° C. and −5° C., respectively). FIG. 22A demonstrates that EMHbisBP exhibits excellent solubility in both PnBA and P4MCL bottlebrush homopolymers at loadings ≲30 wt % as evidenced by a single glass transition that shifts in accordance with the Fox equation[24] (FIG. 22B).

Due to the absence of chromophores in each linker, the absorption behavior of EMHbisBP, PEGbisBP, and PDMSbisBP crosslinkers is solely determined by the benzophenone termini. A stronger absorption band ≈250 nm arising from $\pi \rightarrow \pi^*$ transition and a weaker absorption band ≈350 nm from $n \rightarrow \pi^*$ transition of the carbonyl moiety dominate the frontier molecular orbitals. DFT calculations also indicate the HOMO→LUMO ($n \rightarrow \pi^*$) transitions are virtually identical irrespective of linkage chemistry, again depending only on the terminal benzophenone substituents.

Figure 23:
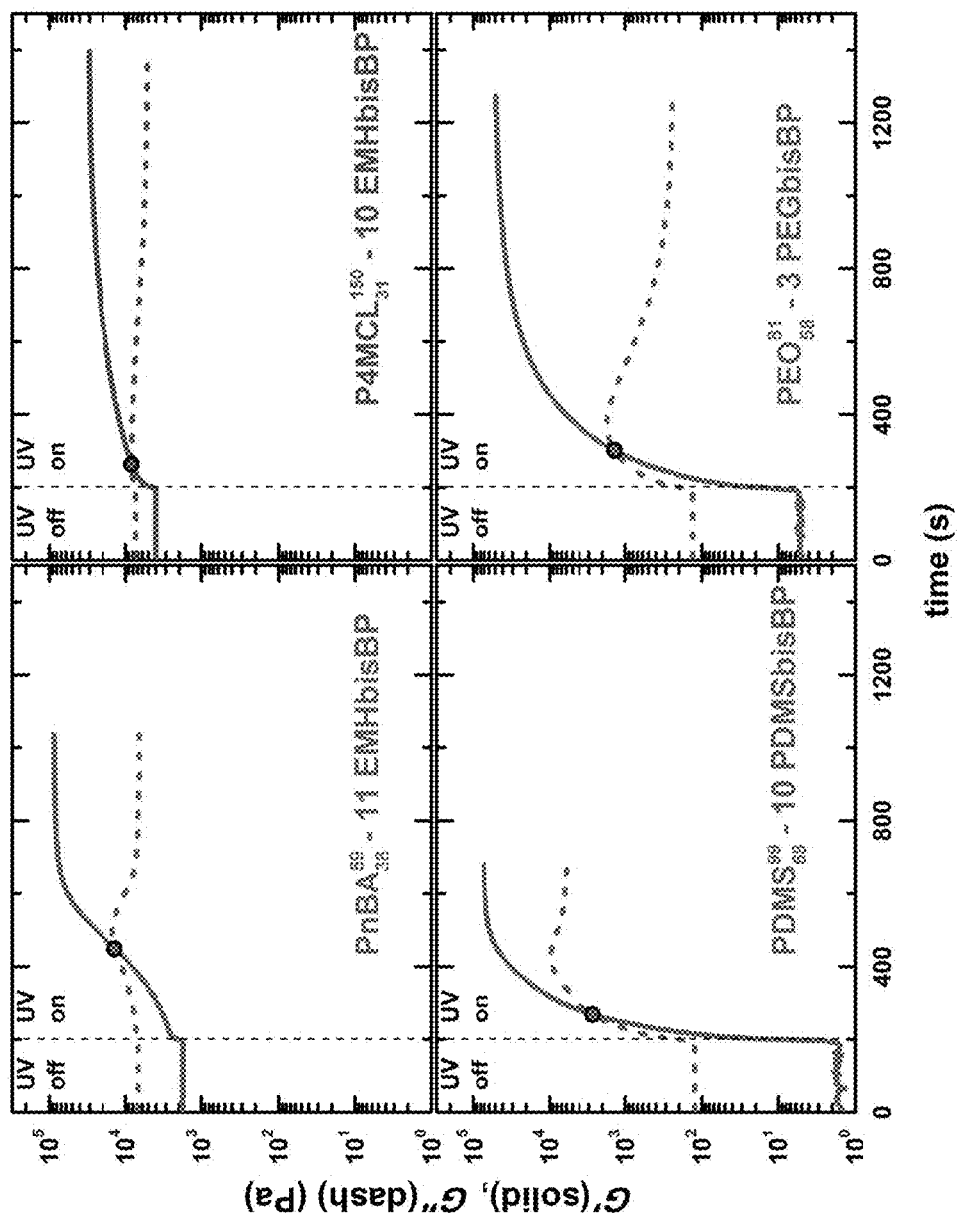
FIG. 23: In-situ UV crosslinking rheology of four compatible photo-crosslinker-bottlebrush polymer blends. Data were collected at room temperature under ambient conditions except for the PEG blend, which was measured at 80° C. to avoid crystallization. The G' and G" crossover points (indicated by circles) denote liquid-to-solid transitions. An oscillatory frequency of 10 rad/s and small strain amplitude of 0.01 were used to monitor the curing process.
Figure 24:
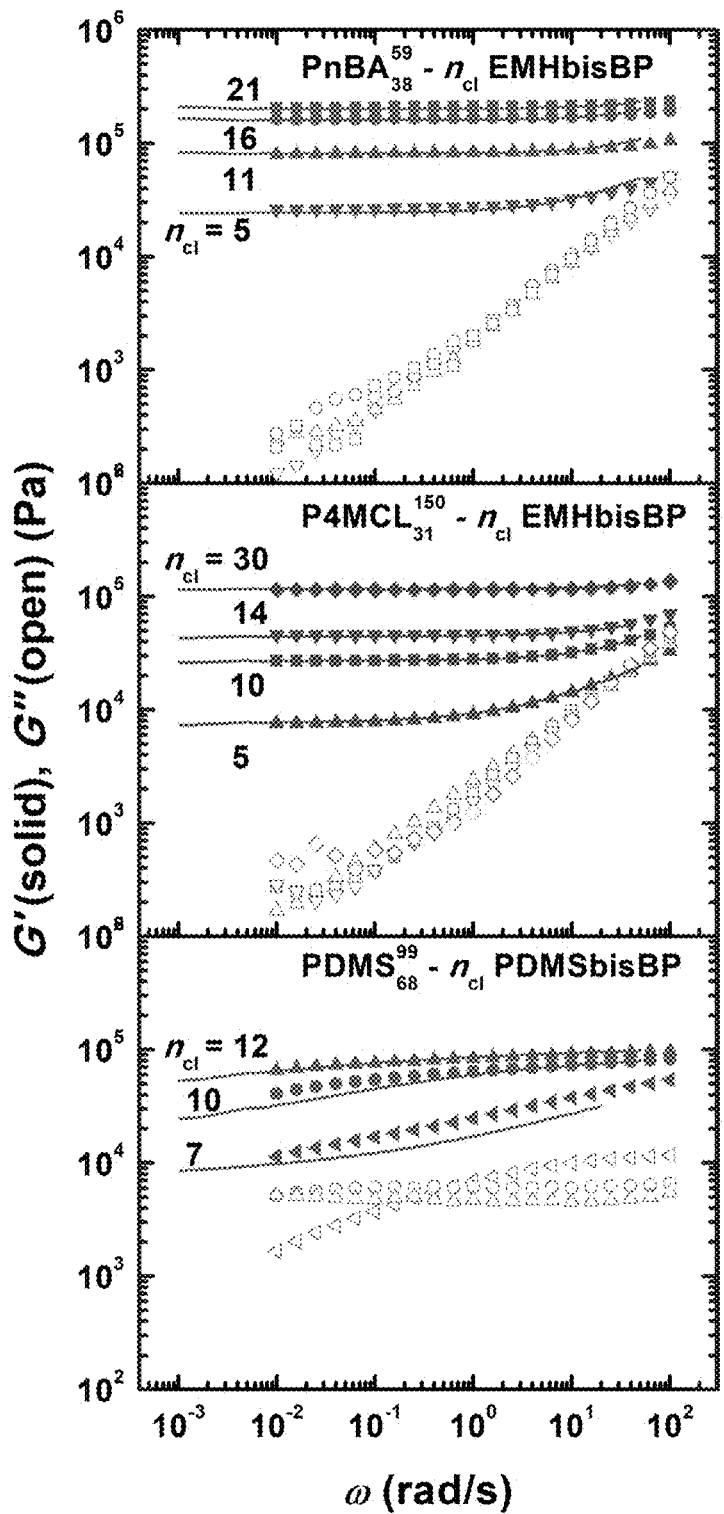
FIG. 24: Effect of crosslinker loading ($n_{cl}$) on the frequency-dependent shear moduli after fully curing PnBA ($N_{BB}$=59, $N_{SC}$=38), P4MCL ($N_{BB}$=150, $N_{SC}$=31), and PDMS ($N_{BB}$=99, $N_{SC}$=68) bottlebrush polymers. A strain amplitude of 0.01 was used for the oscillatory frequency sweep test. The solid lines represent the storage moduli that were fast Fourier transformed (FFT) from stress relaxation data with a step strain of 0.01, which were used to determine the equilibrium network modulus ($G_x$) at $10^{-3}$ rad/s.

A rotational rheometer equipped with a UV light source was used to study the curing kinetics and mechanical properties of four compatible bottlebrush-crosslinker formulations: PnBA-EMHbisBP, P4MCL-EMHbisBP, PEO-PEGbisBP, and PDMS-PDMSbisBP. Each sample is labeled "Bottlebrush$_{N_{SC}}^{N_{BB}}$-$n_{cl}$ Crosslinker", where $N_{BB}$ and $N_{SC}$ represent the average backbone and side-chain degrees of polymerization, respectively, and $n_{cl}$ is the number (moles) of added crosslinkers per bottlebrush polymer. This technique allows for the accurate determination of shear moduli by avoiding over or insufficient curing and sample-plate slip problems. Before UV exposure, the viscoelastic behavior of each formulation shows Rouse (i.e., entanglement-free) relaxation that is dominated by the bottlebrush component. FIG. 23 demonstrates successful UV crosslinking of all four soluble blends. In contrast, formulations that contained insoluble crosslinker crystals due to an improper choice of linker (e.g., EMHbisBP in PDMS) failed to gel. For the properly matched pairs in FIG. 23, UV light exposure resulted in an immediate rise of the storage (G') and loss (G") moduli; after ca. 200 s, G' and G" crossover, heralding the viscoelastic liquid-to-solid transition. As curing continues, G' and G" eventually plateau, indicating the completion of crosslinking. Note that the PEO-PEGbisBP blend was cured at 80° C. to avoid crystallization of the PEO bottlebrush side-chains ($T_m$≈60° C.) at room temperature; for experimental convenience, we focus the following rheological analysis on PnBA, P4MCL, and PDMS elastomers. The storage modulus (G') of bottlebrush elastomers prepared by UV photo-crosslinking is controlled by crosslinker loading ($n_{cl}$, FIG. 24). For PnBA-EMHbisBP, as $n_{cl}$ rises from 5 to 21 crosslinkers per polymer, G' increases and remains essentially independent of angular frequency ($\omega$) because the volume of bottlebrush strands between crosslinks (which scales inversely with G') decreases with increasing $n_{cl}$. In contrast, the viscous modulus G"($\omega$) is independent of $n_{cl}$, suggesting that network defects (e.g., the length and number density of dangling bottlebrush ends) are nearly unchanged by crosslinker concentration.[17,25] Thus, all of the fully cured PnBA bottlebrush elastomers in FIG. 24 display the characteristic dynamics of a polymer network, where G' decays to a plateau in the low frequency regime and G" follows a power-law decrease with frequency. In the low frequency limit, the plateau value of G' represents the equilibrium network modulus ($G_x$), which is influenced by crosslinker concentration (FIG. 24) and the bottlebrush architecture as discussed below. PnBA and P4MCL bottlebrush elastomers quickly reach the plateau storage modulus below 0.1 rad/s, while PDMS exhibits some sort of slow relaxation that extends into the low frequency regime, convoluting the determination of $G_x$. Since oscillatory shear and stress relaxation experiments both give equivalent results in the linear viscoelastic region,[26,27] the latter was conducted to more quickly probe the long-time (or low-frequency) behavior and reach the plateau in G'. After fast Fourier transforming (FFT) stress relaxation data from the time to frequency domain,[26] the plateau modulus for PDMS is more evident (FIG. 24, solid lines). Similar data were collected for PnBA and P4MCL. We define the equilibrium network modulus ($G_x$) of each bottlebrush elastomer as the plateau storage modulus at the lowest experimentally-measured frequency, $G_x$=G'($10^{-3}$ rad/s).

2. Network Model

As mentioned above, there is an important distinction between our bottlebrush elastomers and those previously reported. In past studies, the phantom network model[27] has been successfully applied to bottlebrush elastomers under the assumption that all added crosslinkers are elastically effective.[13,17-19] This is reasonable for networks formed in situ by polymerizing a mixture of macromonomer and multi-functional crosslinker (e.g., via ROMP[19] or ATRP[13,18]) or ex situ using efficient hydrosilylation chemistry.[17] In those cases the probability that both functional ends of a crosslinker belong to the same bottlebrush segment (i.e., form an elastically ineffective crosslink) is small. In contrast, our benzophenone-terminated photo-crosslinkers can theoretically react with any nearby hydrocarbon units, likely yielding a much higher probability of forming elastically ineffective crosslinks within one bottlebrush polymer. A model is therefore needed that connects the molar equivalents of added crosslinker ($n_{cl}$), the number of elastically effective ($n_{cl,e}$) and ineffective ($n_{cl,i}$) crosslinkers, and the resulting macroscopic mechanical properties.

Figures 25A, 25B, 25C:
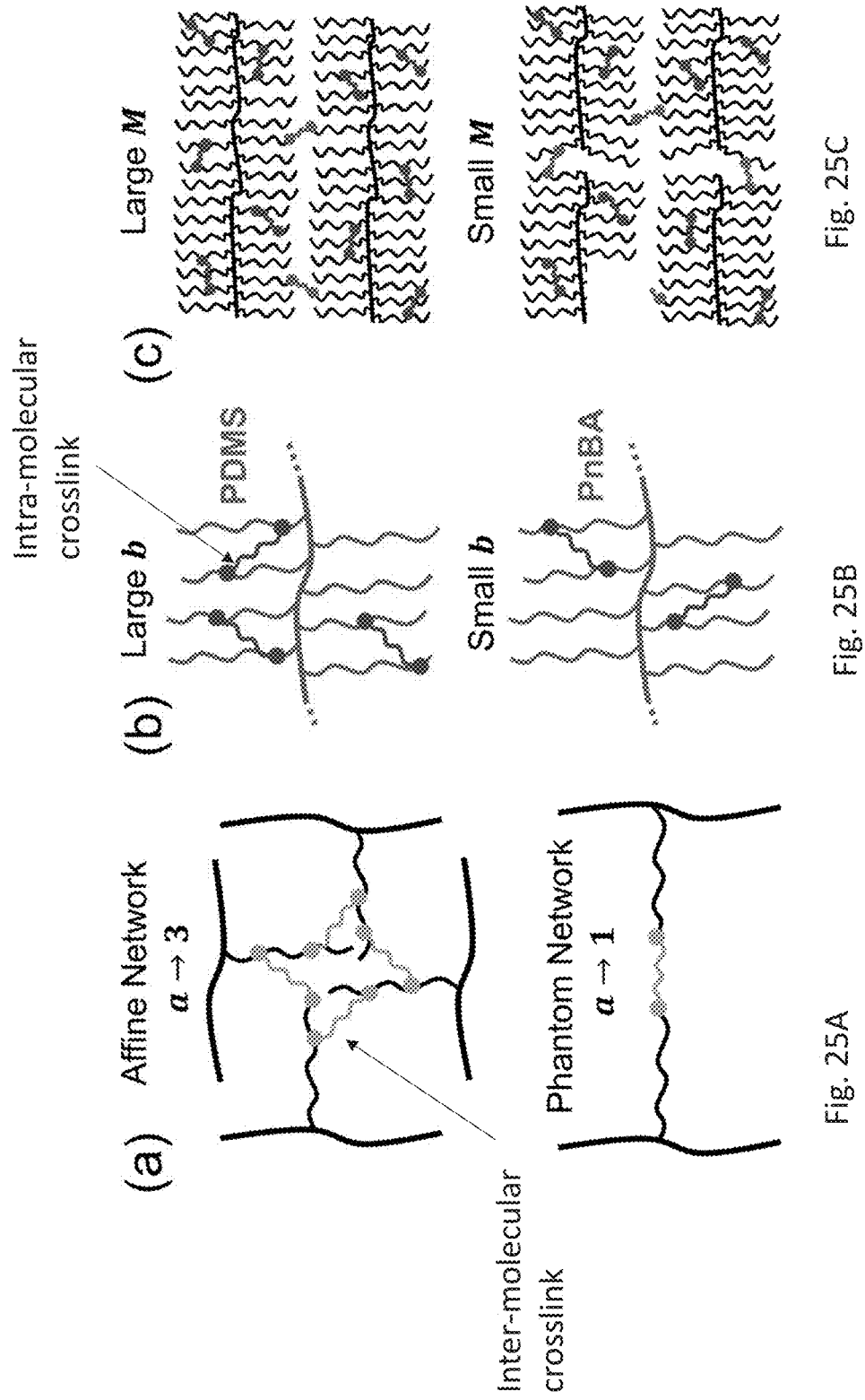
FIGS. 25A-25C: Illustration of our bottlebrush network model, which involves two fitting parameters—a and b (see Eq. 4).

Our model stems from the fact that $G_x$ is proportional to the number of elastically effective crosslinkers per unit volume $(n_{cl,e}/M_n)$[17,27] because they are the only ones that transmit stress between two nearby bottlebrush polymers (FIG. 25). We first introduce a proportionality constant (a) to this scaling relationship $G_x$~$an_{cl,e}/M_n$ that accounts for the uncertainty in crosslink functionality given the non-selective nature of benzophenone radical chemistry. Note that a should vary between the ideal limits of the phantom network (a=1) and affine network (a=3) models[27] (FIG. 25A, see Supporting Information). Furthermore, the number of intra-bottlebrush (elastically ineffective) crosslinkers ($n_{cl,i}$) should be proportional to the bottlebrush molecular weight $n_{cl,i}$=bM because larger bottlebrush polymers contain more volume in which crosslinkers can reside. The value of b therefore represents the number of intra-bottlebrush crosslinkers per unit molar mass of a bottlebrush polymer. We hypothesize that b should depend on the specific combination of polymer and crosslinker (FIG. 25B) but not the molecular weight of a bottlebrush. As illustrated in FIG. 25C, given the same total number of added crosslinkers in a volume element, the presence of more bottlebrush molecules (i.e., smaller molar mass) should lead to a greater probability of inter-bottlebrush, elastically effective crosslinks. This benefit is balanced by the smaller volume of a network strand that increases the modulus. Although the aforementioned statements about $n_{cl,i}$ and $n_{cl,e}$ may seemingly apply to both bottlebrush and linear polymers, the network modulus of linear polymers cannot be directly related to crosslinker concentration without considering the effect of entanglements. However, since all bottlebrush polymers in this work are entanglement free, a direct correlation between network modulus and crosslinker concentration is possible. With these ingredients, we propose the following relationship between $G_x$ and $n_{cl}$ as derived in the Supporting Information:

$$G_x = a\rho k_B T N_{AV} \left(\frac{n_{cl,e} - 1}{M_n}\right) = $$ (Eq. 4)

$$a\rho k_B T N_{AV} \left(\frac{(n_{cl} - bM_n) - 1}{M_n}\right) = a\rho k_B T N_{AV} \left(\frac{n_{cl} - 1}{M_n} - b\right),$$

where a and b are treated as fitting parameters, $\rho$ is the mass density of a bottlebrush polymer at absolute temperature T, $k_B$ is Boltzmann's constant, and $N_{AV}$ is Avagadro's number. Eq. 4 predicts a linear relationship between $G_x$ and $(n_{cl}-1)/M_n$ with the fitting parameters a and b determining the slope and y-intercept of the line. Below, all rheology tests were conducted at room temperature and the mass densities of PnBA, P4MCL and PDMS were obtained from literature as 1.10, 1.04, and 0.965 g/cm³, respectively.[28,29]

Figure 26:
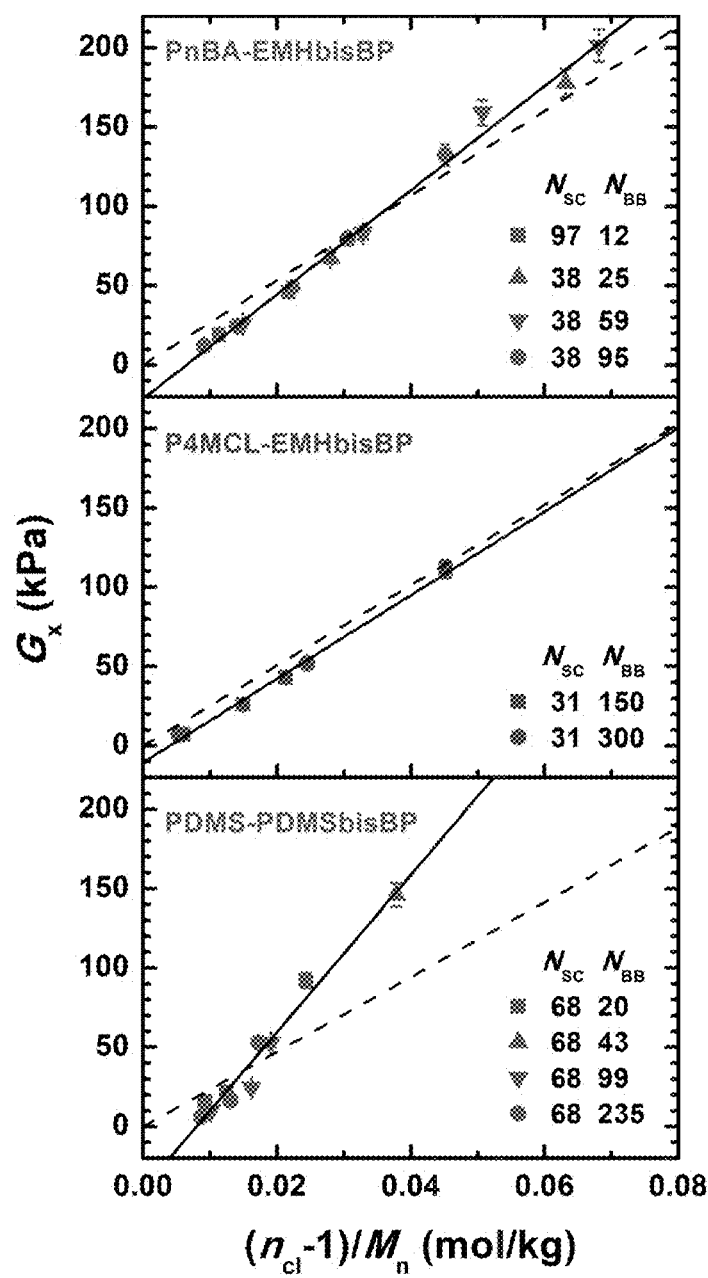
FIG. 26: Quantitative correlation between the network modulus ($G_x$) at room temperature and added crosslinker concentration $n_{cl}$ for PDMS-PDMSbisBP, P4MCL-EMHbisBP, and PnBA-EMHbisBP bottlebrush elastomers with varying $N_{BB}$ and $N_{SC}$. Solid lines are fits through all data points to Eq. 4; Dashed lines represent the ideal phantom network model (a=1 and b=0) and 5% error bars in $G_x$ are the estimated uncertainty in rheological measurements.

In order to quantitatively test the validity of Eq. 4, 32 different PnBA, P4MCL, and PDMS bottlebrush formulations were prepared with varying $N_{BB}$, $N_{SC}$, and $n_{cl}$ followed by UV-curing. FIG. 26 shows that Eq. 4 describes the data quite well for all PnBA, P4MCL and PDMS bottlebrush elastomers that were tested. We attribute the slight increase in noise for PDMS-PDMSbisBP samples to the slow relaxation (FIG. 24) that persists down to the lowest experimentally measured frequency (0.001 rad/s) in the Fourier transformed stress relaxation data, leading to a slightly larger error in determining $G_x$. Notably, the fit parameters a and b vary significantly across different polymer-crosslinker pairs. In particular, the large differences in slope after fitting to Eq. 4 are reflected in the ordering $a_{P4MCL} < a_{PnBA} < a_{PDMS}$. The exact molecular cause of this behavior remains unclear, although the values of a fall within the expected bounds 1 (phantom network)<a<3 (affine network). We define a crosslinker efficiency as $\xi = n_{cl,e}/n_{cl} = (n_{cl} - bM_n)/n_{cl}$. As expected, $\xi$ decreases with increasing bottlebrush molar mass since more space is available for the crosslinker to localize within the brush region and form elastically ineffective crosslinks. The efficiency should also increase with the total number of added crosslinkers ($n_{cl}$) since $n_{cl,i} = bM_n$ remains constant for a particular bottlebrush sample. Furthermore, as the molar mass of a bottlebrush polymer decreases below a critical value $M_{n,c} \equiv b^{-1}$, $n_{cl,i}$ becomes less than one. Assuming the sample is well crosslinked ($n_{cl,e} \geq 2$), the efficiency should then fall within the range $0.67 \leq \xi < 1$ regardless of $n_{cl}$ since $\xi = n_{cl,e}/(n_{cl,e}+n_{cl,i}) > 2/(2+1)$. This is indeed confirmed by the relatively high $\xi \geq 0.83$ for PnBA$_{38}$[25] with $M_n < M_{n,c}$ when crosslinked with EMHbisBP.

The power of extracting a and b fitting parameters lies in the ability to predict the lowest possible network modulus for any photo-crosslinked bottlebrush chemistry. Roughly two elastically effective crosslinks per bottlebrush ($n_{cl,e} \approx 2$) are needed to ensure a robust network—any lower $n_{cl,e}$ would further decrease $G_x$ at the risk of also reducing the gel fraction. Our three softest bottlebrush elastomers that approach this lower limit: PnBA$_{38}$[95] ($G_x$=12 kPa, $n_{cl}$=5, $n_{cl,e}$=2±1), P4MCL$_{31}$[300] ($G_x$=6.8 kPa, $n_{cl}$=8, $n_{cl,e}$=3±1), and PDMS$_{68}$[235] ($G_x$=6.2 kPa, $n_{cl}$=12, $n_{cl,e}$=3±2). An even lower $G_x$ can probably be achieved without sacrificing a high gel fraction by further increasing $N_{BB}$ and using the model to predict the optimal number of total crosslinkers ($n_{cl}$) needed to maintain $n_{cl,e} \approx 2$. In other words, the amount of extra elastically ineffective crosslinkers for a larger $N_{BB}$ bottlebrush polymer can be offset by adding more molar equivalents of crosslinker while maintaining $n_{cl,e} \approx 2$, which results in the lowest possible network modulus and a high gel fraction. For instance, as P4MCL bottlebrush polymer doubles its molar mass from $N_{BB}$ of 150 to 300, the number of elastically ineffective EMHbisBP per bottlebrush polymer ($n_{cl,i}$) doubles from 2.5 to 5.0 as expected, requiring $n_{cl}$ to increase from 5 to 8 in order to keep $n_{cl,e} \approx 2$.

Our model will not be valid when approaching the limit of high crosslinker concentrations such that the contour length of a bottlebrush backbone strand between elastically effective crosslinks is close to the effective Kuhn length of the backbone (about 3 nm).[30] In this case, the conformation of a backbone strand would be semiflexible instead of Gaussian. Consequently, a semiflexible or rod-like backbone strand would drive the modulus much higher than the linear prediction of Eq. 4. While we see no evidence of such stiffening phenomena, Dobrynin and coauthors have introduced an entropy reduction factor per strand that explicitly accounts for the effect of strand flexibility on network modulus.[30] Regardless, at the relatively low crosslinker concentrations that are most relevant for forming super-soft and extensible networks, our model reveals unique physics associated with benzophenone-based photo-crosslinking and provides insight into forming robust bottlebrush materials.

3. Example Photopatterning Through a Photomask

Figure 27A:
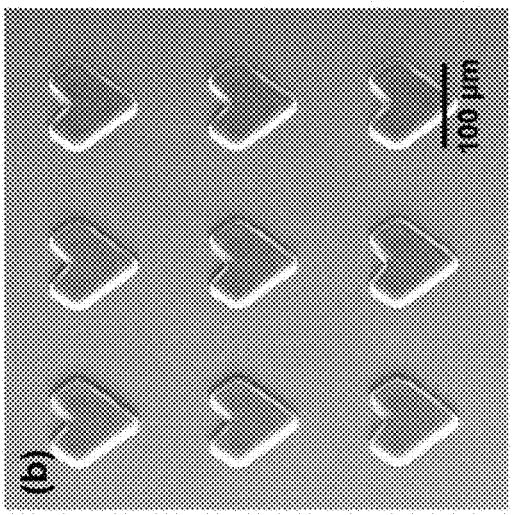
FIGS. 27A-27D.
Figure 27B:
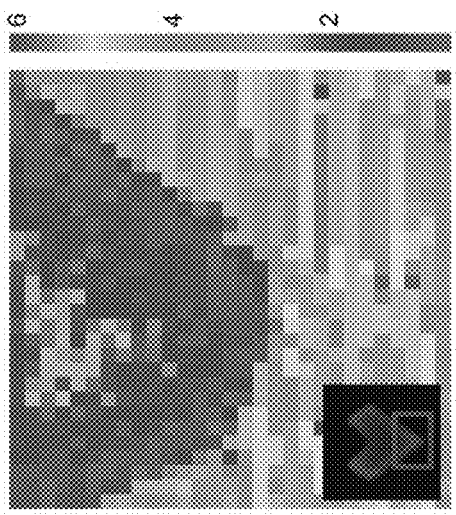
Figure 27C:
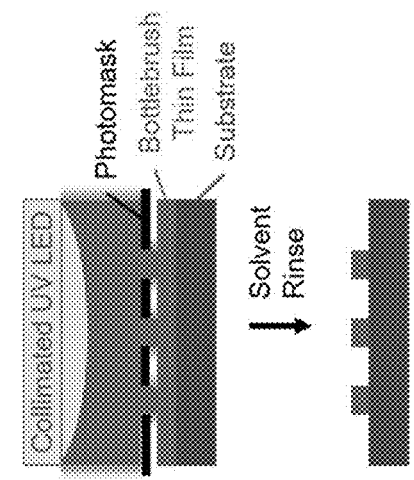
Figure 27D:
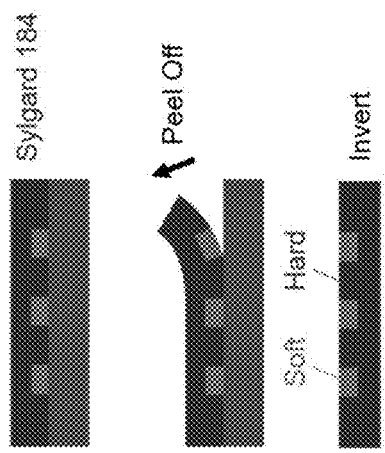

The versatility of photo-crosslinkable bottlebrush polymers is highlighted by patterning thin films (FIG. 27A) of PDMS (FIG. 27B), P4MCL, and PnBA via exposure to UV light through a photomask followed by solvent rinsing to produce negative tone topography as observed by optical microscopy. These structures are also amenable to further processing (FIG. 27C), e.g., backfilling with Sylgard 184 (linear PDMS) and peeling off of the substrate to generate flat, all elastomer surfaces containing spatially-controlled stiffness (FIG. 27D). These types of tailored materials may prove useful in biological applications, for example to study cell-substrate interactions[21] in a facile and high-throughput manner.

We have demonstrated a universal approach to form super-soft elastomers by UV-curing compatible blends of bottlebrush polymers and photo-crosslinkable bis-benzophenone additives. The linker bridging benzophenone groups is critical to promote efficient mixing of all components at room temperature without solvent. Two types of linker designs are effective: (1) polymers that match the bottlebrush side-chain chemistry and (2) branched alkyl derivatives that are easy to synthesize and which suppress crystallization. A wide variety of bottlebrush homopolymers can be photo-crosslinked with this strategy, including poly (n-butyl acrylate), poly(4-methylcaprolactone), poly(ethylene oxide), and poly(dimethylsiloxane). A general linear relationship exists between the network modulus of these bottlebrush elastomers and the added crosslinker concentration, which is consistent across different side-chain chemistries and backbone/side-chain degrees of polymerization.

The fitting parameters of this model help discriminate between elastically effective and ineffective crosslinks that arise due to the statistical nature of benzophenone photochemistry. These results constitute an efficient and versatile method of forming new elastomeric materials with controllable modulus and high gel fraction. The versatility of our approach was further highlighted by photo-patterning bottlebrush polymer thin films to produce surfaces with topography and spatially-defined stiffness.

4. Advantages and Improvements of Photocrosslinking According to Examples Described Herein The recent development of controlled bottlebrush polymer syntheses[1-4] has sparked an explosion of interest in leveraging this unique molecular architecture to create materials with interesting properties.[5-7] Some of the myriad examples include paintable photonic crystals,[8,9] surface-active additives for thin films,[10,11] and high resolution nanopatterns with tunable fluidity.[12] Another fascinating opportunity involves crosslinking. The huge volume of each bottlebrush network strand suppresses backbone entanglements and results in moduli that can approach several kPa, roughly three orders of magnitude lower than a typical entangled polymer network built from linear chains ($\approx 1$ MPa). Such exceptionally soft mechanical properties are advantageous in a number of applications ranging from biological tissue mimics[13,14] to efficient actuators[15] and capacitive pressure sensors.[16]

Various strategies have been devised to crosslink bottlebrush polymers in the bulk. A common route involves in situ crosslinking during polymerization (with catalyst and solvent) that simultaneously constructs the bottlebrush backbone from a macromonomer and forms intermolecular bonds through a multi-functional co-monomer.[13,17-19] This approach undeniably generates useful materials, but the need for an air-free polymerization environment, solvent removal (de-swelling), and inability to analyze bottlebrush molecules before crosslinking complicates processing and characterization. Alternatively, chemistry that enables crosslinking after the synthesis of well-defined bottlebrushes can be incorporated into side-chains,[20,21] although custom macromonomers and sometimes additional post-polymerization reactions (e.g., trithiocarbonate reduction to a thiol) are required. From a pragmatic perspective, an ideal material platform with maximum utility would instead provide a mechanism to crosslink any type of bottlebrush polymer ex situ, independent of the side-chain chemistry.

In the first section, we disclosed a different strategy to generate poly(dimethylsiloxane) (PDMS) bottlebrush networks by photo-crosslinking a telechelic poly(dimethylsiloxane) additive that is bis-functionalized with benzophenone. The major advantage of this route is simplicity: all components are soluble at room temperature in the absence of solvent, samples can be crosslinked under ambient conditions in a matter of minutes, and the use of well-defined bottlebrush precursors permits rigorous characterization before their incorporation into a network. One might anticipate this crosslinking concept would be applicable to any bottlebrush side-chain chemistry since the photophysics of benzophenone promotes promiscuous C—H abstraction from most functional groups and the resulting carbon-centered radicals can undergo coupling (crosslinking) reactions. However, we quickly found it proved difficult in practice. Crosslinkers which have a polymeric linker that is identical to the bottlebrush side-chain chemistry lead to efficient mixing, but it is not always convenient to synthesize the appropriate telechelic polymers with reactive functionality on both ends to install benzophenone groups. This constraint can be overcome and significantly expand the scope of bottlebrush chemistries that can be photo-crosslinked with bis-benzophenone derivatives to also include poly(acrylate), poly(ether), poly(ester) and other side-chains (FIG. 21A). A key discovery is that bis-benzophenone-based additives with linkers containing branched alkyl groups are particularly effective, because they: (1) inhibit crystallization and impart excellent solubility in bottlebrush formulations at room temperature without solvent, (2) are synthetically accessible from inexpensive and commercially available diols, and (3) one linker is compatible with different bottlebrush side-chain chemistries. The resulting networks are fundamentally different from those generated via in situ polymerization since they contain a mixture of elastically effective (stress-bearing) and ineffective crosslinks due to the aforementioned statistical nature of benzophenone photochemistry. To understand the consequences, we present a model that quantitatively captures the relationship between crosslinker loading and plateau modulus across a library of different bottlebrush elastomers with varying side-chain chemistry and degrees of polymerization. Finally, we highlight the ability to spatially control crosslinking using light by fabricating patterned thin films with bottlebrush topography and flat surfaces containing periodic hard and soft domains. These results showcase the broad utility of photo-crosslinkable bottlebrush formulations that are easy to access and integrate into various process flows.

A solvent-free bottlebrush elastomer according to embodiments described herein is orders-of-magnitude softer than conventional rubber. Such exceptionally soft mechanical properties are compelling in a number of applications ranging from biological tissue mimics to efficient actuators and capacitive pressure sensors. A wide variety of bottlebrush networks with different side chain chemistries also impart other functionalities, such as biodegradability, biocompatibility and advantageous optical properties. The verified model between crosslinker concentration and modulus also guides the design of bottlebrush network structure.

5. References for Section C

The following references are incorporated by reference herein.

(1) Jha, S.; Dutta, S.; Bowden, N. B. Synthesis of Ultralarge Molecular Weight Bottlebrush Polymers Using Grubbs' Catalysts. *Macromolecules* 2004, 37 (12), 4365-4374. https://doi.org/10.1021/ma049647k.

(2) Huang, K.; Johnson, M.; Rzayev, J. Synthesis of Degradable Organic Nanotubes by Bottlebrush Molecular Templating. *ACS Macro Lett.* 2012, 1 (7), 892-895. https://doi.org/10.1021/mz3002287.

(3) Lin, T.-P.; Chang, A. B.; Chen, H.-Y.; Liberman-Martin, A. L.; Bates, C. M.; Voegtle, M. J.; Bauer, C. A.; Grubbs, R. H. Control of Grafting Density and Distribution in Graft Polymers by Living Ring-Opening Metathesis Copolymerization. *J. Am. Chem. Soc.* 2017, 139 (10), 3896-3903. https://doi.org/10.1021/jacs.7b00791.

(4) Chang, A. B.; Lin, T.-P.; Thompson, N. B.; Luo, S.-X.; Liberman-Martin, A. L.; Chen, H.-Y.; Lee, B.; Grubbs, R. H. Design, Synthesis, and Self-Assembly of Polymers with Tailored Graft Distributions. *J. Am. Chem. Soc.* 2017, 139 (48), 17683-17693. https://doi.org/10.1021/jacs.7b10525.

(5) Verduzco, R.; Li, X.; Pesek, S. L.; Stein, G. E. Structure, Function, Self-Assembly, and Applications of Bottlebrush Copolymers. *Chem. Soc. Rev.* 2015, 44 (8), 2405-2420. https://doi.org/10.1039/C4CS00329B.

(6) Xie, G.; Martinez, M. R.; Olszewski, M.; Sheiko, S. S.; Matyjaszewski, K. Molecular Bottlebrushes as Novel Materials. *Biomacromolecules* 2019, 20 (1), 27-54. https://doi.org/10.1021/acs.biomac.8b01171.

(7) Rzayev, J. Molecular Bottlebrushes: New Opportunities in Nanomaterials Fabrication. *ACS Macro Lett.* 2012, 1 (9), 1146-1149. https://doi.org/10.1021/mz300402x.

(8) Miyake, G. M.; Weitekamp, R. A.; Piunova, V. A.; Grubbs, R. H. Synthesis of Isocyanate-Based Brush Block Copolymers and Their Rapid Self-Assembly to Infrared-Reflecting Photonic Crystals. *J. Am. Chem. Soc.* 2012, 134 (34), 14249-14254. https://doi.org/10.1021/ja306430k.

(9) Liberman-Martin, A. L.; Chu, C. K.; Grubbs, R. H. Application of Bottlebrush Block Copolymers as Photonic Crystals. *Macromol. Rapid Commun.* 2017, 38 (13), 1700058. https://doi.org/10.1002/marc.201700058.

(10) Stein, G. E.; Laws, T. S.; Verduzco, R. Tailoring the Attraction of Polymers toward Surfaces. *Macromolecules* 2019, 52 (13), 4787-4802. https://doi.org/10.1021/acs.macromol.9b00492.

(11) Mah, A. H.; Afzali, P.; Qi, L.; Pesek, S.; Verduzco, R.; Stein, G. E. Bottlebrush Copolymer Additives for Immiscible Polymer Blends. *Macromolecules* 2018, 51 (15), 5665-5675. https://doi.org/10.1021/acs.macromol.8b00719.

(12) Guo, Z.-H.; Le, A. N.; Feng, X.; Choo, Y.; Liu, B.; Wang, D.; Wan, Z.; Gu, Y.; Zhao, J.; Li, V.; et al. Janus Graft Block Copolymers: Design of a Polymer Architecture for Independently Tuned Nanostructures and Polymer Properties. *Angew. Chem. Int. Ed.* 2018, 57 (28), 8493-8497. https://doi.org/10.1002/anie.201802844.

(13) Vatankhah-Varnosfaderani, M.; Daniel, W. F. M.; Everhart, M. H.; Pandya, A. A.; Liang, H.; Matyjaszewski, K.; Dobrynin, A. V.; Sheiko, S. S. Mimicking Biological Stress-Strain Behaviour with Synthetic Elastomers. *Nature* 2017, 549 (7673), 497-501. https://doi.org/10.1038/nature23673.

(14) Vatankhah-Varnosfaderani, M.; Keith, A. N.; Cong, Y.; Liang, H.; Rosenthal, M.; Sztucki, M.; Clair, C.; Magonov, S.; Ivanov, D. A.; Dobrynin, A. V.; et al. Chameleon-like Elastomers with Molecularly Encoded Strain-Adaptive Stiffening and Coloration. *Science* 2018, 359 (6383), 1509-1513. https://doi.org/10.1126/science.aar5308.

(15) Vatankhah-Varnoosfaderani, M.; Daniel, W. F. M.; Zhushma, A. P.; Li, Q.; Morgan, B. J.; Matyjaszewski, K.; Armstrong, D. P.; Spontak, R. J.; Dobrynin, A. V.; Sheiko, S. S. Bottlebrush Elastomers: A New Platform for Freestanding Electroactuation. *Adv. Mater.* 2017, 29 (2), 1604209. https://doi.org/10.1002/adma.201604209.

(16) Reynolds, V.; Mukherjee, S.; Xie, R.; Levi, A. E.; Atassi, A.; Uchiyama, T.; Wang, H.; Chabinyc, M.; Bates, C. M. Super-Soft Solvent-Free Bottlebrush Elastomers for Touch Sensing. *Mater. Horiz.* 2019. https://doi.org/10.1039/C9MH00951E.

(17) Cai, L.-H.; Kodger, T. E.; Guerra, R. E.; Pegoraro, A. F.; Rubinstein, M.; Weitz, D. A. Soft Poly(Dimethylsiloxane) Elastomers from Architecture-Driven Entanglement Free Design. *Adv. Mater.* 2015, 27 (35), 5132-5140. https://doi.org/10.1002/adma.201502771.

(18) Daniel, W. F. M.; Burdyńska, J.; Vatankhah-Varnoosfaderani, M.; Matyjaszewski, K.; Paturej, J.; Rubinstein, M.; Dobrynin, A. V.; Sheiko, S. S. Solvent-Free, Supersoft and Superelastic Bottlebrush Melts and Networks. *Nat. Mater.* 2016, 15 (2), 183-189. https://doi.org/10.1038/nmat4508.

(19) Sarapas, J. M.; Chan, E. P.; Rettner, E. M.; Beers, K. L. Compressing and Swelling To Study the Structure of Extremely Soft Bottlebrush Networks Prepared by ROMP. *Macromolecules* 2018, 51 (6), 2359-2366. https://doi.org/10.1021/acs.macromol.8b00018.

(20) Arrington, K. J.; Radzinski, S. C.; Drummey, K. J.; Long, T. E.; Matson, J. B. Reversibly Cross-Linkable Bottlebrush Polymers as Pressure-Sensitive Adhesives. *ACS Appl. Mater. Interfaces* 2018, 10 (31), 26662-26668. https://doi.org/10.1021/acsami.8b08480.

(21) Mukumoto, K.; Averick, S. E.; Park, S.; Nese, A.; Mpoukouvalas, A.; Zeng, Y.; Koynov, K.; Leduc, P. R.; Matyjaszewski, K. Phototunable Supersoft Elastomers Using Coumarin Functionalized Molecular Bottlebrushes for Cell-Surface Interactions Study. *Macromolecules* 2014, 47 (22), 7852-7857. https://doi.org/10.1021/ma501609c.

(22) Tonge, C. M.; Sauvé, E. R.; Cheng, S.; Howard, T. A.; Hudson, Z. M. Multiblock Bottlebrush Nanofibers from Organic Electronic Materials. *J. Am. Chem. Soc.* 2018, 140 (37), 11599-11603. https://doi.org/10.1021/jacs.8b07915.

(23) Levi, A. E.; Lequieu, J.; Home, J. D.; Bates, M. W.; Ren, J. M.; Delaney, K. T.; Fredrickson, G. H.; Bates, C. M. Miktoarm Stars via Grafting-Through Copolymerization: Self-Assembly and the Star-to-Bottlebrush Transition. Macromolecules 2019, 52 (4), 1794-1802. https://doi.org/10.1021/acs.macromol.8b02321.

(24) Fox, T. G. Influence of Diluent and of Copolymer Composition on the Glass Temperature of a Poly-Mer System. *Bull Am Phys Soc* 1956, 1, 123.

(25) Curro, J. G.; Pincus, P. A Theoretical Basis for Viscoelastic Relaxation of Elastomers in the Long-Time Limit. *Macromolecules* 1983, 16 (4), 559-562. https://doi.org/10.1021/ma00238a014.

(26) Tassieri, M.; Laurati, M.; Curtis, D. J.; Auhl, D. W.; Coppola, S.; Scalfati, A.; Hawkins, K.; Williams, P. R.; Cooper, J. M. I-Rheo: Measuring the Materials' Linear Viscoelastic Properties "in a Step"! *J. Rheol.* 2016, 60 (4), 649-660. https://doi.org/10.1122/1.4953443.

(27) Rubinstein, M.; Colby, R. H. *Polymer Physics*; Oxford University Press: Oxford; New York, 2003.

(28) *Physical Properties of Polymers Handbook*, 2nd ed.; Mark, J. E., Ed.; Springer: New York, 2006.

(29) Watts, A.; Kurokawa, N.; Hillmyer, M. A. Strong, Resilient, and Sustainable Aliphatic Polyester Thermoplastic Elastomers. *Biomacromolecules* 2017, 18 (6), 1845-1854. https://doi.org/10.1021/acs.biomac.7b00283.

(30) Liang, H.; Sheiko, S. S.; Dobrynin, A. V. Supersoft and Hyperelastic Polymer Networks with Brushlike Strands. *Macromolecules* 2018, 51 (2), 638-645. https://doi.org/10.1021/acs.macromol.7b02555.

(31) U.S. Pat. No. 7,019,082B2, Matyjaszewski et al. Polymers, supersoft elastomers and methods for preparing the same.

(32) US20180201785A1, Sheiko et al. Solvent-Free Supersoft and Superelastic Materials.

(33) Further information on one or more embodiments of the present invention can be found in "Universal Approach to Photo-Crosslink Bottlebrush Polymers" by Sanjoy Mukherjee et. al., Macromolecules 2020, 53, 1009-1097 including supporting information.

Section D: Compliant Electrodes with Conductive Bottlebrush Elastomer Composites The low modulus of bottlebrush elastomers can also be leveraged to create super-soft compliant electrodes through the addition of conductive particles (fillers). There are many options for the conductive particles, including carbon black, graphite, graphene, carbon nanotubes (multi-wall and single wall), metal particles, and dispersed droplets of liquid metals (e.g. gallium). To achieve electrical conductivity, the particles must be added at a concentration which meets or surpasses the percolation threshold, defined as the point at which continuous particle pathways are formed in the composite.

Conductive composites can be prepared in a variety of ways. The particles must be dispersed throughout the polymer matrix, typically through a shear processing technique. The composite can be mixed in the solid state before crosslinking (dispersion in the polymer melt) or with the polymer and particle in solution, with solvent serving as a processing aid (dispersion in solution). Example techniques include ultrasonication, ball milling, bead milling, roll milling, rotor-stator mixing, and centrifugal mixing.

Compliant electrodes can be used to create flexible and stretchable capacitive pressure sensors. Sensors prepared with stretchable electrodes have a predicted sensitivity increase as compared to those prepared with non-stretchable electrodes due to decreased deformation inhibition of the dielectric at the electrode interface. Compliant electrodes can also be used in other flexible and stretchable devices such as dielectric actuators, which have a similar device structure to the capacitive pressure sensor but create mechanical output (actuation) from an applied voltage across the electrodes which generates Maxwell forces. In dielectric actuators, compliant electrodes are necessary because the actuation relies on the free deformation of both the dielectric and the electrodes.

Figure 28A:
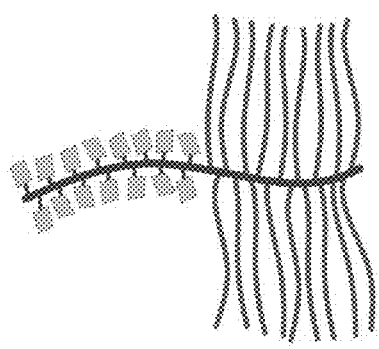
Figure 28B:
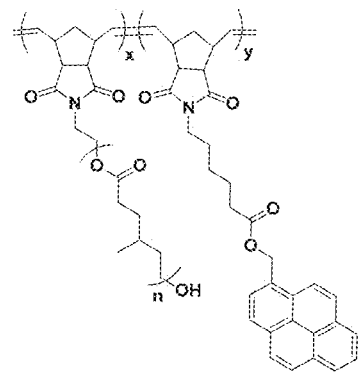

We created bottlebrush polymer-CNT composites with two different dispersion techniques: a) solution-based dispersion through ultrasonication and b) polymer melt-based dispersion through centrifugal mixing. The composites detailed below were all made with TUBALL Single Wall Carbon Nanotubes (OCSiAl). For solvent-based dispersion, we selected toluene for polymer compatibility. We found that ultrasonicating the CNTs in toluene alone did not produce a high-quality dispersion, but that quality could be improved through the addition of a pyrene-functionalized P4MCL bottlebrush (FIGS. 28A-28B) as a dispersant. Varying levels of sonication were evaluated, including bath sonication, cup horn ultrasonication, and probe ultrasonication. Increasing power generally reduced the presence of large bundles (visible by eye). The solutions could be centrifuged and filtered to remove these bundles.

Figure 29:
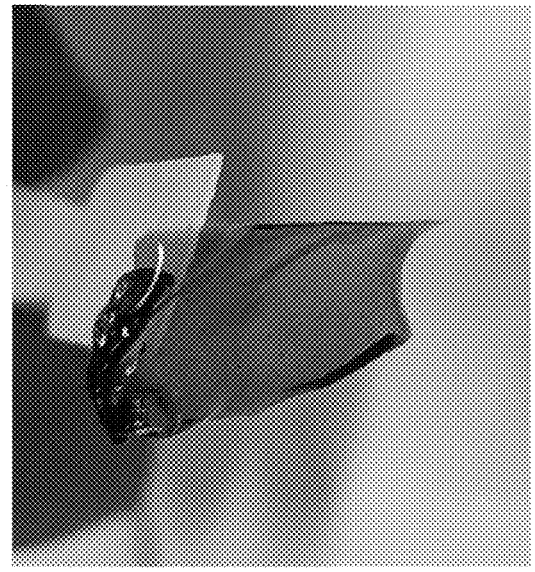
FIG. 29. 0.12 w/w % SWCNTs in a PDMS bottlebrush elastomer. Thin films of this composite can be photo-crosslinked with the benzophenone chemistry (126 μm thick film, $\rho$=1.5×10$^5$ Ω-cm).

The other technique demonstrated, centrifugal mixing, also dispersed CNTs in the bottlebrush polymer. Centrifugal mixing was performed with the FlackTek Speedmixer. Ceramic cylinders were added to the mixing container to increase shear forces. A PDMS bottlebrush mixed with 0.9 w/w % CNTs exhibited a resistance of 3.7 Ω-cm. The CNT concentration can be reduced such that the composite is transparent enough for photo-crosslinking of a thin film (FIG. 29).

Figure 30:
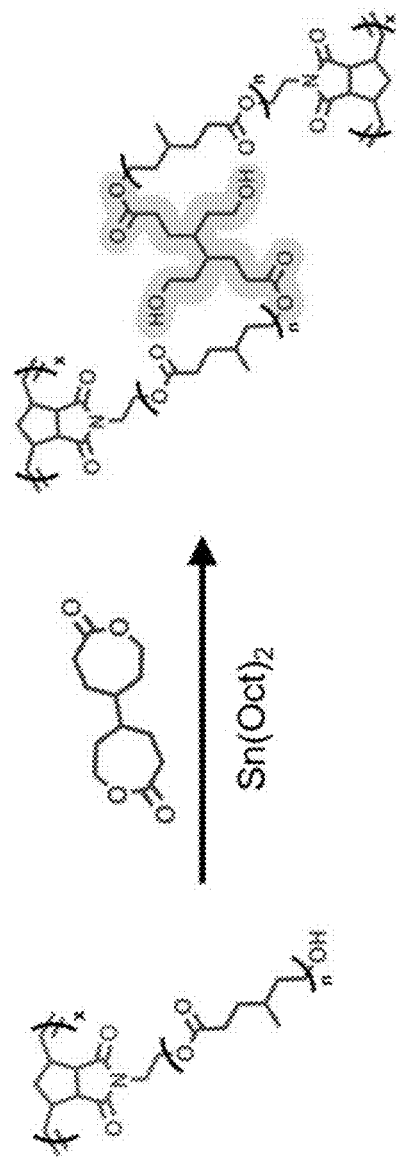
FIG. 30. Thermal crosslinking scheme for the P4MCL bottlebrush
Figure 31:
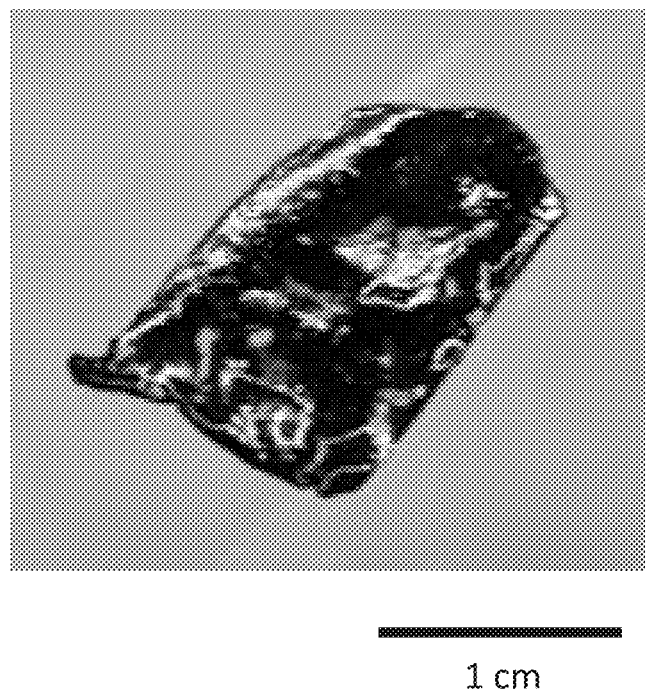
FIG. 31. Crosslinked P4MCL bottlebrush/CNT elastomer composite.

The high optical absorbance of CNTs hinders photo-crosslinking, limiting composite formulations to low CNT concentrations and samples to thin geometries. Other types of crosslinking, such as thermal crosslinking, can be used to crosslink composites with higher conductive particle concentrations. One example of a thermal crosslinking system for bottlebrush elastomers is shown in FIG. 30, using a bis-lactone type thermal crosslinker with two cyclic ester functional groups. This chemistry is chemo-selective to the terminal groups of the side chains of the P4MCL bottlebrush shown. This chemistry can exhibit self-healing due to the prevalence of unreacted terminal groups which can undergo transesterification reactions with the side-chains and cross-links. We prepared P4MCL-CNT composite elastomers using this thermal crosslinking system, dispersing the CNTs through DCM-plasticized centrifugal mixing with the FlackTek Speedmixer. The composite can be crosslinked at 180° C. to create an elastomeric solid (FIG. 31).

Section E: Device and Method Embodiments

Method of Making a Composition of Matter

Figure 32:
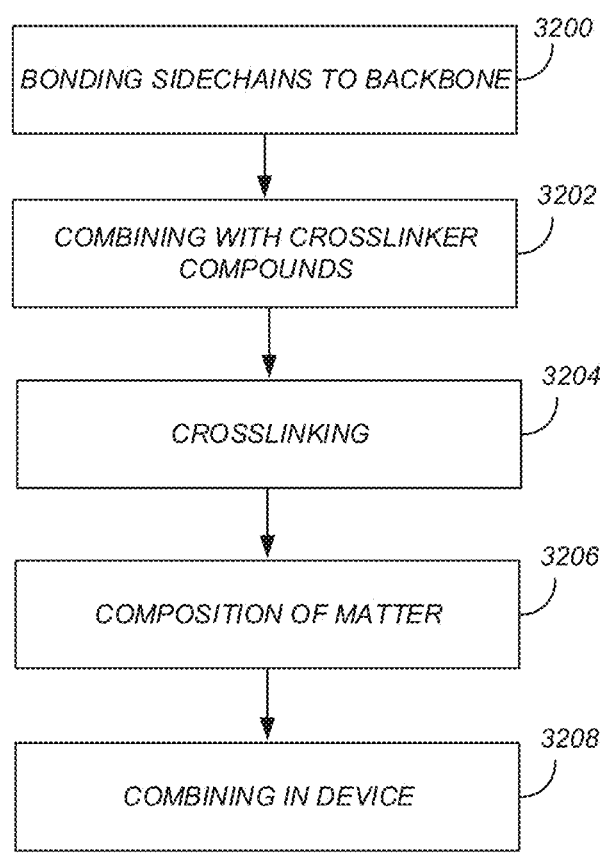
FIG. 32. Flowchart illustrating a method of making a composition of matter.

FIG. 32 is a flowchart illustrating a method of making a composition of matter and/or a device.

Block 3200 represents covalently bonding a plurality of side chains to one or more backbones to form one or more polymer bottlebrush molecules. The backbone includes a plurality of monomer units and each of the side chains are connected to one of the monomer units.

Block 3202 represents optionally combining (e.g., mixing) the polymer bottlebrush molecules with a plurality of crosslinker compounds having a composition suitable for crosslinking the different bottlebrush polymer molecules. The crosslinker compounds are soluble in the bottlebrush polymer molecules so as to form a homogeneous mixture of the crosslinker compounds and the bottlebrush polymer molecules before crosslinking and so that the composition of matter is a single phase before the crosslinking.

In one or more examples, solubility of the crosslinker molecules in the bottlebrush polymer molecules can be measured by measuring fluorescence emitted from the crosslinker compounds in the homogeneous mixture. The solubility may be characterized by uniform intensity of the fluorescence emitted from the homogeneous mixture such that the fluorescence does not include local increases in intensity associated with aggregation of the crosslinker compounds.

In one example, the combining comprises mixing an amount of crosslinker compounds with the dielectric bottlebrush polymers so as to form the composition of matter, each of the dielectric bottlebrush polymers having a plurality of side-chains, wherein the composition of matter includes:

(1) intra-molecular crosslinks, e.g., linking different parts of a same one of the bottlebrush polymers (e.g., the side-chains in a same one of the bottlebrush polymers), and (2) inter-molecular crosslinks, e.g., crosslinking different bottlebrush polymers.

Figures 34A, 34B:
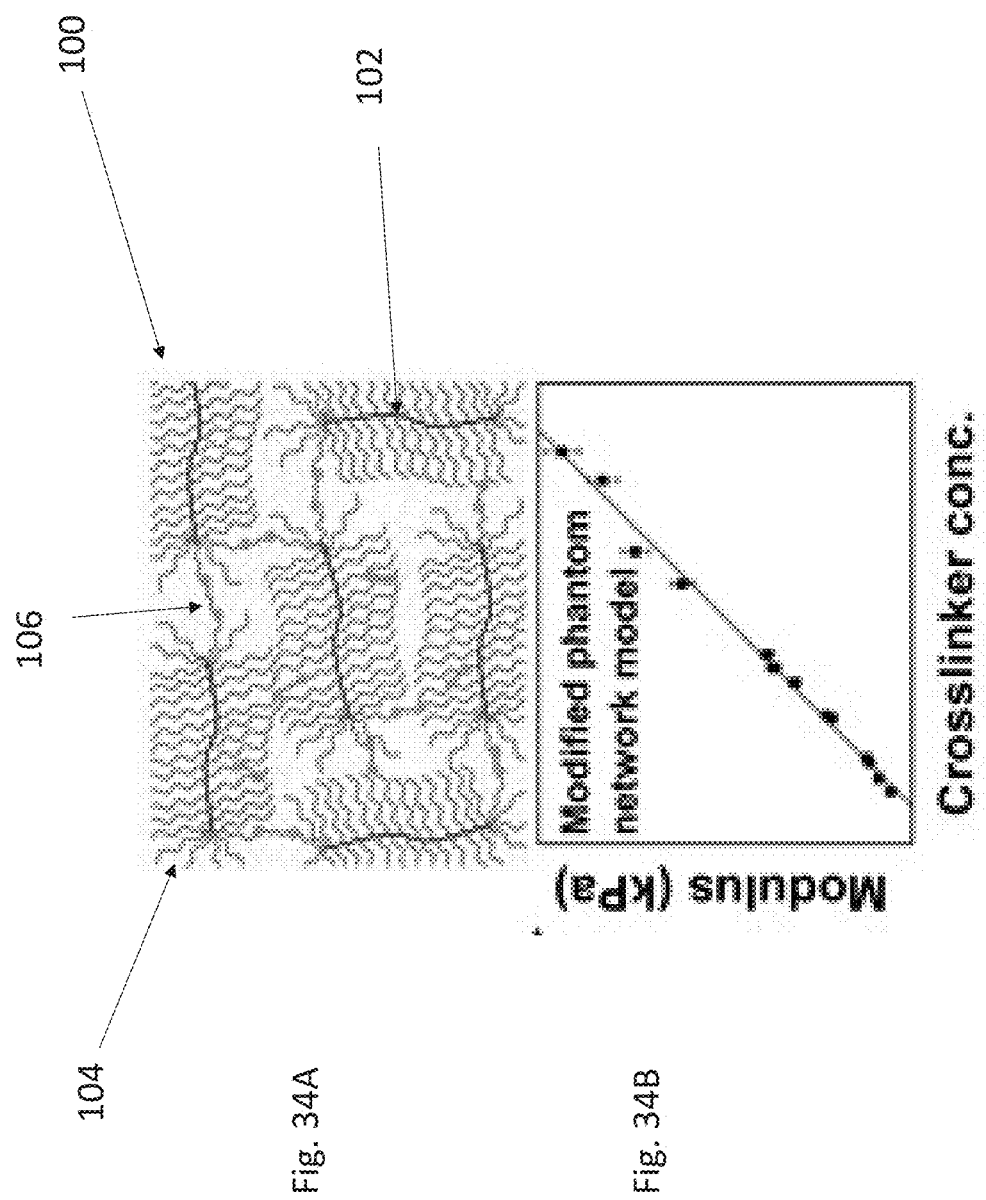
FIG. 34A. Schematic showing a network of crosslinked bottlebrush polymers according to one or more examples described herein.
FIG. 34B. Plot illustrating the network model that models the shear modulus in kiloPascals (kPa) as a straight line function of the crosslinker concentration (conc.) (e.g., as a function of the first number of the inter-molecular crosslinks and taking into account a second number of the intra-molecular crosslinks that do not substantially contribute to the shear modulus).

The amount of the crosslinker compounds is determined for a desired shear modulus of the composition of matter using a network model that models the shear modulus as a function of the first number of the inter-molecular crosslinks and taking into account a second number of the intra-molecular crosslinks that do not substantially contribute to the shear modulus. In one or more examples, the function is a straight line (as illustrated in FIG. 34B) characterized by a first fitting parameter (a) proportional to the first number of inter-molecular crosslinks and a second fitting parameter (b) proportional to the second number of intra-molecular crosslinks. The first fitting parameter is proportional to the slope of the straight line and a y-intercept of the straight line is proportional to the second fitting parameter. The first fitting parameter and the second fitting parameter are extracted by fitting the measured shear moduli with the function for various compositions of matter having different side-chain and backbone lengths and crosslinker loadings. In one or more examples, the composition of matter has a gel fraction of at least 90%.

Block 3204 represents crosslinking the bottlebrush polymer molecules. In one or more examples, the crosslinking comprises irradiating the composition with electromagnetic radiation.

Block 3206 represents the end result, a composition of matter.

Embodiments of the composition of matter include, but are not limited to, the following.

A1. A composition of matter, comprising (referring to FIG. 1 and FIG. 34A):
a plurality of bottlebrush polymer molecules 100, each bottlebrush polymer molecule including;
a backbone 102 including a plurality of monomer units;
a plurality of side chains 104, each of the side chains connected to one of the monomer units; and
a plurality of crosslinker compounds 106 having a composition suitable for crosslinking the different bottlebrush polymer molecules, wherein the crosslinker compounds are soluble in the bottlebrush polymer molecules so as to form a homogeneous mixture of the crosslinker compounds and the bottlebrush polymer molecules before the crosslinking and such that the composition of matter is a single phase before the crosslinking.

A2. The composition of matter of embodiment A1, comprising the crosslinker compounds crosslinking the different bottlebrush polymer molecules, as illustrated in FIG. 34A.

A3. The composition of matter of embodiment A1 or A2, wherein the crosslinker compounds include a photo crosslinker that crosslinks the bottlebrush polymer molecules in response to irradiation with electromagnetic radiation.

A4. The composition of matter of any of the preceding embodiments A1-A3, wherein the side-chains, bottlebrush backbones, and/or any combination thereof are crosslinked. In various examples, the crosslinks comprise covalent bonds between the bottlebrush polymer molecules. In one or more examples, the composition of matter is liquid or solid prior to crosslinking, and solid after the crosslinking.

A5. The composition of matter of any of the preceding embodiments A1-A4, wherein the side-chains comprise side-chain monomers and the side-chain monomers comprise a compound polymerizable using atom transfer radical polymerization (ATRP) initiated with a norbornene-functionalized ATRP initiator.

A6. The composition of matter of any of the preceding embodiments A1-A5, wherein the backbone's monomer units before polymerization comprise a norbornene, a styrene, an acrylate, a (meth)acrylate, or an acrylamide.

A7. The composition of matter of any of the preceding embodiments, wherein the backbone has the structure:

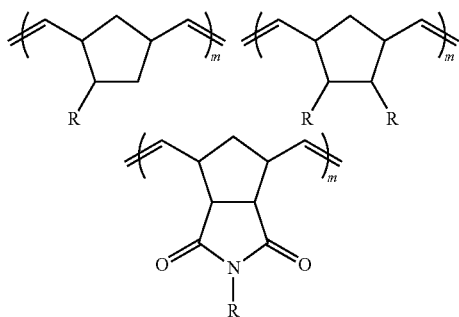

and m is an integer and R is a side-chain.

A8. The composition of matter of any of the preceding embodiments A1-A7, wherein the side chains comprise a polyester, polyether, poly(ethylene oxide), a poly(dimethylsiloxane), a polyacrylate, a polystyrene, or any possible combination thereof.

A9. The composition of matter of embodiment A1, wherein the bottlebrush polymer molecules each include at least one of the following structures:

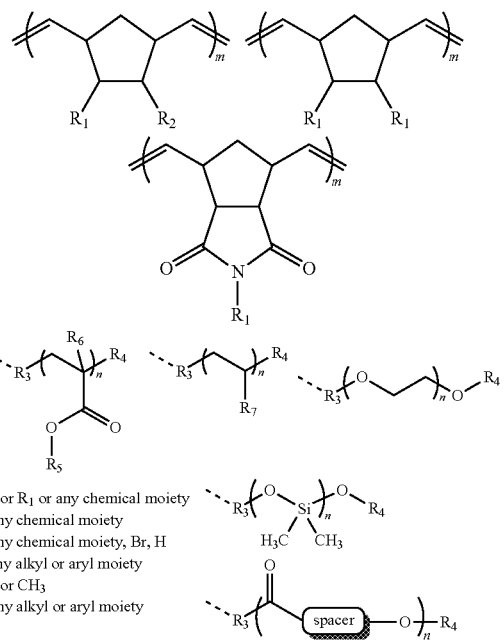

and m, n are integers and the spacer can be any divalent chemical moiety.

A10. The composition of matter of any of the preceding embodiments A1-A9, wherein the crosslinker compounds comprise a benzophenone or derivative thereof.

A11. The composition of matter of any of the preceding embodiments A1-A10, wherein the crosslinker compounds include a linker unit connecting benzophenone moieties whereby the linker unit structure includes a moiety also found in the side chains of the bottlebrush polymer.

A12. The composition of matter of embodiment A11, wherein:
the linker unit is a oligomeric(acrylate) or polyacrylate and the side chains comprise a polyacrylate, or
the linker unit is a oligomeric(ester) or polyester and the side chains comprise a polyester, or
the linker unit is a poly(ethylene oxide) or oligomeric (ethylene oxide) and the side chains comprise poly(ethylene oxide), or
the linker unit is poly(dimethylsiloxane) or oligomeric (dimethylsiloxane) and the side chains comprise poly(dimethylsiloxane).

A13. The composition of matter of any of the preceding embodiments A1-A12, wherein the crosslinker compound comprises a branched alkane.

A14. The composition of matter of any of the preceding embodiments A1-A13, wherein the crosslinker compound is an amorphous solid or a liquid.

A15. The composition of matter of any of the preceding embodiments A1-A14, wherein a composition of the crosslinker compound is tuned so that the crosslinker compound is molecularly-mixed with the bottlebrush polymer molecule.

A16. The composition of matter of any of the preceding embodiments A1-A15, wherein a composition of the crosslinker compound is molecularly-mixed with the bottlebrush polymer molecules without the use of solvent or processing additive.

A17. The composition of matter of any of the preceding embodiments A1-A16, wherein a composition of the crosslinker compound is molecularly-mixed with the bottlebrush polymer molecules without heating.

A18. The composition of matter of any of the preceding embodiments A1-A17, wherein a composition of the crosslinker compound is molecularly-mixed with the bottlebrush polymer molecules at room temperature (e.g., 15-30 degrees Celsius)

A19. The composition of matter of any of the preceding embodiments A1-A18, wherein the bottlebrush polymer molecule is a copolymer. The copolymer can be a main-chain (backbone) copolymer or side chain copolymer. In one or more examples, the bottlebrush polymer comprises a copolymer of side-chains. In yet further examples, each side-chain is a copolymer of different monomers. The bottlebrush polymers may each include a first block comprising a plurality of a first type of-side chains covalently bonded via the backbone to a second block comprising a plurality of the second type of side-chains. Bottlebrush block copolymers (diblock, triblock, tetrablock etc.) and statistical copolymers can be formed by copolymerizing two or more macromonomers sequentially or simultaneously. Bottlebrush block copolymers (diblock, triblock, tetrablock etc.) and statistical (random) copolymers can be formed by polymerizing macromonomers with copolymer (diblock, triblock, tetrablock etc. and statistical (random)) side-chains.

A20. The composition of matter of embodiment A19, wherein compositions of the bottlebrush polymers are tuned to maintain the relative dielectric constant of the composition of matter in the range 1-20 and maintain a glass transition temperature of the composition of matter in the range of −150-25° C.

A21. The composition of matter of any of the preceding embodiments A1-A20, wherein the composition of matter is solvent free.

A22. The composition of matter of any the preceding embodiments A1-A21, wherein the composition of matter has a Young's modulus or shear modulus in a range of 100 Pa-100 kPa.

A23. The composition of matter of any of the preceding embodiments A1-A22, wherein the composition of matter is photopatterned so as to include crosslinked and non-crosslinked portions.

A24. The composition of matter of any of the embodiments A1-A23, comprising intra-molecular crosslinks and inter-molecular crosslinks. In one or more examples, the second number of the intra-molecular crosslinks comprises at least 0.1% of a total number of the crosslinks and an amount of the crosslinker compounds in the composition of matter is tuned to achieve the first number of the inter-molecular crosslinks and the second number of the intra-molecular crosslinks such that the composition of matter has a desired Young's modulus or shear modulus in a range of 100 Pa-100 kPa.

A25. The composition of matter of any of the embodiments A1-A24, wherein the crosslinker compounds comprise photo crosslinker compounds having a functionality that absorbs electromagnetic radiation so as to undergo a change creating reactive functional groups, the reactive functional groups reacting with the bottlebrush polymer molecules so as to crosslink the bottlebrush polymer molecules. Examples of photo crosslinker compounds having the functionality that reacts with electromagnetic radiation include, but are not limited to, benzophenone (BP) and/or azide containing compounds. For example, the BP unit has a relatively weak absorption band near 350 nm (n→π*) and strong absorption bands near 200-250 nm (π→π*). When irradiated with a 350 nm light source, triplet excited states of benzophenone abstract hydrogen atoms from nearby alkyl moieties via radical pathways. The resulting reactive species can undergo C—C coupling reactions; through this mechanism, a molecule with two BP moieties can covalently crosslink distinct polymer chains. Thus, other examples of photo crosslinker compounds include, but are not limited to, compounds that are converted by excitation with electromagnetic radiation into reactive species that can undergo coupling reactions with the bottlebrush polymer that crosslink the bottlebrush polymer. In one or more examples, the electromagnetic radiation excites the photo crosslinker compounds into the reactive species having an excited state that abstracts hydrogen and undergoes C—C coupling reactions with the bottlebrush polymer.

A26. The composition of matter of any of the embodiments A1-A25, wherein the wt. % of the crosslinker compounds in the composition of matter is in a range of 0.005-10 wt. %.

A27. The composition of matter of any of the embodiments claims A1-A26, wherein the bottlebrush polymer molecules are crosslinked and the bottlebrush polymer molecules are covalently bonded to the crosslinker compounds.

A28. Photo crosslinking compounds or thermal crosslinking compounds may also be used to photo crosslink or thermally crosslink polymers generally, including non-bottlebrush polymers. Thus, the present disclosure further discloses a composition of matter, comprising a network of photo crosslinked or thermally crosslinked polymer molecules (including but not limited to bottlebrush polymer molecules as illustrated in FIG. 34A) comprising crosslinks crosslinking the polymer molecules, the crosslinks comprising compounds formed from a reaction of the polymer molecules with reactive functional groups in crosslinker compounds added to the polymer molecules prior to crosslinking, the crosslinker compounds having a functionality that absorbs electromagnetic radiation or thermal energy and undergoing a change creating the reactive functional groups.

Examples of crosslinker compounds having the functionality that absorbs electromagnetic radiation or thermal energy to form crosslinking reactive species include, but are not limited to, those functionalities (e.g., benzophenone) described herein for photo crosslinking bottlebrush polymers and the description for embodiment A25. Examples of crosslinking compounds having the functionality that absorbs thermal energy to form crosslinking reactive species include azides, for example.

Block 3208 represents optionally disposing the composition of matter in the device, e.g., combining the composition of matter in or with electrodes.

The device may be embodied in many ways including, but not limited to the following.

A29. An elastomer, actuator, electrode, pressure sensor, or adhesive comprising the composition of matter of any of the preceding embodiments A1-A28.

A30. A pressure sensor, comprising:
a first electrode;
a second electrode;
a composition of matter including an optionally crosslinked dielectric bottlebrush polymer between the electrodes, wherein pressure applied to one of the electrodes is translated into an electrical signal by a compression of the composition of matter in response to the pressure.

A31. The pressure sensor of embodiment A30, wherein the composition of matter comprises the composition of matter of any of the embodiments A1-A28.

A32. An electrode comprising a composite including the composition of matter of any of the embodiments A1-A28 combined with conductive material, wherein:

the electrode is flexible so as to be compliant to a device connected to the electrode, and an amount of the conductive material is equal to or greater than a threshold amount required for percolation between the bottlebrush polymer molecules such that conductive pathways are formed in the composite between the bottlebrush polymer molecules. In one or more examples, the electrode is electrically connected to the device or connected so as to apply an electric field or voltage bias to the device (e.g., gate or ohmic contact).

A33. The electrode of embodiment A32, wherein the conductive material comprises conductive particles or fibers comprising at least one material selected from carbon black, graphite, graphene, carbon nanotubes, and metal.

A34. The electrode of embodiments A32-A33 wherein the electric resistance of the electrode is lower than 10 Ω-cm.

A35. The device of any of the embodiments A29-34, wherein the composition of matter is photopatterned so as to locally crosslink the bottlebrush polymer or bottle brush polymer molecules.

A36. The sensor or device of any of the embodiments A29-35, wherein the electrode, first electrode and/or the second electrode are supported by a flexible substrate.

A37. The sensor or device of embodiment A36, wherein the flexible substrate is thin glass or a polymer, or a plastic, or a metal foil.

A38. The sensor or device of any of the embodiments A29-A37, wherein the device is uniformly transparent to visible light.

Method of Making a Device

Figure 33:
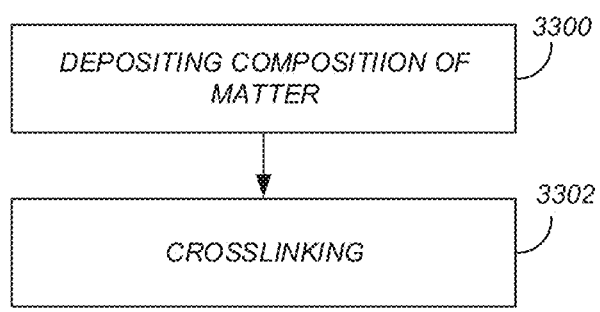
FIG. 33. Flowchart illustrating a method of making a device.

FIG. 33 is a flowchart illustrating a method of making a device.

Block 3300 represents depositing and/or processing a composition of matter (e.g., of any of the examples A1-A28 above) including a bottlebrush polymer in a device structure. In one or more examples, the depositing is so as to form the composition of matter in a desired shape for the device.

Block 3302 represents optionally crosslinking and curing the composition of matter after the composition of matter is formed in the desired shape.

Example embodiments of the method include, but are not limited to, the following.

B1. A method of making a pressure sensor, comprising:
depositing a composition of matter on a first electrode, the composition of matter including a dielectric bottlebrush polymer; and
depositing a second electrode on the composition of matter, so that pressure applied to one of the electrodes is translated into an electrical signal by a thickness reduction or compression of the composition of matter in response to the pressure.

B2. The method of embodiment B1, wherein the composition of matter comprises the composition of matter of any of the embodiments A1-A28.

B3. The method of embodiment B1, wherein the composition of matter further includes a crosslinker compound.

B4. The method of any of the embodiments B1-B3, wherein at least one of the electrodes is transparent to electromagnetic radiation, the crosslinking further comprising:

irradiating the composition of matter through the transparent electrode, wherein the irradiating induces crosslinking of the bottlebrush polymer or the polymer bottlebrush molecules.

B5. The method or sensor of embodiments B1-B3 or A29-A38, wherein the sensor detects 1 kPa or less of applied pressure with a sensitivity of 0.0087 kPa$^{-1}$ using a thickness of composition of matter of 1.55 mm or less and an electrode area of 18 mm$^2$ or less.

B6. The method of any of the embodiments B1-B5, wherein the composition of matter is a viscous liquid during deposition of the composition of matter onto the first electrode and is later solidified by crosslinking.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A formulation for an elastomer, comprising:
a first component comprising a plurality of bottlebrush polymer molecules, each of the bottlebrush polymer molecules including:
a backbone including a plurality of monomer units; and
a plurality of side chains, each of the side chains connected to one of the monomer units; and
a second component, not combined with the first component, the second component comprising a plurality of crosslinker compounds having a composition for crosslinking different ones of the bottlebrush polymer molecules to form the elastomer,
wherein:
the crosslinker compounds are soluble in the bottlebrush polymer molecules so as to form a homogeneous mixture of the crosslinker compounds, and the bottlebrush polymer molecules before crosslinking and so that the composition of matter is a single phase before the crosslinking.

2. The composition of matter of claim 1, wherein the backbone's monomer units before polymerization comprise a norbornene, a styrene, an acrylate, a (meth)acrylate, or an acrylamide.

3. The composition of matter of claim 1, wherein the backbone has the structure:

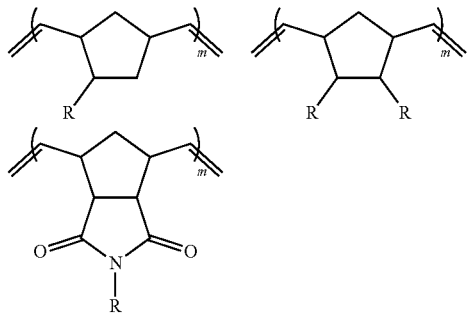

and m is an integer and R is a side-chain.

4. The composition of matter of claim 1, wherein the side-chains comprise at least one compound selected from a polyester, a polyether, a poly(ethylene oxide), a poly(dimethylsiloxane), a polyacrylate, and a polystyrene.

5. The composition of matter of claim 1, wherein the bottlebrush polymer molecules each include at least one of the following structures:

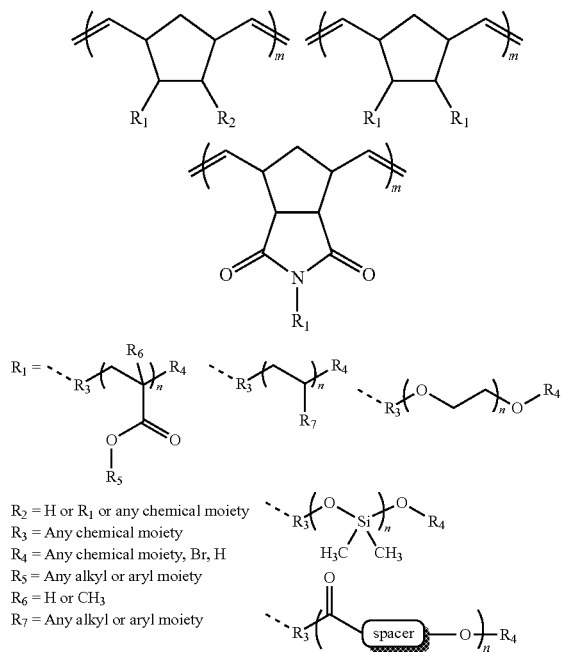

and m, n are integers and the spacer can be any divalent chemical moiety.

6. The composition of matter of claim 1, wherein the crosslinker compounds comprise at least two units, each of the units comprising at least one of a benzophenone or a derivative thereof.

7. The composition of matter of claim 1, wherein the crosslinker compounds comprise at least two azide units or two cyclic ester units.

8. The composition of matter of claim 1, wherein the crosslinker compounds include a linker unit connecting benzophenone moieties whereby the linker unit structure includes a moiety also found in the side chains of the bottlebrush polymer molecules.

9. The composition of matter of claim 8, wherein:
the linker unit is a polyacrylate or oligomeric(acrylate) and the side chains comprise a polyacrylate, or
the linker unit is a polyester or oligomeric(ester) and the side chains comprise a polyester, or
the linker unit is a poly(ethylene oxide) or oligomeric (ethylene oxide) and the side chains comprise poly (ethylene oxide), or
the linker unit is poly(dimethylsiloxane) or oligomeric (dimethylsiloxane) and the side chains comprise poly (dimethylsiloxane).

10. The composition of matter of claim 1, wherein the crosslinker compounds comprise a branched alkane.

11. A composition of matter, comprising:
a plurality of bottlebrush polymer molecules, each of the bottlebrush polymer molecules including:
a backbone including a plurality of monomer units; and
a plurality of side chains, each of the side chains connected to one of the monomer units; and
a plurality of crosslinker compounds having a composition suitable for crosslinking the different ones of the bottlebrush polymer molecules;
wherein:
the crosslinker compounds are soluble in the bottlebrush polymer molecules so as to form a homogeneous mixture of the crosslinker compounds and the bottlebrush polymer molecules before crosslinking and so that the composition of matter is a single phase before the crosslinking; and
an amount of the crosslinker compounds in the composition of matter tuning a first number of the intermolecular crosslinks and a second number of the intramolecular crosslinks such that the composition of matter has a desired shear modulus in a range of 100 Pa-100 kPa.

12. A composition of matter, comprising:
a plurality of bottlebrush polymer molecules, each of the bottlebrush polymer molecules including:
a backbone including a plurality of monomer units; and
a plurality of side chains, each of the side chains connected to one of the monomer units; and
a plurality of crosslinker compounds having a composition suitable for crosslinking the different ones of the bottlebrush polymer molecules;
wherein:
the crosslinker compounds are soluble in the bottlebrush polymer molecules so as to form a homogeneous mixture of the crosslinker compounds and the bottlebrush polymer molecules before crosslinking and so that the composition of matter is a single phase before the crosslinking; and
the composition of matter is solvent free.

13. The composition of matter of claim 11, wherein the bottlebrush polymer molecules comprise a copolymer having one or more compositions tuned to maintain the relative dielectric constant in the range 1-20 and maintain a glass transition temperature of the composition of matter in the range of −150° C. to 25° C.

14. An elastomer, actuator, or adhesive comprising the composition of matter of claim 11.

15. A pressure sensor comprising the composition of matter of claim 11, comprising:
a first electrode;
a second electrode; and
the composition of matter between the electrodes, wherein pressure applied to one of the electrodes is translated into an electrical signal by a compression of the composition of matter in response to the pressure.

16. The pressure sensor of claim 15, wherein:
the crosslinker compounds include a photo crosslinker that crosslinks the bottlebrush polymer molecules in response to irradiation with electromagnetic radiation, and
the composition of matter is photopatterned so as to locally crosslink the bottlebrush polymer molecules and form the composition of matter including crosslinked and non-crosslinked regions.

17. An electrode comprising a composite including the composition of matter of claim 11 combined with conductive material, wherein:

the electrode is flexible so as to be compliant to a device connected to the electrode, and an amount of the conductive material is equal to or greater than a threshold amount required for percolation between the bottlebrush polymer molecules such that conductive pathways are formed in the composite between the bottlebrush polymer molecules.

18. The electrode of claim 17, wherein the conductive material comprises conductive particles or fibers comprising at least one material selected from carbon black, graphite, graphene, carbon nanotubes, and metal.

19. The composition of matter of claim 11, wherein:
the crosslinker compounds comprise photocrosslinker compounds having a functionality that absorbs electromagnetic radiation so as to undergo a change creating reactive functional groups, the reactive functional groups reacting with the bottlebrush polymer molecules so as to crosslink the bottlebrush polymer molecules, and the wt. % of the crosslinker compounds in the composition of matter is in a range of 0.005-10 wt. %.

20. The composition of matter of claim 11, wherein the composition of matter is solvent free.

21. The composition of matter of claim 12, further comprising an amount of the crosslinker compounds in the composition of matter tuning a first number of the intermolecular crosslinks and a second number of the intramolecular crosslinks such that the composition of matter has a desired shear modulus in a range of 100 Pa-100 kPa.

22. The composition of matter of claim 12, wherein:
the crosslinker compounds comprise photocrosslinker compounds having a functionality that absorbs electromagnetic radiation so as to undergo a change creating reactive functional groups, the reactive functional groups reacting with the bottlebrush polymer molecules so as to crosslink the bottlebrush polymer molecules, and the wt. % of the crosslinker compounds in the composition of matter is in a range of 0.005-10 wt. %.

23. The composition of matter of claim 12, wherein the bottlebrush polymer molecules comprise a copolymer having one or more compositions tuned to maintain a relative dielectric constant in the range 1-20 and maintain a glass transition temperature of the composition of matter in the range of −150° C. to 25° C.

24. An elastomer, actuator, or adhesive comprising the composition of matter of claim 13.

25. An elastomer, actuator, or adhesive comprising the composition of matter of claim 12.

* * * * *